US008060513B2

(12) United States Patent
Basco et al.

(10) Patent No.: US 8,060,513 B2
(45) Date of Patent: Nov. 15, 2011

(54) INFORMATION PROCESSING WITH INTEGRATED SEMANTIC CONTEXTS

(75) Inventors: Stephen Basco, Kitchener (CA); Nick Foisy, Conestogo (CA); Bruce Scanlan, Waterloo (CA); Harsch Khandelwal, Kitchener (CA)

(73) Assignee: Dossierview Inc., Waterloo, Ontario (CA)

( * ) Notice: Subject to any disclaimer, the term of this patent is extended or adjusted under 35 U.S.C. 154(b) by 638 days.

(21) Appl. No.: 12/217,250

(22) Filed: Jul. 1, 2008

(65) Prior Publication Data

US 2010/0005061 A1 Jan. 7, 2010

(51) Int. Cl.
G06F 7/00 (2006.01)
G06F 17/30 (2006.01)
(52) U.S. Cl. .................................................... 707/739
(58) Field of Classification Search .................. None
See application file for complete search history.

(56) References Cited

U.S. PATENT DOCUMENTS

| | | | | |
|---|---|---|---|---|
| 5,519,608 | A * | 5/1996 | Kupiec | 704/9 |
| 6,029,165 | A | 2/2000 | Gable | 707/3 |
| 7,219,073 | B1 | 5/2007 | Taylor et al. | 705/26 |
| 7,426,505 | B2 | 9/2008 | Simpson et al. | 707/3 |
| 2004/0205035 | A1 | 10/2004 | Rimoux | 706/14 |
| 2007/0081197 | A1 | 4/2007 | Omoigui | 358/403 |

OTHER PUBLICATIONS

Califf et al., "Relational Learning of Pattern-Match Rules for Information Extraction", AAAI Technical Report SS-98-01, 1998, AAAI.*

Huang, et al., "Searching Messages Based on Semantic Context", 4th International Conference on Wireless Communications, Networking and Mobile Computing, IEEE, Oct. 12-14, Apr. 2008, pp. 1-4.
Wallace, et al., "The Electronic Road: Personalized Content Browsing", IEEE Multimedia, Oct.-Dec. 2003, vol. 10, Issue 4, pp. 49-59.

* cited by examiner

Primary Examiner — Michael Hicks
(74) Attorney, Agent, or Firm — Ohlandt, Greeley, Ruggiero & Perle, L.L.P.

(57) ABSTRACT

A system and method for generating a frame of reference for a plurality of information, the plurality of information containing text data and obtained by a user through interaction with one or more information sources. The method and system include receiving selected information for analysis, the information including a plurality of text data and identifying a plurality of logical units of the text data. Also included are identifying a plurality of individual textual portions in each of the logical units and calculating the number of logical units associated with each of the individual textual portions of the plurality of textual portions for use in identifying a plurality of patterns including a respective pattern for each of the individual textual portions. Based on the identified patterns, a measure of importance for each of the plurality of patterns is calculated and respective patterns from the plurality of patterns are selected based on their corresponding measure of importance satisfying a predefined pattern importance threshold for retaining the respective patterns in the plurality of patterns. Further, a plurality of information context definitions is generated based on the selected respective patterns and the generated information context definitions are assigned as context definitions of a semantic context associated with the frame of reference. The plurality of information is related to each other and such relation is represented by the generated context definitions of the semantic context.

33 Claims, 19 Drawing Sheets

*Fig. 19*

INFORMATION PROCESSING WITH INTEGRATED SEMANTIC CONTEXTS

FIELD OF THE INVENTION

This invention relates to efficient access to information over a communications network.

BACKGROUND OF THE INVENTION

Use of the Internet is growing in popularity due to the ever-expanding availability of information that is accessible on-line through various search tools, such as search engines. Across a local enterprise and remotely over the Internet, computer users are faced by having to sort through an overwhelming amount of information. The Internet is fast becoming the primary information search tool for obtaining information about products, places, people, etc. Unfortunately, the Internet is also quickly becoming a casualty of its own success due to unmanageable amounts of available data and the inability of users to receive desirable search results that are of efficient use to the users.

One problem associated with Internet search methodologies is the undesirable volume of search results obtained through a seemingly directed search. The amount of information available on any particular topic can be overwhelming to even the most seasoned Internet searcher. Typically, search results are filled with voluminous information that may not be appropriate for the search context desired by the searcher. Further, the searcher may desire certain information types over others. Certainly, it is a disadvantage to the searcher to have to sift through volumes of search results that seemingly do not pertain to the interests/desires of the searcher. Accordingly, tools such as search engines and document management systems can exacerbate the problem by pushing greater and greater amounts of information to users' desktops, creating the sense of being overwhelmed by data. Further, it is recognised that current search technologies are reactive and as such require a user to stop their current task and interrogate a data source to access information.

Further, adding to the "information chaos" is the fact that many of today's computer users are working on multiple, often dissimilar projects, and the ordered and optimized access of the user to relevant information stored in their computers (in relation to their current project), can be problematic. This lack of organizational capability can significantly detract from a user's (e.g. lawyer, accountant, consultant, educator, doctor . . . ) ability to efficiently work via their computer with information that is related to their current project. Common questions related to information disorganisation on a user's computer are: "Which relevant documents were on the desktop?"; "Which email threads are part of the project?"; "What web searches and results were within the project?"; "What documents, presentation, data, emails, pictures, videos were part of the project?"; and "Which files were on the desktop system, a server or in a document management system?". One solution to this organizational problem is for the user to manually create and manage a number of directories and folders for related information. However, the nature of this type of organization is that any desired changes require much manual effort on the part of the user.

A further disadvantage of current search technologies is that multiple searchers search in isolation, even though there may be many searchers currently searching for similar subject matter (e.g. cheap trip to Florida) online. Accordingly, the multiple searchers are unable to leverage each other's time spent on the task of finding the similar subject matter.

SUMMARY OF THE INVENTION

It is an object of the present invention to provide an information-processing environment to obviate or mitigate at least some of the above-presented disadvantages.

Tools such as search engines and document management systems can exacerbate information overload problems by pushing greater and greater amounts of information to users' desktops, creating the sense of being overwhelmed by data. Further, it is recognised that current search technologies are reactive and as such require a user to stop their current task and interrogate a data source to access information. Contrary to current systems and methods there is provided a system and method for generating a frame of reference for a plurality of information, the plurality of information containing text data and obtained by a user through interaction with one or more information sources. The method and system include receiving selected information for analysis, the information including a plurality of text data and identifying a plurality of logical units of the text data. Also included are identifying a plurality of individual textual portions in each of the logical units and calculating the number of logical units associated with each of the individual textual portions of the plurality of textual portions for use in identifying a plurality of patterns including a respective pattern for each of the individual textual portions. Based on the identified patterns, a measure of importance for each of the plurality of patterns is calculated and respective patterns from the plurality of patterns are selected based on their corresponding measure of importance satisfying a predefined pattern importance threshold for retaining the respective patterns in the plurality of patterns. Further, a plurality of information context definitions is generated based on the selected respective patterns and the generated information context definitions are assigned as context definitions of a semantic context associated with the frame of reference. The plurality of information is related to each other and such relation is represented by the generated context definitions of the semantic context.

A first aspect provided is a method for generating a frame of reference for a plurality of information, the plurality of information containing text data and obtained by a user through interaction with one or more information sources, the method comprising: receiving a selected information for analysis, the information including a plurality of text data; identifying a plurality of logical units of the text data; identifying a plurality of individual textual portions in each of the logical units; calculating the number of logical units associated with each of the individual textual portions of the plurality of textual portions for use in identifying a plurality of patterns including a respective pattern for each of the individual textual portions; calculating a measure of importance for each of the plurality of patterns; selecting respective patterns from the plurality of patterns based on their corresponding measure of importance satisfying a predefined pattern importance threshold for retaining the respective patterns in the plurality of patterns; generating a plurality of information context definitions based on the selected respective patterns; and assigning the generated information context definitions obtained from the selected information as context definitions of a semantic context associated with the frame of reference, the plurality of information being related to each other and such relation being represented by context definitions of the semantic context.

A further aspect provided is selecting the context definitions as the individual textual portions from a plurality of selected information; identifying a plurality of logical units of the text data including the context definitions; calculating the number of logical units associated with each of the context definitions for use in identifying a plurality of context definition patterns including a respective context definition pattern for each of the individual context definitions; calculating a measure of importance for each of the plurality of context definition patterns; selecting respective context definition patterns from the plurality of context definition patterns based on their corresponding measure of importance satisfying a predefined context definition pattern importance threshold for retaining the respective context definition patterns in the plurality of context definition patterns; generating a plurality of secondary information context definitions based on the selected respective context definition patterns; and assigning the generated information secondary context definitions obtained from the selected plurality of information as secondary context definitions of a semantic context associated with the frame of reference.

A further aspect provided is receiving another information for analysis, said another information including a plurality of other text data; identifying a plurality of other logical units of the other text data; identifying a plurality of other individual textual portions in each of the logical units; calculating the number of other logical units associated with each of the individual other textual portions of the plurality of other textual portions for use in identifying a plurality of other patterns including a respective other pattern for each of the individual other textual portions; calculating an other measure of importance for each of the plurality of other patterns; selecting respective other patterns from the plurality of other patterns based on their corresponding other measure of importance satisfying an other predefined pattern importance threshold for retaining the respective other patterns in the plurality of other patterns; generating a plurality of other information context definitions based on the selected respective other patterns; and comparing the generated other information context definitions with the context definitions of the semantic context to determine a degree of relatedness of the receiving another information with the plurality of information associated with the semantic context.

A further aspect provided is where the received other information is information obtained from an information query and the received other information is based on a user request or based on a request of a context engine of the user independently of user interaction. The information query is selected from: a database query; a structured query of a document; and a Web query. The request of the context engine is a predictive query initiated by the context engine based on activities of the user, where the activities of the user are selected from: when the user is in the semantic context in the frame of reference but before submission of the user request; when the user is in the semantic context in the frame of reference but during submission of the user request; and when the user is in the semantic context in the frame of reference but after submission of the user request. The context definitions from the semantic context are provided to the user as query suggestions for selection by the user.

BRIEF DESCRIPTION OF THE DRAWINGS

Exemplary embodiments of the invention will now be described in conjunction with the following drawings, by way of example only, in which:

FIG. 19 is an example user interface content provided via the collaboration server of FIG. 10.

DETAILED DESCRIPTION OF THE PREFERRED EMBODIMENT(S)

Information Processing System 10

Figure 1:
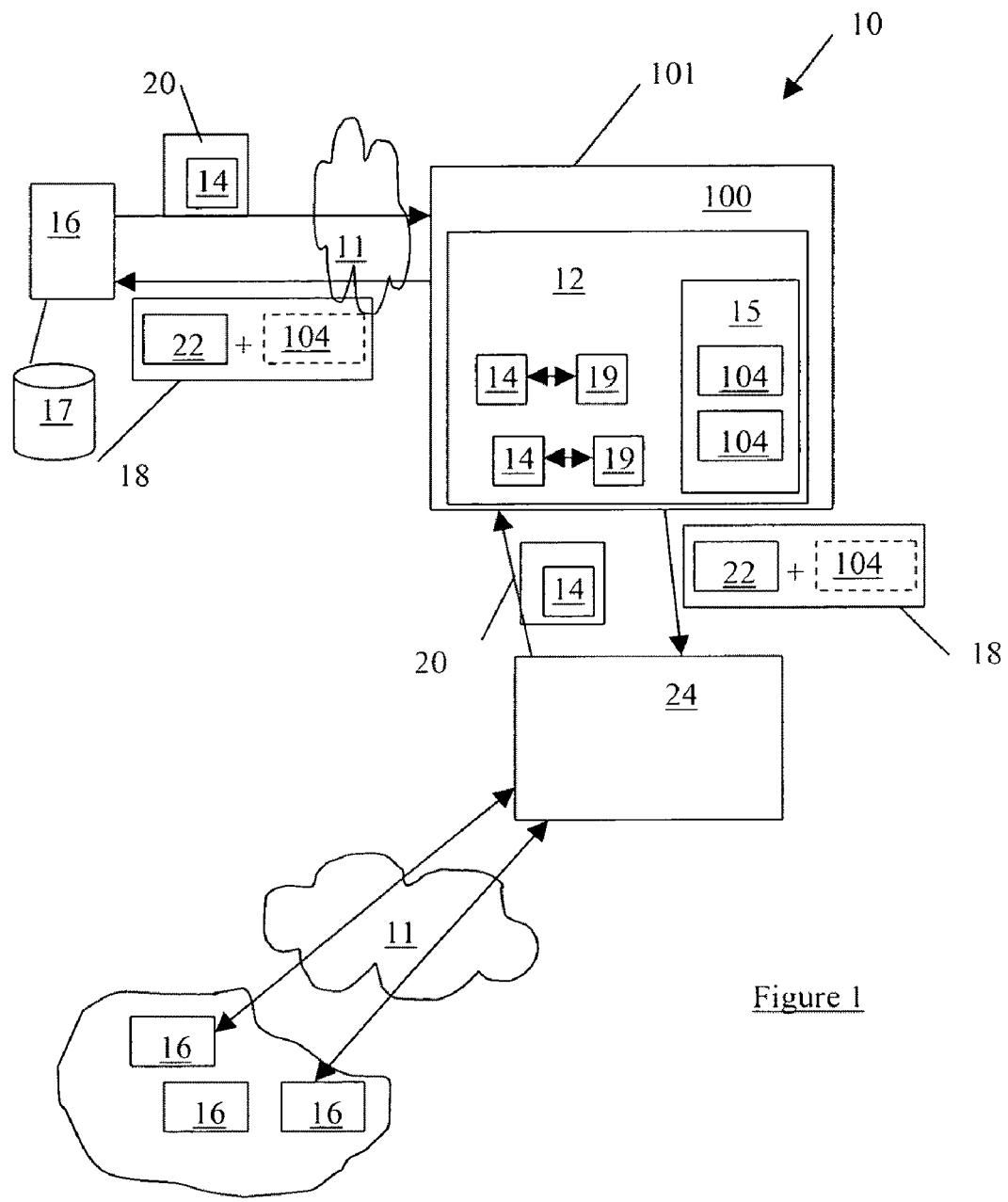
FIG. 1 is a block diagram of components of an information processing system.
Figure 2:
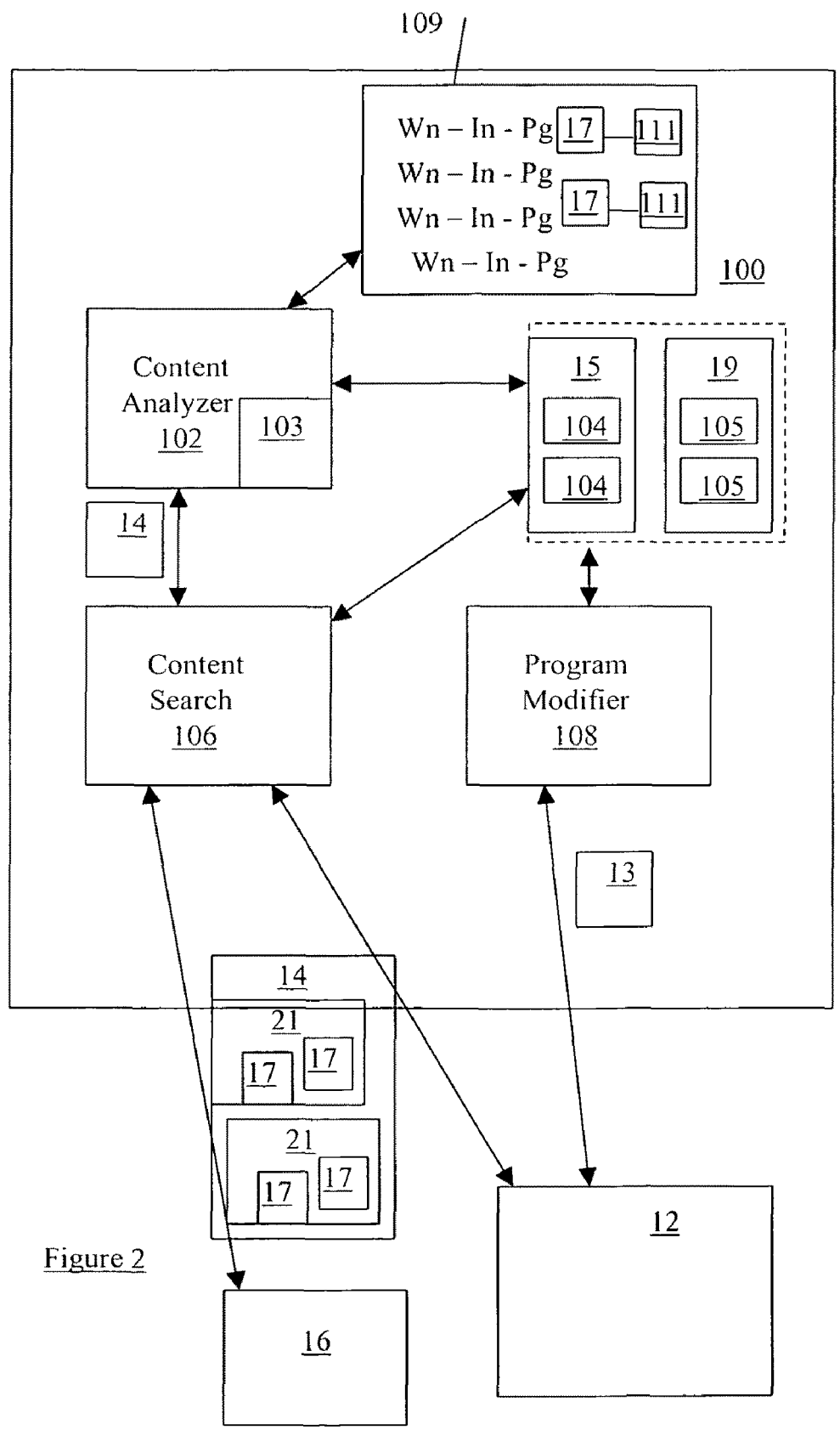
FIG. 2 shows an example configuration of a context engine of the system of FIG. 1.

Referring to FIGS. 1 and 2, shown is an information processing system 10 for creating and maintaining a defined frame of reference (FoR) 12 for a user's work activities, which includes information 14 retrieval from a variety of information sources 16 via information requests 18 and information responses 20 over a communications network 11. The information sources 16 can be configured for direct communication with the user (e.g. between the user and a Web service) and/or can be configured for indirect communication with the user (e.g. between the user and a third party search engine 24 with a group 17 of information sources 16). The information 14 can be information object types such as but not limited to: an electronic document (e.g. containing textual and/or pictorial information); a network message (e.g. an email or other network 11 communication such as Web service messages); database content (obtained from remote 17 and/or local 210 storage (see FIG. 4); and/or search results based on a search query, for example. It is recognised that the information 14 can include the state of application programs (e.g. Microsoft Word, PowerPoint, Excel, Outlook, Internet Explorer) and/or the specific generated results of the application programs (e.g. Word documents, presentations, spreadsheets, emails, browser search results), as further described below.

It is recognised that the information requests 18 and information responses 20 can be related to 28 information queries such as but not limited to: a database query; a structured query of a document (or other information 14); and a Web (e.g. network 11) query. It is recognised that as more and more information is either stored in a structured definition language (e.g. XML), exchanged in a structured definition language, or presented in a structured definition language through various interfaces, the ability to intelligently query the structured definition language data sources becomes desired. For example, information 14 (e.g. documents) defined in a structured definition language can be referred to as structured information (e.g. documents) and therefore the information 14 can be considered as a source of data and traditional data sources (e.g. databases) can be considered as information 14 (e.g. documents).

The FoR 12 can include a visual shell (e.g. a display 203 on a user interface 202 of the computing device 101—see FIG. 4) that has one or more semantic context(s) 15 associated with the FoR 12 and the information 14 associated therewith, as further described below. As the user continues to work in the FoR 12, the visual aspects of their work environment can be maintained/developed to help represent the semantic context(s) 15 associated with the FoR 12. At the same time, based on the information 14 content (e.g. documents) the user is creating or referencing, the semantic context(s) 15 is/are built by a context engine 100 (see FIG. 2), or otherwise modified, to take into account information context 19 (including determined context definitions 105) determined from the information 14, as further described below.

It is recognised that the context engine 100 can dynamically develop the semantic context 15 associated with the FoR 12 as the user manipulates/accesses the information 14 created/stored locally (e.g. a user created document, information request 18, etc.) and/or obtained from the remote information sources 16, based on the information context 19 associated with the information 14 by the context engine 100. In any event, the system 10 is used to define the semantic context(s) 15 of the FoR 12 and to compare information context 19 determined from selected information 14 (e.g. documents accessed by the user after creation of the semantic context(s) 15) with the semantic context(s) 15 of the FoR 12, in order to ascertain which (if any) of the semantic context(s) 15 the selected information 14 is related to. It is recognised that the context engine 100 may determine that the information context 19 does not match any of the semantic context(s) 15, and therefore may use the information context 19 as a basis to create a new semantic context 15 of the FoR 12.

For example, a set of context definitions 104 represents or otherwise defines the semantic topic matter of the semantic context 15 for a set of information 14. For example, context definitions 104 combined from one or more documents represent the overall semantic content 15 assigned to/associated with the group of documents. As well, for individual information 14 portions (e.g. a document, a Web page, etc.), a set of determined context definitions 105 represents the semantic topic matter of the information 14, which is then subsequently used for comparison purposes against an existing semantic context 15 to determine if the individual information 14 portion is related to the semantic context 15. In other words, the context definitions 105 of the individual information 14 portion are compared against the context definitions 104 of the semantic context 15. For example, context definitions 105 obtained from a document represent the information content 19 of that document.

Figure 4:
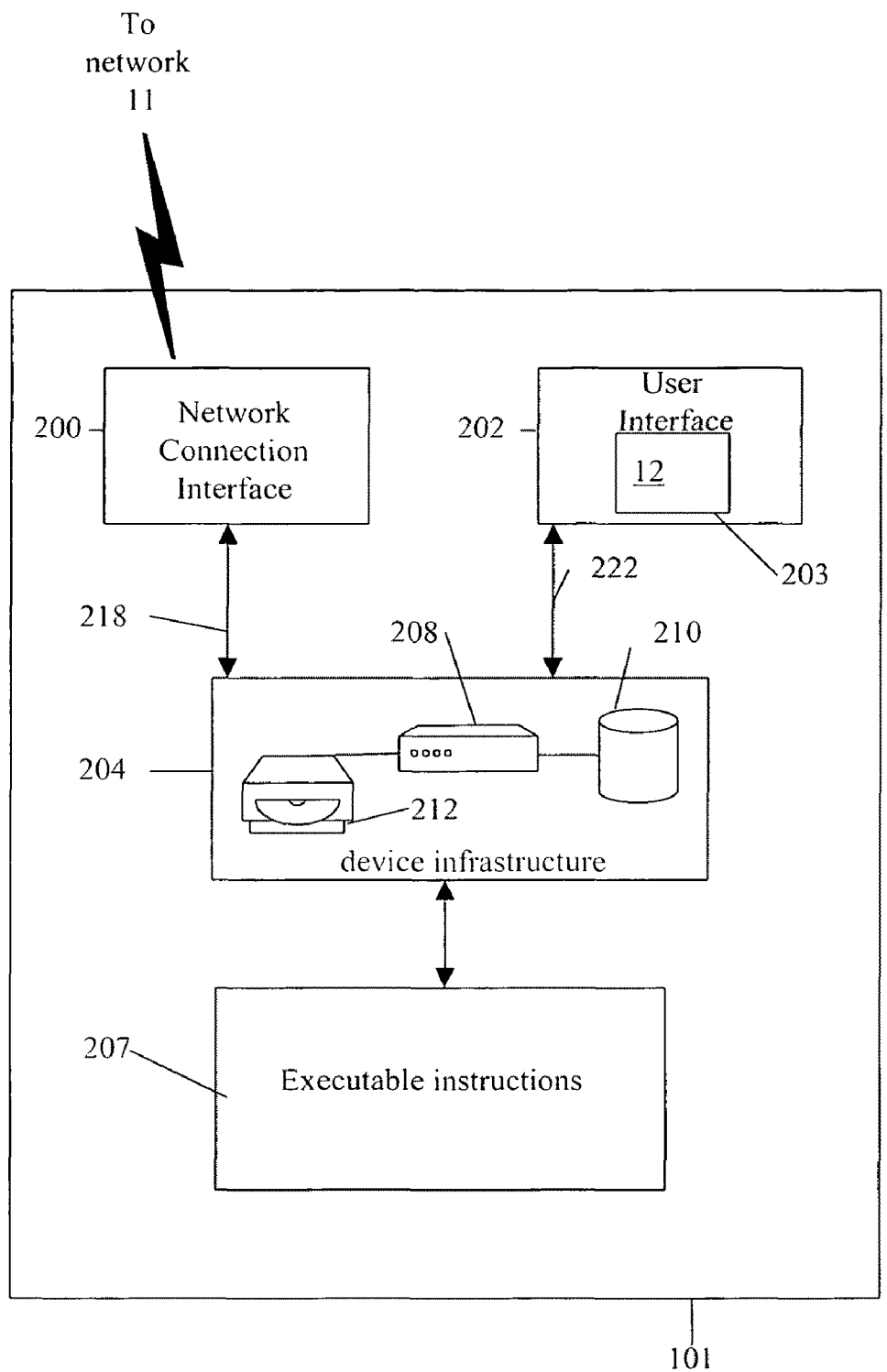
FIG. 4 is a block diagram of an example computing device for implementing the components of the system of FIG. 1 and FIG. 10.

Communication between the user device 101, the information sources 16, and the search engine(s) 24 is facilitated via one or more communication networks 11 (such as intranets and/or extranets—e.g. the Internet), and implemented by the user through the user interface 202 (see FIG. 4). The system 10 can include multiple user devices 101, multiple context engines 100, multiple information sources 16, multiple search engines 24, and one or more coupled communication networks 11, as desired. It is recognised that the context engine 100 can be hosted on the user device 101 (as shown by example) or can be configured as a networked service accessible by the user device 101 over the network 11.

Information Request 18

The following discussion uses information requests 18 and information responses 20 over the communications network 11, as an example of information 14 search and retrieval by the user, whereby the information 14 (that can include the associated information requests 18) is processed by the context engine 100 to dynamically build/modify the semantic context 15 associated with the FoR 12 using the determined information context 19. It is recognised that more generically, the information requests 18 and information responses 20 could also include user activities for creating/modifying/obtaining/storing documents and/or messages (as well as other information 14) locally on their computing device 101.

The request 18 of the user includes search parameters 22 (e.g. keyword terms, phrases, etc.) for use in helping to identify desired information 14 that are appropriately related to the information 14 already present in (e.g. associated with) the defined FoR 12 from one or more of the information sources 16. It is recognised that the defined initial/preliminary version of the FoR 12 can include initial/preliminary information 14 such as but not limited to: a user defined title and/or content definition/description; user selected documents (e.g. from the local storage 17); and/or user selected information object(s) from a search response 20 (e.g. selected links on a search results page containing reference or navigation elements to another a document, a Webpage or other network resource, and to a position in a Webpage). It is recognised that the selected information 14 objects may be located either locally (e.g. a file system such as a database) or remotely (e.g. Web services accessed via the Internet) with respect to the user. The context engine 100 can use the initial/preliminary information 14 to construct the semantic context 15 of the FoR 12 for subsequent use in analysing subsequent information 14 obtained by the user through interaction with their computing device 101, as further described below.

The search requests 18 contain search parameters 22 to help identify desired information 14 from the information sources 16, for example media such as but not limited to: image files; video files; audio files; text or literary files; article/book reviews; Web pages/sites; electronic documents; online advertisements; RSS feeds; blogs; and/or podcasts. The user submits the search request 18 over the network 11 in order to locate desired information 14 that are potentially related to the semantic context(s) 15 of the FoR 12. That information 14 that is returned by the search request 18 (e.g. by matching of at least some of the search parameters 22) can be subsequently filtered by the context engine 100 to obtain a subset of the information 14 that is deemed most relevant to the user's interest, i.e. information 14 that is related to the context definitions 104 (see FIG. 2) contained in the semantic context(s) 15. It is also recognised that the search parameters 22 of the search request 18 can be optionally augmented (e.g.

to supplement the search request 18) by a content search module 106 to include at least some of the context definitions 104 (shown in ghosted view) prior to submission of the search request 18 to the information sources 16. Alternatively, or in addition to, the received search results 20 (e.g. from a Web-based search engine) based on user supplied search parameters 22 can be further analyzed by the content search module 106 before presentation to the user. For example, the content search module 106 can use at least some of the context definitions 104 to modify or otherwise reorder the ranking of the information 14 links contained in the search results 20.

In one embodiment, the received other information (e.g. from the other users connected to the user via the network 11) can be information 14 obtained from an information query 18 such as but not limited to: a database query; a structured query of a document; and/or a Web query. The received other information can be based on the user request 18 or based on the request 18 of the context engine 100 of the user independently of user interaction. For example, the request 18 of the engine 100 can be a predictive query initiated by the engine 100 based on activities of the user, such as but not limited to: when the user is in the context 15 in the frame of reference (e.g. FoR 12) but before submission of the user request 18; when the user is in the context 15 in the frame of reference (e.g. FoR 12) but during submission of the user request 18; and when the user is in the context 15 in the frame of reference (e.g. FoR 12) but after submission of the user request 18.

Further, for example, predictive searching (e.g. submission of the request 18) and associated predictive retrieval (e.g. receipt of the response 20) directly by the engine 100 can occur when the user is in the context 15 before, during or after any searches have been conducted. The engine 100 can construct the query string (of the predictive request 18) from the determined important patterns of the most determined context definitions 104 in the context 15. The search string can be a set of non-overlapping patterns combined (e.g. OR'ed) together. The search is initiated by the engine 100 through communication with the information sources 16 (or third party server such as the search engine 24 coupled to the information sources 16). Note, the search string may not be used for matching of other contexts 15, but rather selected context definitions 104 within the context 15. The user can then be presented with search results 20 when they open (or otherwise interact with) a corresponding application (e.g. Microsoft Word, Web Browser, etc.) of the FoR 12. It is also recognised that the context engine 100 may use the search string. When there are no context definitions 104 available, the context engine 100 can use the search string as a degenerate case, e.g. selected as a single context definition 104, such that the search string can be considered as a context definition 104 in the case where it is the only information available (e.g. for the semantic context 15) by the context engine 100.

Further, for example, when the user opens an application of the FoR 12, such as a web browser or file explorer or other application on their computer, auto completion capabilities in search text boxes can provide search suggestions to the user in a dropdown combo box. This is done via the engine 100 by using key patterns from the context definitions 104 selected from the contexts 15 to give the user contextually based type ahead search/query suggestions that they can select from a dropdown list, for example.

Request 18 Example

The user of the system 10 can bias the search parameters 22 of the search request 18, using context definitions 104 of the semantic context(s) 15, to refine the request 18 and/or scoring of results 20. The search module 106 could compare the initial parameters 22 of the request 18 with the context definitions 104 in order to determine if at least some of the search parameters 22 are included in the word(s) Wn contained in the context definitions 104. For instance, when a search request 18 is submitted, if there are no related context definitions 104 in the semantic contexts 15 of the user's FoR 12, the search module 106 (of the context engine 106—see FIG. 2) does not modify the search string (e.g. search parameters 22) used to query search engines (e.g. information sources 16).

However, if there is a match determined between the parameters 22 and the context definitions 104, information (e.g. a word, a phrase, etc.) is selected by the search module 106 from the context definitions 104 (e.g. topics) and then used to augment the parameters 22 of the search request 18 (e.g. query), which is then sent to search engines that seed the corresponding search. In other words, the search module 106 can append the base terms of the parameters 22 (e.g. the words in the bias) with selected content (e.g. determined the most important patterns) from the context definitions 104, in order to augment the query string. For example, this can be performed context definition 104 by context definitions 104 (e.g. topic). Chosen is the most important pattern (or otherwise pattern(s) that satisfy a pattern importance threshold) from the most important context definition 104 (or otherwise context definition(s) 104 that satisfy a definition importance threshold) where the words that comprise the selected patterns minimize overlap.

For example, a user search request 18 is received by the search module 106 for jobs at Research In Motion (RIM), a telecommunications company. In this case the user is looking for an engineering position at RIM. However, if the user searches for "RIM job" (e.g. as the search parameters 22 submitted to the search engine) the search results 20 could all/mostly relate to sexual material, at least for the higher ranked results in the search result list. For example, the search request "RIM job" was tested on Microsoft Live Search and Google. The returned search results 20 of the Live search contained no references to employment opportunities in the first five pages of results (approximately 10 per page) and the returned search results 20 of the Google search contained two references in the first 5 pages, the first on the second page, the second on the third page.

The search request 18 was repeated by comparing the search parameters 22 of "RIM" and "job" with the context definitions 104 of a semantic context 15 defined for where the user was looking for employment. The context definitions 104 contained the words "job", "employment", "engineer", "position" and combinations thereof, as well as exclusionary/negative/restricted context definitions 104 of "sex", "mouth", etc. The search module 106 determined that a match existed between the search parameters 22 and the context definitions 104, i.e. they both contained the word "job". Accordingly, the search module 106 augmented the base query 18 with matching patterns from the context definitions 104, such that the query string of the search request 18 became: query=(RIM+job|RIM+employment|job+engineer+postion NOT (sex|mouth|etc . . . ) . . . ). This augmented/modified query 18, based on content selected form the context definitions 104, caused the search engines 16 to return results 20 from all the search strings provided. The results 20 were also optionally scored against the context definition 104 patterns, such that no results related to sexual content and all results related to employment opportunities were returned for review on the user interface 202 by the user. It is recognised that the base search parameter(s) 22 may be modified based on content (e.g. words Wn) selected from the context definitions 104 and/or the results 20 may be modified based on content (e.g.

words Wn) selected from the context definitions 104 (e.g. filtering of the sexual references by scoring technique so the sexual references are not displayed to the user via the search results 20).

It is recognised that the system 10 could be configured so that the search for information starts without the user actively doing anything. Matching patterns selected from the context definitions 104 of the semantic context 15 by the search module 106, are combined in a query string (e.g. parameters 22) to seed the search (e.g. search request 18). The search module 106 can also score the results 20 and the user presented with results in a proactive manner (i.e., no request or action is required on their part), such that the most relevant information of the results 20 is show to the user, e.g. the context definitions 104 are used to order the search results 20.

In addition, if the user accesses selected information 14 (e.g. opens up Microsoft word), the collaboration engine 150 can search through information resources 16 that are relevant to the information context 19 of the selected information 14, and then bring up a task pane (e.g. on the user interface 202) displaying the deemed relevant information sources 16. It is recognised that the deemed relevant information sources 16 can include colleagues in the user's enterprise or some other user grouping (e.g. remote to the user but accessible via the Internet 11) that is/are considered to be working on related material, i.e. the information context 19 of the information 14 matches the information context 19 of the relevant information sources 16, further described below with respect to the collaboration environment 140.

In a further example, the user could have context definitions 104 associated with their semantic context 15 (of their FoR 12) indicating that the user obtained/reviewed certain documentaries from on-line video stores and is a member in certain on-line historical interest groups. Accordingly, the context search module 106 could modify the user search requests 18 to include context definitions 104 from the definition table in the search parameters 22, which state the user has interest in documentaries and participates with historical interest peers (e.g. using assigned "documentary" and "historical interest" context definitions 104 associated with the semantic context 15 of the user). The inclusion of these context definitions 104 could preferentially weight subsequent search results 20 (e.g. generated after the search request 18 was updated to include "documentary" and "historical interest") to include information 14 pertaining to documentaries and/or historical interest, or to otherwise rank such information 14 higher in the list of information 14 included in the subsequent search results 20. In general, the context search module 106 can modify the search request 18 with selected ones of the context definitions 104 (or at least words/phrases extracted from the context definitions 104) in order to make the search results 20 more applicable to the user. Another option is for the content search module 106 to compare the search results 20 with the context definitions 104 of the semantic context 15, in order to provide a higher ranking (for example) to those information 14 from the search results 20 that match (via their determined information context 19) a threshold score measurement of the context definitions 104 of the semantic context 15.

FoR 12

One feature of the system 10 is that it can facilitate semantic context(s) 15 to be built, used and deleted from the FoR 12 as desired by the user. For example, in the case of a dynamic FoR 12, as the user searches for information 14 relating to multiple different semantic contexts 15, the context engine 100 can determine whether the information context 19 of the information 14 being sought matches an existing semantic context 15 (or multiple existing semantic contexts 15) of the dynamic FoR 12. If so, the context engine 100 uses the determined content definitions 105 of the information context 19 as additional information to build/refine the context definitions 104. The revised/amended/modified semantic context(s) 15 can be used to sort or otherwise filter the remaining information 14 results of the current search results 20 (e.g. which causes the ordering/content of the currently retrieved results to change accordingly based on the changed semantic context 15), and/or can be used to filter subsequent search results 20 (and/or modify search parameters 22 of subsequent search requests 18).

Further, if the new information 14 being sought does not fit within an existing semantic context 15, based on a comparison between the content definitions 105 of the respective information context 19 and the context definitions 104 of the semantic context(s) 15, the context engine 100 can automatically create a new semantic context 15 using the unmatched content definitions 105. Accordingly, as the user switches between several semantic contexts 15 (e.g. mixed martial arts, trip to Jamaica, patent protection etc) while interacting with the FoR 12, the context engine 100 can be configured to either continuously hone existing semantic contexts 15 or dynamically create new semantic contexts 15, based on the comparison results of the determined context definitions 105 with the context definitions 104 of the existing semantic contexts 15. Further, it is recognised that the semantic contexts 15 created in the dynamic FoR 12 may be persisted indefinitely by the system 10 or for a selected period of time (e.g. until all the browser windows are closed for use on a computer shared by multiple family members).

Further, referring to FIG. 1, the FoR 12 can include a working session of the user on the device 101 (see FIG. 4) that is associated with the defined semantic context 15. For example, the working session can include the semantic context 15 as maintained by the content engine 100, as well as interaction of the content engine 100 with a graphical user interface (GUI) that represents another program, or set of programs, which are presented to the user through icons, windows, toolbars, folders, wallpapers/background, and/or widgets. One example of this program, or set of programs, is a desktop environment (e.g. Microsoft Windows XP or Microsoft Vista) that is considered either a window manager, or a suite of programs that include a window manager. On the whole, the GUI facilitates the user to interact with the computer programs using concepts that are similar to those used when interacting with the physical world, such as buttons and windows. The following uses the FoR 12 represented as a desktop for demonstration purposes only. It is recognised that the context engine 100 cooperates with one or more programs provided by the desktop, in order to, via the semantic context 15, optimize the user's information 14 access based on the context definitions 104 (e.g. Topics) the user is working on within their working session. It is recognised that the user can save the state of their working session, including the state of the programs of the desktop, when the user is finished with work activities related to the defined semantic context 15 (this can also be shared with other users). Alternatively, once the user's working session is finished, the semantic context 15 (and any modifications to the desktop programs) can be deleted.

Accordingly, the user interactive features of the FoR 12 GUI can include application state items such as but not limited to: desktop icons; recently used menu items for windows and applications; web browser Favourites; and other commonly used features of windows desktops that maintain state. A program modifier module 108, further described below, can augment via the semantic context 15 the state of these interactive FoR 12 user features. For example, the program modifier module 108 can use the context definitions 104 of the semantic context 15 to reorder the recently used menu items, web browser favourites, and other commonly used features of windows desktops that maintain state, such that the windows features are dynamically updated to account for the defined semantic context 15. For example, the program modifier module 108 would modify the order of listed web browser Favourites based on those Favourites that best match one or more (or other predefined definition matching threshold) of the context definitions 104, e.g. those favourites that match the most of the context definitions 14 (for example those that match above a specified threshold number of definitions 104) would be placed higher up in the favourites list that those that favourites that have a poorer match to the context definitions 104. In this manner, the context engine 100 is used to inhibit cluttered and/or irrelevant information 14 presented to the user via the FoR 12 that is associated with information 14 related to previous projects/work that is not relevant to the currently defined semantic context 15.

In one embodiment, first step in semantic context 15 creation is for the user to identify the semantic context 15 and provide information 14 to the context engine 100 for use in creating the initial context definitions 104, where it is recognised that the user may not have to actually do anything other than identify the semantic context 15 and then the semantic context 15 can be built by the context engine 100 from scratch without any initial definitions/information 14 being identified by the user. The context 15 also can be explicitly defined, named and associated with a desktop (e.g. the FoR 12).

For example, the user can launch or otherwise initiate communication with the context engine 100 (either locally or remotely) that provides for the user to enter a name and/or a description of the semantic context 15. Once started, the defined semantic context 15 represents a work environment for a specific project of the user. The semantic context 15 can be used by the content engine 100 to include visual and environment aspects of the users work environment (e.g. the desktop GUI) along with semantic aspects of the project, for example the topics the user is working on. While the user works in FoR 12, the content engine 100 can run in the background and generate the semantic context 15 based on user actions, for example invisible to the user and/or requiring user input for modification/updating of the semantic context 15. As discussed above, the context engine 100 can also maintain application program state information as the user works in the applications, such as word processors, spreadsheets, web browsers and other applications common to business users. The applications (including generated results of the application such as documents, search results, etc.) can be defined to include all types of documents and their related programs. For example the types of documents can include such as but not limited to: Microsoft Office documents— Word, PowerPoint, Excel, Visio, Access, Publisher, FrontPage, OneNote, etc; Email, calendar events, notes (typed or handwritten on a tablet) and tasks in email/organizer programs such as Microsoft Outlook; Web pages and other forms of SGML based documents (e.g., XML); Databases, database reports and other view of data; Adobe Acrobat PDFs; photographs, scanned images and videos. It is noted that the user does not necessarily have to explicitly name or identify a context 15. The context engine 100 can imply and create contexts 15 based on the user's interactions with the system 10 by measuring the relatedness of material they appear to be interested in (i.e. calculation of the context definitions 104, 105 further described below).

Further, it is recognised that types of information 14 that can be maintained by the context engine 100 can include such as but not limited to: Windows including Desktop (icons, backgrounds, themes and other configuration), Recent Programs (and state information inside the programs such as temporal dependent state information that represents historically monitored user interaction with the application), Recent Documents, My Documents, and Views on Folders; Web Browsers including My Favorites, Bookmarks, Recent Searches, Historical Search, Recent Pages, etc; and Office Applications including Recent Documents in file menus, Emails, notes, tasks, calendars, contacts and calls (e.g., within MS Outlook, MS OneNote Notebooks), and Document Management system references and queries.

Semantic Context 15 and Information Context 19

Figure 10:
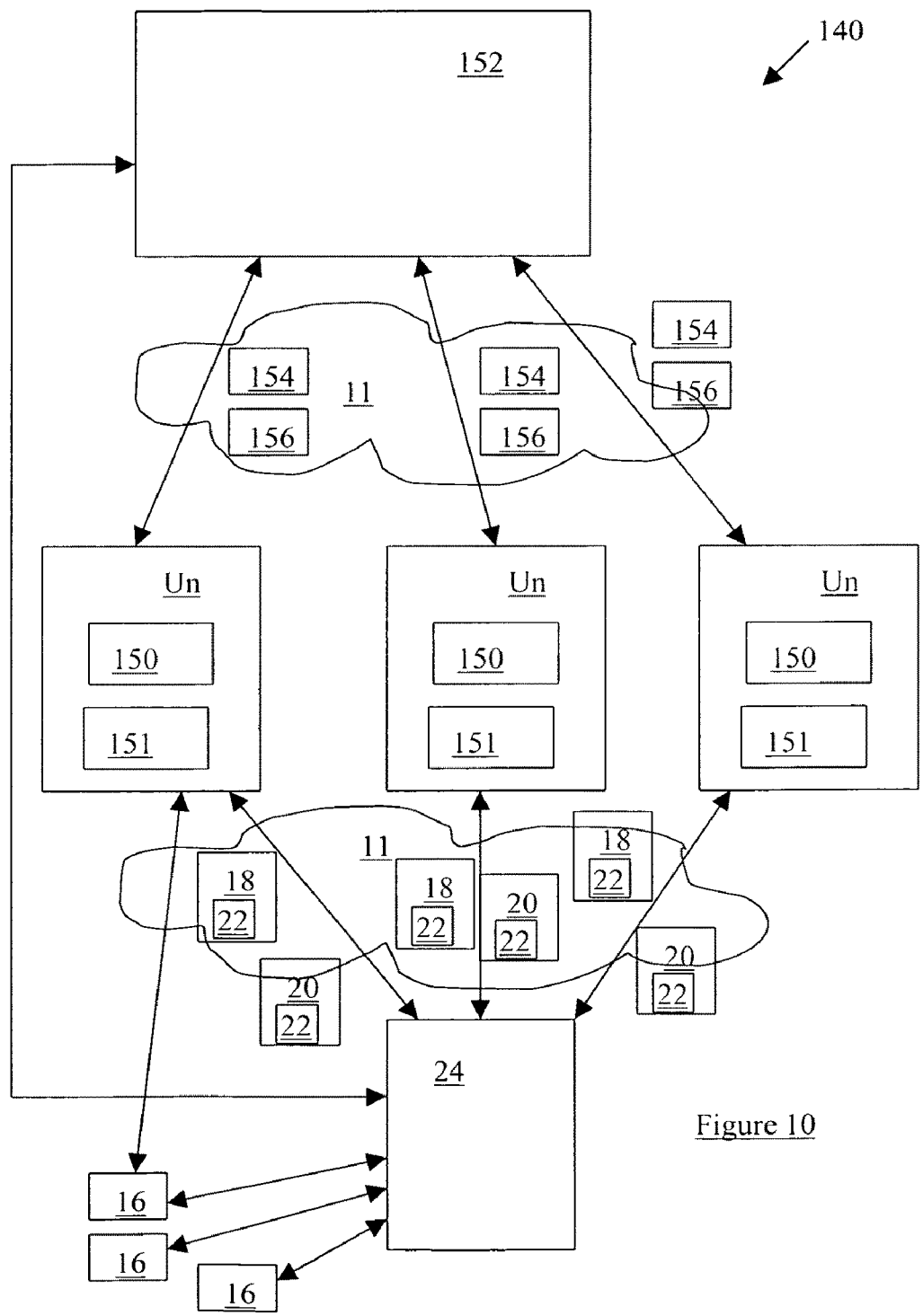
FIG. 10 is a block diagram of components of a collaboration environment that can be coupled to the system of FIG. 1.

Referring again to FIG. 2, the semantic context 15 associated with the FoR 12 contains a table (or other structured memory construct) for storing context definitions 104 that are used to define the semantic context 15. It is recognised that the context definitions 104 can provide identification, categorization, descriptive, and/or labelling information about the semantic context 15. For example, the user could supply initial definitions 104 (material which is processed as representative of the desired semantic context 15) via the user interface 202 (see FIG. 4) to the context engine 100 for use in creating the initial semantic context 15. It is recognised that the user may also let the context engine 100 select context definitions 104, from the information 14 accessed by the user, for use in creating the initial semantic context 15. The semantic context 15 is used to define the manner in which a plurality of information 14 (e.g. a series of search results 20 and other documents assembled by the user), also referred to as a search information set 154—see FIG. 10, are related to each other and such relation is defined by the context definitions 104. Further, the information context 19 determined for selected information 14, accessed by the user, has associated context definitions 105 that are used to define the context of the information 14.

Figure 7:
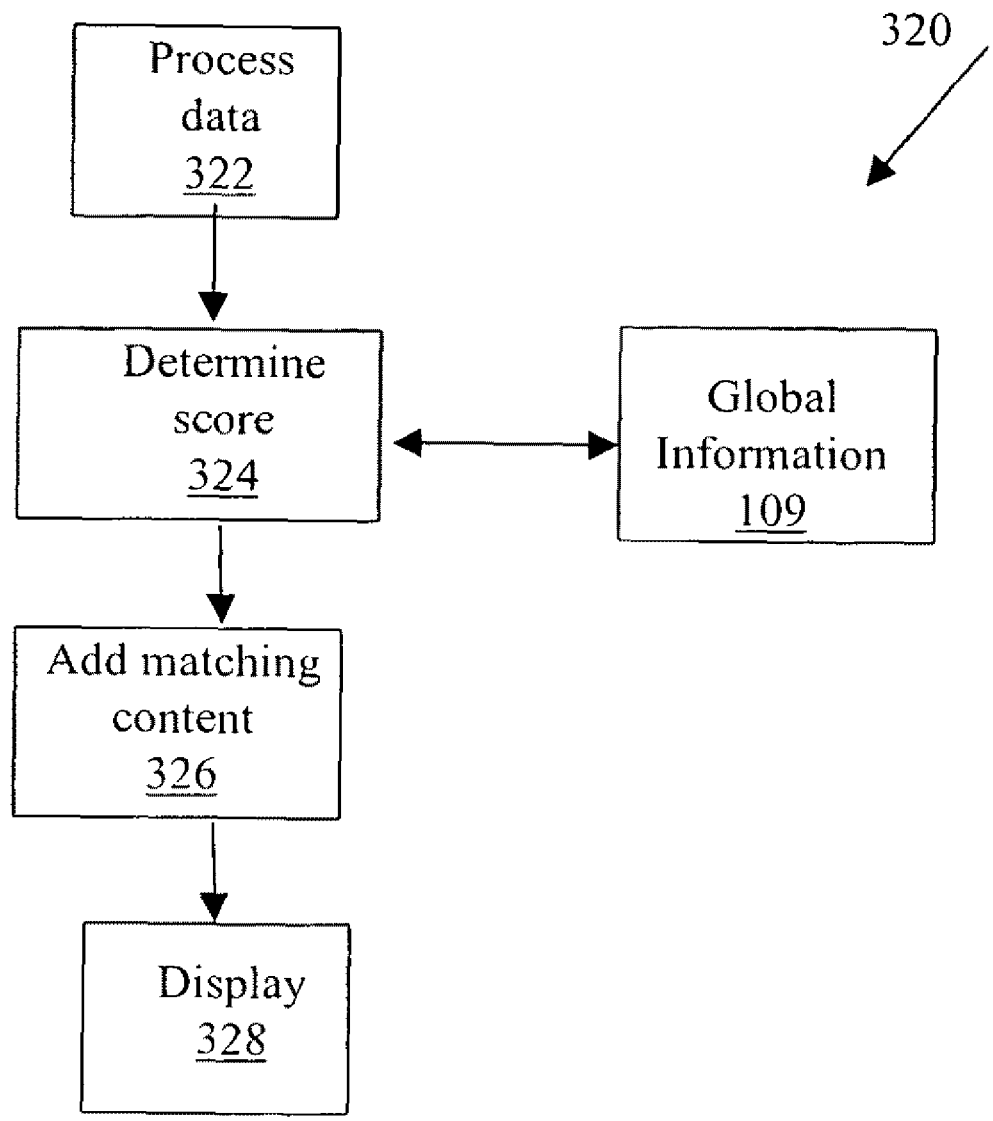
FIG. 7 is a flowchart of an example operation of the context engine of the system of FIG. 1.
Figure 8:
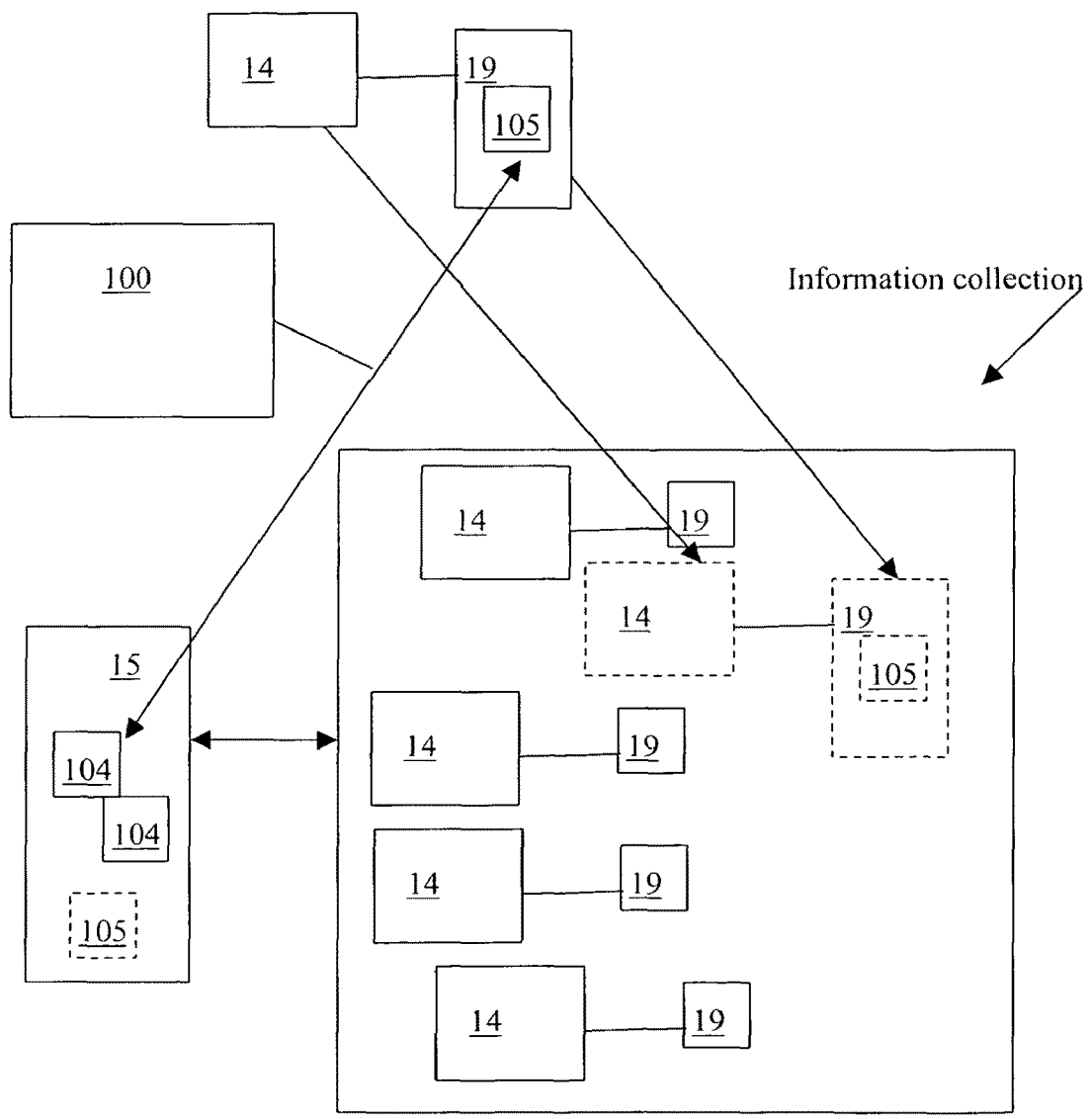
FIG. 8 is an example embodiment of the organization of semantic context 15 and information collection of the system of FIG. 1.

Referring to FIG. 8, shown is an example embodiment of the organization of the information 14 within the system 10. A collection of information 14, assembled by the user, has an assigned semantic context 15 including a plurality of context definitions 104. The collection of information also has individual information 14 (e.g. sets one or more documents, Web pages, Web page links—e.g. browser bookmarks, etc.), each with their own assigned information contexts 19. The context engine 100, further discussed below, also compares 324 (see FIG. 7) the context definitions 104, 105 with one another to determine if the new information 14 should be included with the collection of information (this decision is represented by the ghosted items 14, 19 in FIG. 8).

For example, a plurality of individual information 14 (e.g. information collection) including Web pages on travel, hotel, and recreation activities for Florida would be assigned a semantic context 15 with context definitions 104 of "Florida", "inexpensive trip", "recommended resorts", "parasailing activities", "Floridian adventure tours", "Miami nightclubs", and "Floridian travel and recreation activities" (an example of a super topic as a combination of all of the other context definitions 104), etc. The individual information 14 would also have individual information contexts 19 with assigned context definitions 105, for example the travel Web page would have the information context 105 "inexpensive trip" and "Florida" representing its information context 19, the hotel Web page would have the information context 105 "recommended resorts" and "Florida" representing its information context 19, and the recreation information (e.g. travel brochure document) would have the information context 105 "parasailing activities", Floridian adventure tours", "Miami nightclubs" representing its information context 19. It is recognised that the context definitions 105 of the individual information contexts 19 are dynamically aggregated from the context definitions 104 of the semantic context 15 for the collection of individual information 14 also referred to as the search information set 154 and the semantic context is also referred to as the search context 156, see FIG. 10. As new information 14 (for example a list of recommended Floridian all-inclusive resorts) is obtained by the user, as further described below, the context engine 100 would determine the context definitions 105 (for example "resort", "best recommended", "Floridian", "all-inclusive") of the information context 19 for the new information 14, and then compare to determine if the new information 14 and/or its information context 19 should be added/aggregated with the information collection and the semantic context 15.

It is recognised that the context definitions 104, 105 can provide identification, categorization, descriptive, and/or labelling information about the information 14. It is recognised that the user may let the context engine 100 determine the context definitions 104, 105 for the information 14, accessed by the user, for use in creating the information context 15, 19, and/or the user can specify context definitions 104, 105 for use by the context engine 100 in generating the contexts 15, 19. For example the user can select certain words, or combinations of words, in the information 14 for use in determining the context definitions 104, 105.

For example, the context 15, 19 is comprised of SuperTopics, Topics and patterns (e.g. context definitions 104, 105), where each is built upon the other (i.e. the Supertopics are built from the Topics which are built from the patterns, such that SuperTopics can be considered a further summarization of topics). Each of the patterns includes the words in the patterns and the words relative frequency in the analyzed document (e.g. information 14). These structures (e.g. SuperTopics, Topics and patterns) are augmented in the memory 210 by references to the documents (e.g. information 14) where the structure was discovered. Also, all words of the structures are represented by a key in the memory 210 that points to a global dictionary 109 (see FIG. 2) that includes language global statistics identifying each of the words Wn, their unique indicator In (e.g. unique integer or other value) and its global self-information (e.g. relative frequency) in the global word set (e.g. language) that includes each of the words Wn. It is recognised that the global statistics can come from word Wn use in the language and/or from training with a body of documents. You can also have medical, legal and (specialized (e.g. technical) biases in the dictionary 109 given any differences in word Wn use.

The user 104 could be allowed to subsequently monitor (e.g. add, modify, or delete) the context definitions 104, either explicitly (e.g. providing the actual words/phrases) or implicitly via the association of information 14 containing potential words/phrases for use by the context engine 100 in determining the context definitions 104. For example, the user could instruct the context engine 100 to include one or more document contents for use in creating or otherwise amending the semantic context 15 of the FoR 12. It is also recognised that the context engine 100 could automatically (e.g. without receiving direction from the user) include information 14 accessed by the user for use in determining the context definitions 104 of the semantic context 15. The user could expect that the context definitions 104 would be actively associated/ used in subsequent processing of the search requests 18 and/or results 20, unless otherwise advised (e.g. by the context engine 100).

Referring again to FIG. 2, the context definitions 104 are determined from the information 14 based on pattern recognition algorithms (e.g. pattern clustering and data grouping of a rule set 103) of the content analyzer module 102. The pattern recognition extracts information context 19 from the information 14, including determined context definitions 105, that was selected (or is otherwise selected for comparison purposes) for association (or determination of association potential) with the semantic context 15, and then the module 102 dynamically updates the context definitions 104 using the determined context definitions 105.

The context definitions 104, 105 can be single/multiple alpha and/or numeric descriptors (e.g. words) used to categorize or otherwise label content of the information 14 so that the content engine 100 can best match the information 14 to the semantic context 15 of the user for their project at hand. The context definitions 105 are (relevant) word(s) or term(s) or phrases (and patterns thereof) associated with or otherwise assigned to the information 14 (e.g. documents, pictures, articles, video clips, blogs, etc.), thus describing the information 14 and enabling a descriptive/word-based classification of the information 14 as the information context 19.

For example, the context definitions 104, 105 can be defined as including n-order patterns, where one word is a first order pattern, two associated words are considered a second order pattern, three associated words are considered a third order patter, four words are considered a fourth order pattern, and five associated words are considered a fifth order pattern, etc. The context definitions 104, 105 are comprised of the words, which are included in word patterns/groupings, as further described below. The context definitions 104, 105 are formed from selected (e.g. based on a pattern importance threshold) word patterns that have been formed from the selected (e.g. based on a word importance threshold) words. For example, the case where a pattern maps to what would be termed one keyword is the case where there is a first order pattern.

Further, while a relatedness measure of the information 14 may represent its relevance to the semantic context 15 (i.e. comparison of contexts 104, 105 for determination if a match exists between selected individual information 14 and the information 14 of the semantic context 15), negative/filter context definitions 104 may also be created to filter undesirable information 14 content from the collection of information 14 associated with the semantic context 15. For example, negative context definitions 104, 105 may include definitions for advertising material, pornographic material, or simply material that is identified by user as undesirable. The user, to help identify material as undesirable, can create negative context definitions 104, 105 and instruct the context engine 100 to assign them to the respective information contexts 19 of the individual information 14 and/or to the semantic context 15 representing the collection of information 14.

Also, the context engine 100 may automatically identify and assign the negative/filter context definitions 104, 105 based on suggested (e.g. by the user) of negative/filter material (e.g. word(s), phrases, specified documents, etc.) for use by the context engine 100. For example, the user could specify information 14 (e.g. a number of Web sites/pages, documents, etc.) that contains objectionable/undesirable material. The context engine 100 would then use the analyzer module 102 to determine the context definitions 105 for the information contexts 19 of the identified undesirable material. The user could allow the context engine 100 to automatically assign these determined context definitions 105 (representing undesirable information 14) to the context definitions 104 of the semantic content 15 and/or can actively select which of the determined context definitions 105 should be assigned. The user could also suggest some word(s) and/or phrases for use by the context engine 100 to assist in the generation of the context definitions 105 of the questionable information 14. For example, the user could force the context engine 100 to use specified words (e.g. "sex", "advert", etc.) that may otherwise be culled from the context definitions 105 generation process (described below) due to a lack of importance determined for the specified words/phrases and/or the patterns associated with the specified words/phrases.

It is recognised that in the case of determined context definitions 105 representing undesirable information 14, the determined context definitions 105 are added to the semantic context 15 but the associated undesirable information 14 may not be added to the collection of information 14 associated with the semantic context 15. Otherwise, the undesirable/filtered information 14 could be added to a filtered information folder, for review by the user to help evaluate the performance of the context engine 100 in identification of undesirable material. Accordingly, the negative/filter context definitions 104, 105 can be included within a negative context and associated with the current semantic context 15 that is representative of the desired material (e.g. collection of information 14) of the user. Each semantic context 15 can both positive and negative context definitions 104 associated with the semantic context 15. As well, the global information set 109 (see FIG. 2) may also have any number of global negative filters (e.g. context definitions 104) for automatic/manual selection to the semantic context 115. Examples of global negative filters could be related to advertising terms and material or to pornographic materials.

For example, each context 15 can have a negative context associated with it. Material can be added to the negative context in the same manner as the positive context except that the user has identified the material (e.g. information 14 used to identify negative context definitions 104) as undesirable. In the case of other filters, say pornography, the negative context definitions 104 can be global (e.g. listed in the dictionary 109) and the user may not need to take any action to create a predefined global filter (containing all or selected portions of the negative context definitions 104 available in the dictionary 109) that is accessible by the system 10 (e.g. the dictionary 109 is loaded a semantic context 15 with undesirable patterns). In the end, the score for information 14 can be the positive context score (i.e. the match of the context definitions 105 obtained from the information 14 with the positive context definitions 104 of the semantic context 15) less the negative context score (i.e. the match of the context definitions 105 obtained from the information 14 with the negative context definitions 104 of the semantic context 15). If patterns overlap in the positive and the negative context definitions 104, 105 the score for the information 14 can be reduced for that pattern on the positive side (but not eliminated). Accordingly, it is recognised that the contexts 15 can have both positive and negative context definitions 104 associated therewith.

The context definitions 104, 105 can be stored in a SQL database format (e.g. Microsoft SQL 2005) to store all the contextual information 104, 105. The SQL database format is one example used for the retrieval and management of the context definitions 104, 105 in a relational database management system (RDBMS). The SQL database format provides for querying and modifying of the context definition 104, 105 data and for managing the database (e.g. memory 210—see FIG. 4), through the retrieval, insertion, updating, and deletion of the context definition 104, 105 data in the memory 210. The SQL language for access of the context definitions 104, 105 in the memory 210 can include the following example language elements, such as but not limited to: Statements which may have a persistent effect on schemas and data of the memory 210, or which may control transactions, program flow, connections, sessions, or diagnostics; Queries which retrieve context definitions 104, 105 based on specific criteria; Expressions which can produce either scalar values or tables consisting of columns and rows of data for the context definitions 104, 105; Predicates which can specify conditions that can be evaluated to SQL three-valued logic (3VL) Boolean truth values and which are used to limit the effects of statements and queries, or to change program flow; Clauses which are (in some cases optional) constituent components of statements and queries; Whitespace which can be ignored in SQL statements and queries.

In a further embodiment, the context definitions 104, 105 can be metadata involving the association of descriptors with objects and can be embodied as the syntax (e.g. an HTML tag/delimiter such as a coding statement) used to delimit the start and end of an element, the contents of the element, or a combination thereof. The context definitions 104, 105 can be defined using a structured definition language such as but not limited to the Standard Generalized Markup Language (SGML), which defines rules for how a document can be described in terms of its logical structure (headings, paragraphs or idea units, and so forth). SGML is often referred to as a meta-language because SGML provides a "language for how to describe a language." A specific use of SGML is called a document type definition (DTD), which defines exactly what the allowable language is. For example, HyperText Markup Language (HTML) is an example of a structured definition language for defining the context definitions 104, 105. A further example of the structured definition language is eXtensible Markup Language (XML), which defines how to describe a collection of data. Accordingly, the context definitions 104, 105 can be used to provide an underlying definition/description of the contexts 15, 19, as well as to help define the state of the FoR 12 applications used to generate or otherwise manipulate (e.g. amend, view, etc.) the information 14. For example, HTML delimiters can be used to enclose descriptive language (e.g. context definitions 104) about an HTML page, placed near the top of the HTML in a Web page as part of the heading.

It is recognised that both the context definitions 104, 105 are used by the context engine 100 to identify related information 14 appropriate to the search request 18 context, as well as to organize the state of the FoR 12 applications associated with the information 14 (e.g. organization of the most pertinent emails in Outlook, organization of the most relevant documents in Word, organization of the most relevant browser links, etc). It is also recognised that the context definitions 105 determined from the information 14 can be used to help rank the information 14 with respect to the context definitions 104 of the semantic context 15, i.e. the degree of similarity between the context definitions 105 determined from the information 14 with the context definitions 104 of the semantic context 15, as further described below with reference to the process 300 (see FIG. 5). It is recognised that if a suitable degree of similarity is found between the context definitions 105 of the information 14 and the context definitions 104 of the semantic context 15, the context definitions 105 of the information 14 may be added to the context definitions 104 of the context 15, in order to update the semantic context 15 to represent that the information 14 is part of the information 14 set of the user represented by the semantic context 15.

It is also recognised that a user could have added any unrelated information 14 (e.g. documents) to the body of information 14 associated with the semantic context 15. There can be instances where the system 10 pre-tests (e.g. identifies context definitions 105 and then matches those against the context definitions 104 of the semantic context 15) the information 14 for membership in the body of information 14 associated with the semantic context 15, or just adds the information 14 to the body of information 14 associated with the semantic context 15 irrespective as to whether the information 14 contains matching context definitions 105 or not. For example, the user can simply specify to the system 10 that the information 14 should be added. In other instances, it is recognised that the system 10 would only add the information 14 when the content of the information 14 has been processed and has been deemed to have a score that identifies it as related material.

Context Engine 100

Referring to FIG. 2, the context engine 100 manages and uses the contextual information of the semantic context 15, as the user works to create or compile documents and other data within the FoR 12. Each piece of user-manipulated information 14 (e.g. a document) that is associated (manually, automatically, semi-automatically) with the semantic context 15 is analyzed. FoR 12 context definitions 104, 105 are used by the context engine 100 to direct and augment web searches 18 and/or to then prioritize the search results 20, whether they are across the entire Internet 11, or local to an enterprise (e.g. local network of computers) or the user's own computer 101. For collaborative purposes via the collaboration engine 150, this topic information of the semantic context 15 and/or the information content 19 can be used to find colleagues in the enterprise that are working on the same subject matter while adhering to privacy and security policies, for example. It is also recognised that the collaboration can be facilitated between the user and other users of the system 10 over the Internet 11, as desired see the collaboration environment 140 described below. In addition, the context engine 100 uses these determined topics (e.g. context 15, 19) to categorize and annotate the information 14 and their associated programs of the FoR 12, where desired. This annotation of the information 14 can be a done in enterprises prior to submitting the information 14 (e.g. documents) to enterprise search engines 24 and/or document management systems. For example, the system 10 can be configured to store or otherwise associate the determined information context 19 with the respective information 14 stored in the memory 210 (e.g. represented by a database).

The context engine 100 can be actively or passively directed to include user-manipulated information 14 for analysis by a content analyzer 102 (see FIG. 2), in order to dynamically modify the semantic context 15 of the FoR 12. An example of active direction is where the user chooses one or more of the information 14 to be assigned to the semantic context 15 (e.g. used to help further define/generate the semantic context 15 of the FoR 12 by the context engine 100). An example of passive direction is where the context engine 100 is configured to automatically choose (e.g. without manual user interaction) any information 14 manipulated (e.g. created, amended, accessed nor otherwise obtained, etc.) by the user in interaction with the information sources 16 and/or the local storage 17. For example, the context engine 100 could determine appropriate context definitions 105 determined from those search results 20 that the user selected from search results 20 list (e.g. by clicking on the links from the list) and add those appropriate context definitions 105 to the semantic context 15, while choosing to ignore those search results the user did not select from the search results 20 list (e.g. by not clicking on the links from the list).

It is also recognised that the selection of information 14 for use in semantic context 15 generation could be automatically suggested to the user by the context engine 100, for example using a display prompt, which provides the user the ability to either accept or reject association of the selected information 14 to the semantic context 15. It is recognised that when the selected information 14 is selected to be associated with the semantic context 15, the context engine 100 determines any context definitions 105 (via the content analyzer 102) resident in the selected information 14 and then updates the context definitions 104 of the semantic context 15 with these newly determined context definitions 105, thereby providing for a dynamic update capability of the semantic context 15.

It is recognised that another embodiment of association of the selected information 14 with the semantic context(s) 15 of the FoR 12 can be using time-based passive direction. For example, the search results 20 can be used to positively refine the context definitions 104 of the semantic context 15 if the user stays on (i.e. interacts with) the destination resource for more than a predefined period of time (e.g. 45 seconds) and can also be used to negatively refine the context definitions 104 of the semantic context 15 if the user closes the destination resource within a predefined period of time (e.g. 5 seconds). Also, the information context 19 of the information 14 (e.g. files or web content) can be added automatically to the semantic context 15 when the user moves the information 14 (e.g. actual file or a link to information 14) into a monitored area of the FoR 12, such as "My Document" or their desktop, for example. In the case of a webpage as the information 14, adding the information to "My Favourites" of the browser application would automatically add the associated information context 19 to the semantic context 15. It is recognised that there could also be other well-known places (e.g. monitored areas) associated with other applications of the FoR 12.

Referring to FIG. 2, shown is one embodiment of the context engine 100 for processing of search requests 18, providing search results 20 to the user, and updating of the semantic context 15 based on the determined context definitions 105 resident in the newly acquired information 14 of the search results 20 for those newly acquired information 14 deemed (by the context engine 100 and/or manually by the user).

The context engine 100 includes the content search module 106 for receiving the search requests 18 and/or search results 20 for processing (e.g. amending the parameters 22 (see FIG. 1) of the search request 18 by adding additional parameters 22 according to the contents of the semantic context 15), a content analyzer module 102 for analyzing the content of the search requests 18, search results 20 and any other information 14 interacted with by the user for determining appropriate context definitions 105 resident therein (according to a set of context determining rules 103). If it is determined that new context definitions 105 determined from the information 14 do not match any of the context definitions 104 of the semantic context(s) 15, then the content analyzer module 102 is configured for creating a new semantic context 15 using the unmatched context definitions 105. Also included is a program update module 108 for updating the state of any applications associated with the FoR 12.

Content Analyzer Module 102

The content analyzer module 102 can be instructed to analyze specific information 14 for any resident context definitions 105 via a menu provided by the user interface 202 (see FIG. 4). A preferred embodiment uses a tray icon to allow the user to access the context menu that facilitates information 14 to be chosen for association with the semantic context 15.

As examples, identification of information 14 content to be included in the semantic context 15 can be done implicitly and/or explicitly. Explicitly included content are information 14 (e.g. documents) identified by the user. For example, a "right click" on files or folders by the user and then a selection of a menu choice to add to the semantic context 15 would result in the selected information 14 being made available to the content analyzer module 102 for context definition 105 analysis.

Further, information 14 content may be implicitly included with the semantic context 15 by monitoring the creation or access of information 14 (e.g. documents or other data resources) by the user from within the FoR 12. Otherwise, information 14 documents may be implicitly included with the semantic context 15 by examining where the information 14 is located in the local memory 210 (and/or which source 16 the information originated from). For instance, information 14 located in the My Documents folder for the FoR 12 may be implicitly included in the semantic context 15 via the content analyzer module 102. Another option is for Web pages, which may be implicitly included in the semantic context 15 by the user simply viewing them (e.g. for a pre-determined period of time or by the user identifying by a toolbar based control that the page (URL) should be included in the semantic context 15.

Further, the content analyzer module 102 uses a pattern clustering and data-grouping algorithm (e.g. rule set 103) to extract key topics (e.g. context definitions 105) from the chosen information 14 to be used as new context definitions for use in amending the context definitions 104 of the semantic context 15.

In the case of collaboration (e.g. anonymous), see FIG. 10, an example would be users Un sharing search results 20 and/or search information sets 154. As the user Un searches the Internet and/or a file system (e.g. database) the module 102 builds context definition 104, 105 data based on the user's Un activities, which triggers material being added to the semantic context 15. These triggers can include reading results in the browser, identifying results 20 (e.g. documents) as relevant or irrelevant (e.g. storing the results 20 in a pre-defined folder or file of an application), bookmarking results 20 or adding links to the users file system. It is recognised that the module 102 can track the user's activities by monitoring the file system and browser behaviour for example.

Content Rule Set 103

Figure 5:
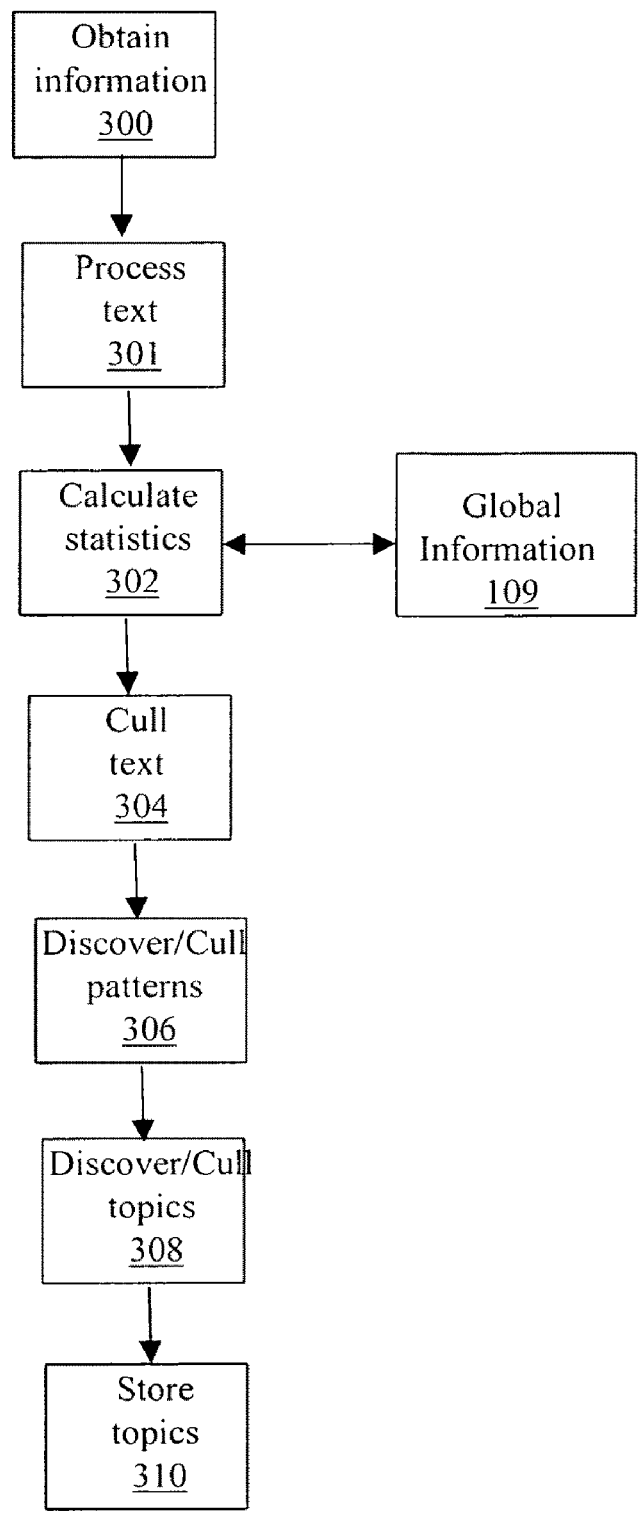
FIG. 5 is a flowchart of operation of the context engine of FIG. 3.

Referring to FIGS. 2 and 5, shown is an example content rule set 103 used by the content analyzer module 102 for extracting topics (e.g. textual portions 17 such as but not limited to: a word and a grouping of words) from the chosen information 14 to be used as context definitions 105 for use in amending or otherwise creating the semantic context 15. It is recognised that in the case of two or more words being included in the textural portion 17, these words may be adjacent to one another (e.g. considered as a multiword phrase) in the text of the information 14, may be separated from one another by one or more intermediately positioned words in the text of the information 14, or a combination thereof. The context definitions 105 can also be referred to as self-information of the analysed information 14. The self-information can be referred to as a measure of the information content associated with the outcome of a random variable, expressed in a unit of information, for example bits, depending on the base of the logarithm used in the expression used in determination of the self-information. For example, the amount of self-information contained in a probabilistic event can depend on the relative probability/frequency of that event, i.e. the smaller the relative probability/frequency, the larger the self-information associated with receiving the information that the event indeed occurred. Further, the measure of self-information can have the property of: if an event C is composed of two mutually independent events A and B, then the amount of information at the proclamation that C has happened equals the sum of the amounts of information at proclamations of event A and event B respectively. Taking into account this property, the self-information/($\omega_n$) (measured in bits) associated with outcome $\omega_n$ can be determined as:

$$I(\omega_n) = \log_2\left(\frac{1}{Pr(\omega_n)}\right) = -\log_2(Pr(\omega_n))$$

In the context of processing of the information 14, for example, IL(Wn)=−log2(Pr(Wn)) where Pr is the probability (e.g. relative frequency) of a word Wn (or other textual portion) being found in the information 14 (e.g. in a document or in a subset of the document such as a section, paragraph, page, etc.). Further, for each word/textual portion Wn in the information 14 (e.g. document), a measure of the Importance IMP(Wn) for the word/textual portion Wn can be determined as:

IMP(Wn)=IG(Wn)−IL(Wn), where IL(Wn) is the Local Self-information (LSI) of the word/textual portion Wn and IG(Wn) is the Global Self-information (GSI) of the word/textual portion Wn.

In other words, the Local Self-information (LSI) can be described as the relative probability/frequency of occurrence of the word/textual portion Wn in the local information 14 (e.g. the document) under consideration and the Global Self-information (GSI) can be described as a predefined (e.g. already known) relative probability/frequency of occurrence of the word/textual portion 17 in global information 109 set (e.g. a language defined as a vocabulary of words and/or phrases such as a dictionary, a grouping of documents and/or other information sources, etc.). Accordingly, the measure of importance of a selected textural portion 17 can be determined based on both its relative probability/frequency of occurrence in the selected document and its relative probability/frequency of occurrence in the global set of information 109 that can include words/phrases from documents (e.g. a grouping of documents, a dictionary, etc.) other than (or in addition to) the selected document.

In view of the above, relative local frequency of the word in the selected information 14 is compared to the other words in the selected information 14 (used for calculating I local) and the relative frequency of the word in the global word set (e.g. dictionary 109) as compared to the other words in the global word set (used in calculating I global). The global word set is represented as a language that can be symbolized as a collection of documents from which the global relative frequency values are calculated. These global values are stored in the dictionary 109 for each word contained in the dictionary 109. The importance calculations take into account the relative frequency of the word in the information 14 versus its relative frequency in normal language use or the training set of documents. In a preferred embodiment the difference between local and global self-information provides such a measure.

It is recognised that the words Wn contained in the dictionary 109 can include jargon or user define terms identified (e.g. by the user) within information 14 (e.g. by the user).

These user-identified words Wn can be given or otherwise assigned (e.g. by the context engine 100) a default global self-information that is very high (e.g. corresponding to a word Wn that rarely occurs in the language), thus these identified words Wn can be treated as any other word. Further, the dictionary 109 can be embodied as containing multiple languages and/or specific dictionaries.

Further, the GSI can be described as the words use in the (e.g. English) language at large, for example. The GSI used in the dictionary 109 is derived from processing the relative frequencies of the words contained in a large number of books and documents across the language. For each language there can be a dictionary 109 that contains the GSI measures that have been calculated for the words used in that language. Different GSIs can be calculated for nonstandard use of the language as may occur in documents related to engineering, legal or medical material. In this case the GSIs for words can be assigned to words that are trained from materials, for instance, with a medical bias.

In any event it is recognised that the determination of the content definition 105 of the information 14 being considered/analysed is done with consideration of the relative frequency of the content definition 105 in the information 14 (e.g. local relative frequency) in view of the relative frequency (e.g. global relative frequency) of the content definition 105 in the global information set.

Referring again to FIG. 5, the rule set 103 can include step 300, where the information 14 (e.g. one or more documents, a search result listing such as from a search engine or document management system, text portions such as paragraphs from a document, presence in a location of interest such as My Documents or other place of interest in a user's file system, etc.) are presented to, or are otherwise received by, the context engine 100 as the result of user interactions/work activities with the FoR 12. At step 301, the contents of the information 14 are processed to create a series of events where each event 21 can be a recognized logical (e.g. predefined, either statically or dynamically) unit of text. For example, in a well formed information 14 set this recognized/identified logical unit can be a sentence, a paragraph or series of paragraphs, a page or pages, a line of text (a point) in PowerPoint, a cell, a row or other logical delineation in a MS Excel (that users of Excel would be familiar with) for HTML (or other web pages/content) a combination of sentences within the body of the web page(s)/content, and/or blocks of text logically grouped in the information 14 (e.g. in the page). Accordingly, the identification/recognition of the event 21 in the information 14 can be based on the definition mechanism for the event 21, the definition mechanism such as but not limited to: punctuation (e.g. period or comma); spacing (e.g. tab or white space); metadata (e.g. tags and/or delimiters for defining the start and/or end of the event 21 text content); document breaks (e.g. page breaks, line breaks, etc.); and others as is known in the art.

It is recognised that the information 14 can be in one or more formats (e.g. PDFs, Microsoft Office format, HTML, XML and other types of SGML and formats). Further, it is recognised that the event 21 structure can use other structures such as paragraphs within the document or logical divisions within the Web page(s) (e.g. HTML) such as <DIV>, <P>, etc., which denote logically grouped text within the information 14 or defined sections of the information 14. The information 14 may contain multiple languages or a single language. Accordingly, it is recognised that the rule set 103 can be implemented as language independent. In addition, each word can be stemmed as it is added to the event 21 list. For instance stop, stops, stopped, stopping are all added to the event 21 list as stop; while stopper could remain as stopper. It is recognised that each textual portion 17 can belong to one or more events 21 (e.g. a word can be part of a sentence that is part of a paragraph that is positioned on one or more pages that are part of a chapter or other defined information 14 section).

The result of the step 301 is a list of the events 21 that form the information 14, where each event 21 includes a list of the words (e.g. stemmed) and terms/phrases that form each event 21 as text strings. Accordingly, step 301 is used to break down the information 14 into a series of text strings, i.e. representing the contents of the identified events 21, such that each set of text strings represents the respective event 21 that is considered a logically grouped block of text of the information 14. Accordingly, each recognised/identified event 21 of the information 14 is considered to contain one or more textual portions 17.

At step 302, for each textual portion 17 (e.g. word or phrase) in the information 14 (represented now as a list of events 21), the Local Self-information is calculated, for example:

$IL(Wn) = -\log_2(Pr(Wn))$ where Pr is the probability (e.g. relative frequency of occurrence) of a textual portion 17 Wn being found locally in the information 14. Next, for each textual portion 17 in the information 14, a measure of the Importance for the textual portion 17 is calculated, for example:

$$IMP(Wn) = IG(Wn) - IL(Wn),$$

where IL(Wn) is the Local Self-information (LSI) of the textual portion 17 and IG(Wn) is the Global Self-information (GSI) of the textual portion 17. It is recognised that predefined values 111 for GSI of the textual portion 17 can be maintained in the global information 109 (e.g. a dictionary that can be stored in a database table, or any other data structure, in the memory 210—see FIG. 4) that maintains predefined GSI values for textual portions 17 in language.

For example, it is recognised that predefined values 111 for GSI of the textual portions 17 in the global information 110 can be trained by processing a large number of documents (or other information sources 14) to get statistics representative of the textual portions 17 (e.g. words/phrases) used in the language (e.g. the statistics can derived from frequency numbers of the frequency of occurrence of the textual portions 17 with respect to all other textual portions 17 in the language). Also, a unique integer or other representative value (e.g., hash code, GUID, . . . ) "In" is associated with each textual portion 17 (e.g. word Wn) in the information 14, as obtained from the global information 109. This integer/value is unique for each textual portion 17 stored in the global information 109 (e.g. dictionary).

Accordingly, each word of the textual portions 17 maps to the code In in the global information 109. If a code In does not exist for an encountered textual portion 17, then a code In entry is appended in the global information 109. This can happen for slang terms, monikers, abbreviations, etc. that occur in the information 14. Further it is recognised that these newly added codes In may only be done if the use of the identified textual portion 17 is considered important and is therefore involved in patterns that are going to make it through to the generation of the context definitions 104, 105. To be clear, the codes In can be assigned to each word Wn (and defined word phrase—for example medical phrases or other technical phrases where the words that make up the phrase are considered together) in the information 14. One example of this is the term "Accessory nerve", such that the combination of the words accessory and nerve are used together to define a type of nerve. In this case, the global information 109 could have an entry for "Accessory nerve" with an assigned code In for the entry treated as a word combination (e.g. phrase). Each word (or predefined word phrase) in an event 21 (e.g. a sentence), is represented by their corresponding code In obtained from the global information 109. As well, it is understood that the GSI values for the word and word phrases are also stored in the global information 109 and are fetched by the module 102 by a lookup.

It is recognised that in view of the above-described embodiments of the word(s) or predefined word phrase in the events 21, compound terms may or may not be configured for use by the system 10, as desired. For example, the user may use the context engine 100 for automatic identification of compound words (e.g. word phrases) in the identified patterns of the processed information 14, if the identified compound word was deemed important (e.g. satisfied an importance threshold).

The result of this step 302 is that the unique value In (e.g. integer) is assigned to each textual portion 17 identified in the information 14 and the GSI, LSI and IMP have been calculated for each textual portion 17 identified in the information 14. Accordingly, an all value (e.g. integer) event 21 list can now present in addition to the original list of events 21 represented as text strings. As described, each event 21 (a sentence or other block of text, e.g. paragraph, section, chapter) is comprised of the list of words Wn that were present in event 21 of the information. The information 14 then becomes a list of events 21 where each event 21 is a list of the codes In (e.g. integers) that represent each word Wn (or predefined word phrase) in the event 21. As described below, patterns are found between the events 21 within the information 14. Also, words like "I" and "am" have been considered as having little substantive information content, and so words like these may never make it to patterns and end up being culled from the word list before association mining. It is also recognised that the global versus local calculations can be used to cull certain words Wn. It is typical that these words are culled but there may be (or may not be) a special table of predefined words Wn to cull.

The next step 304 of the rule set 103 is culling/deletion of some of the textual portions 17 present in the information 14, in view of their relative lack of importance with respect to the other identified textual portions 17 present in the information 14. In other words, IMP of the textual portion 17 (IMP=GSI−LSI) gives a measure of the textual portion's 17 importance within the current information 14 under consideration. In general, the higher the IMP (an example of the relative importance between textual portions 17) the more important the textual portion 17 is to the information content of the information 14 under consideration. One advantage of this technique is that textual portions 17 can be culled from further processing based on information content. This could also automatically include words like articles and conjunctions (e.g. the, and, but, or . . . ) that could be considered to contain relatively negligible information (i.e. represented by having lower values assigned in the global information 110 as compared to other textual portions 17 that are considered less relatively frequent/common in the global information 109). It is recognised that for example, in contrast, the textual portions 17 that are less relatively frequent/common in the global information 109 would be considered more important and therefore have higher values 111 assigned than those of the textual portions 17 that are considered to contain/represent the relatively negligible information. It is also recognised that the more important textual portions 17 could be assigned a lower value 111 as compared to higher values 111 for the less important textual portions 17, as desired.

Accordingly, filtering out or otherwise removing from consideration certain textural portions 17 from the content of the information 14 can be done using the assigned values In (and their calculated LSI) and not by using special dictionaries (or other word lists) to identify the specific textural portions 17 to filter. Thus, the textural portions 17 (e.g. words) in the information 14 (e.g. document) each receive similar treatment through their assigned values 111 from the global information set 109. Accordingly, the filtering out of certain textural portions 17 from the content of the information 14 can be done by comparison of their determined IMP value with respect to an IMP inclusion threshold value (e.g. any IMP value for a textural portion 17 being less than the IMP inclusion threshold would be a candidate for removal of the textural portion 17 from further consideration). Also realized is that this filtering can also be done by considering their GSI value and using an importance threshold and a GSI threshold to cull.

Therefore, the importance threshold can be used to determine which words below which will be culled from the information 14. This threshold can be tuned to increase or decrease the percentage of textual portions 17 culled. For instance, to decrease computational requirement for pattern clustering and data grouping (PCDG) performed in later steps, it may be desirable to increase the percentage of textual portions 17 culled from the information 14 based on the total event 21 count (number of events 21 containing the textual portion 17) of the textual portion 17 or the total number of unique textual portions 17 within the information 14, e.g. the textual portion 17 only occurs a limited number of times (e.g. once) in the information 14. A large information 14 set typically contains more sentences (e.g. events 21) and unique words (e.g. textual portions 17) than a smaller information 14 set.

The result of this step 304 is that the event 21 lists for the information 14 now contain the subset of the textual portions 17 with the highest IMP (i.e., the textual portions 17 that were not culled/removed from further consideration for importance in the pattern discovery step 306 described below).

The next step 306 is for discovery/identification of patterns of the textual portions 17 in the information 14 and the removal of those patterns that are considered not as important as other more significant patterns. In this step 306, all patterns (e.g. defined as a determined association between one or more textural portions 17) contained in the information 14 are calculated. A pattern can be described as an occurrence of one or more textural portions 17 that occur in multiple events 21. For example, a number of pattern thresholds can be set in the collecting/identification of the patterns.

The frequency of patterns can be set as a threshold. For instance, if a pattern does not occur more than a certain number of times, it will be excluded from the list of patterns. As well, the pattern threshold can be set as a relative frequency pattern threshold, where only the relative top frequency number (e.g. top five frequently occurring) are selected for further processing. It is recognised that one example of a pattern is where two or more textural portions 17 are repeated in two or more different events 21 (e.g. two words are found together in a number of different sentences, hence indicating that they have a certain relationship to one another). It is also recognised that the relative location/position of the textual portions 17 in the events 21 can facilitate the identification of a pattern, e.g. two words are predominantly (e.g. always) found adjacent to one another, one word is predominantly (e.g. always) found in the first sentence of each paragraph or in the first paragraph of each page or in the title of each section, etc. For example, the value of 2 for small documents and 3 for larger documents can be used as a frequency threshold. Also, 1st order patterns (e.g. the ORDER of a pattern can be defined as the number of words (textural portions) in the pattern such that a first order pattern has one word, 2nd order has two, 3rd has three, etc . . . ) can be used in smaller documents to help maximize the number of patterns available in calculating topics. In larger documents, 2nd order and greater patterns can be used. For example, the context engine 100 can configure pattern mining to stop at 5th order patterns. It is recognised that if you lower the pattern order, patterns that are spatially related can still be clustered together).

It is recognised that integer representation of GSI and LSI values for the textual portions 17 in the events 21 can help facilitate enhanced computation performance in calculating the patterns. It is also recognised that as a result of the calculations and culling done in step 304, the patterns calculated in step 306 can be composed of textual portions 17 that may be most relevant (e.g. that have the highest IMP) to the information 14. Accordingly, textual portions 17 with low IMP (i.e. those deemed not to satisfy the importance threshold) are removed from the event list before pattern mining occurs in step 306. This can reduce the number of patterns that include insignificant words Wn (e.g. the, this, were, etc . . . ) and can reduce the calculations used to subsequently find the patterns and then weight, calculate the importance, then cull those the patterns. It is also recognised that step 304 can be an optional step done in determination of the context definitions 104 105.

Further, for each pattern the engine 100 can calculate the Importance (P-IMP) of the identified patterns. The first step in this is to calculate a pattern weight (PW(Pi)) for each of the identified patterns, for example as: PW(Pi)=sum (or other mathematical combination) of the IMP of the textual portions 17 that comprise the pattern, as P-IMP(Pi)=P-GSI–P-LSI and P-LSI=–log2(Pr(Pn))*PW(Pi).

As in the case of the GSI for textural portions 17 the P-GSI can be calculated by training with a large number of documents. For example, Pr(Pn) is the probability (e.g. relative frequency f occurrence) of finding a pattern within the information 14. Patterns can be trained from documents just as words to build the global information 109 of patterns. For example, the value of GSI for each of the textual portions 17 can be assigned a constant value for all patterns or can be assigned individual GSI values based on document training results. In any event, it is recognised that the GSI value can be the same or different for each of the textual portions 17, as specified in the global information 109. In the current embodiment the context engine 100 uses 24.0 as an example placeholder for the Global Self-information GSI for patterns. For example, 24 is chosen because it is a number that means the probability of finding a pattern in lower than 1 in 16,000,000. This number means that any P-GSI-P-LSI is greater than zero. The resultant calculations of the step 306 is that the context engine 100 has an ordered list of patterns such that the higher the P-IMP of the pattern the more important it is in representing the information 14.

As with step 304 for culling textural portions 17, pattern culling can be performed to include the most significant patterns contained within the information 14. This pattern threshold may be varied, as with textural portions 17, in relationship to the information size and the overall number of patterns discovered. Often with smaller documents the information thresholds are lowered to increase the data available for finding topics. It is recognised that pattern thresholds can be set dynamically to leave a sufficient number of textual portions 17 to find patterns and therefore determine context definitions 104105. The degenerate case is to make a pattern a context definition 104105 if the pattern has made it through the significance process but is not related to any other patterns.

The next step 308 is for the calculation of the context definitions 104, otherwise called Topics, which can be defined as one example semantic topology placed on the patterns of the information 14 wherein multiple information 14 pieces (e.g. multiple documents) may be used to form the semantic context 15, 19.

The set of important patterns that survived step 36 are passed to a pattern clustering algorithm (PCDG in this case). The output is a set of pattern clusters. The pattern clusters are patterns related in the information 14 by the textual portions 17 they contain and possibly by their position within the information 14. It is recognised that one example of a pattern clustering is where two or more textural portions 17 are repeated in two or more different events 21 (e.g. two words are found together in a number of different sentences, hence indicating that they have a certain relationship to one another). It is also recognised that the relative location/position of the textual portions 17 in the events 21 can facilitate the identification of a pattern cluster, e.g. two words are predominantly (e.g. always) found adjacent to one another, one word is predominantly (e.g. always) found in the first sentence of each paragraph or in the first paragraph of each page or in the title of each section, etc. The prototypical pattern in PCDG is the set of textural portions 17 that covers all the patterns in the cluster. Again, the fact that all textural portions 17 are represented as integers in this step 308 can facilitate computational performance of the calculation.

For example, step 308 can use the elements (words) in the patterns along with their position within the event 21 structures to cluster patterns (i.e., form context definitions 104, 105). This means that patterns sharing a word/phrase could end up in the same cluster. Also, lower order patterns that consistently occur within the same event 21 could end up in the same cluster. For example, a pattern prototype is the set of words/phrases in the patterns that comprise the context definition 104, 105. In some cases it is a proper subset of the words Wn in the patterns that comprise/form the context definitions 104, 105.

Accordingly, the context engine 100 represents the determined topics (e.g. context definitions 104) as a set (cluster) of patterns. The engine 100 maintains a word/phrase list for the topic (cluster) that is coincident with the prototype pattern for the cluster. As with patterns and textural portions 17, context definitions 104, 105 can be prioritized based on the importance of textural portions 17 contained within the context definitions 104 words (pattern prototype) and/or the importance of patterns. A set of context definitions 104, 105 represents the semantic topic matter of the information 14/semantic context 15. For example, context definitions 104 combined from one or more documents represent the semantic content 15 of the group of documents.

In the next step 310, the engine 100 stores the context definitions 104 (as well as the words, patterns represented by the content definitions 104) for the information 14 are stored within the memory 210 (e.g. a relational database—MS SQL Server 2005) along with the results of statistical calculations. One feature to keep the storage of the context definitions 104 compact is that the integer representation for textural portions 17 are used in the memory 210, save and except the dictionary (e.g. global information 109) that maintains the mappings between textual portions 17 and integer (or other value In) along with global textural portion statistics.

Accordingly, in view of the above, content included within the context is analyzed for pattern relationships using the analysis rules 103. In the case of text, in a preferred embodiment, associations (patterns) use sentences as an event 21. In the case of a spreadsheet (or database type data formats) pattern analysis techniques are used where the records or cells are events 21. The patterns found within the information 14 are used to form the topics (i.e. context definitions 104) using Pattern Clustering and Data Grouping rules. Further, topics can be clustered into Supertopics to further summarize the data within the semantic context 15. The semantic context 15 can include; document references, words, patterns, topics, Supertopics, which are maintained/updated as new information 14 is analysed by the content analyser module 102. A Standard SQL database, for example, can be used to update/maintain the context definitions 104 of the semantic context 15. The SQL database can be global to all context definitions 104 of the semantic context 15; however, all information can be hierarchically organized to identify the semantic context 15 to which the information 14 is relevant (note: the same context definitions 104 may be used to define multiple information 14.

Further, the content analyzer module 102, via the analyzer rules 103, creates a web of knowledge (i.e. interconnections between the individual context definitions 104) between words, patterns, semantic structures and data identified in the information 14. This web can be accessed hierarchically in any number of ways and overlaid with new relationships at anytime. This means that information within the semantic context 15 can be organized and accessed at any level. This includes topics (subject matter), patterns, key words, paragraphs, sentences and other language structures. In practice this means that subject matter can be organized and/or accessed by a user based on its subject matter (topics) or from the actual text in the information 14. For instance, a user can click on a paragraph referring to a specific topic (i.e. context definition 104) and the context engine 100 can identify all the sections of other information 14 (e.g. documents) that are relevant to that topic. For example, any material, a document or part of a document, can be used to create context 15. In the case of a paragraph (think of it as a small document) the context engine 100 uses the information measures and patterns to find the most important textual portions 17. This information can be used to construct a new search to find related information or it can be used to test against the user's existing contexts 15.

It is recognised that the above described rule set 103 can be used to determine context definitions 105 for selected individual information 14 (for possible addition to the user collection of information 14) and/or used to determine combined context definitions 104 (e.g. super topics from an existing set of context definitions 104 of the semantic context 15.

In view of the above, summarized versions of the context definitions 104 can be calculated as summarized context definitions 104, 105, also referred to as SuperTopics, which can be referred to as a summary of context definitions 104, 105 with no regard for the document source (e.g. summarization of context definitions 104, 105 for multiple documents). In calculation of the summarized context definitions 104, 105, first the cluster of the "pattern prototypes" for the context definitions 104, 105 is obtained and then the words Wn in the pattern prototypes for each summarized context definitions 104, 105 are ranked based on a mix of importance and mutual information (see mutual information definition below). The summarized context definitions 104, 105 are the new prototypes (for example capped at 16 words for database compactness) associated with all the patterns that formed the context definitions 104, 105 that comprise the summarized context definitions 104, 105.

The following is an embodiment of the calculation of the summarized context definitions 104, 105.
1) Gather context definitions 104
   a. Load in all the context definitions 104 for the context 15
   b. Build up WordStats objects for all the words Wn specified in all the context definitions 104, including:
      i. Global self information (from Words table—e.g. dictionary 109)
      ii. Local self information=−log2 (local count of word/total context word count)
      iii. Importance=global self information−local self information
   c. Build up TopicDictionary (list of list of context definitions 104)
2) Cluster context definitions 104
   a. Create a context definition 104 cluster for each context definition 104
   b. Target # of context definition 104 clusters=(# of context definitions 104)/(log2 (# of context definitions 104))+minimum number of the summarized context definitions 104 (e.g. 1)
   c. Build similarity matrix for context definitions 104 (clusters) by counting the # of words similar between each context definition 104 pair
   d. While # of context definition 104 clusters>target (and there exist pairs that are different but similar)
      i. Find the closest/similar pair and combine context definitions 104 to the larger cluster then remove the added context definitions 104 from the general available collection of context definitions 104
      ii. Similarity measures currently use the "average similarity" e.g. (sum of all similarities in both clusters)/((# of topics in cluster 0)*(# of context definitions 104 in cluster 1))
   e. Commit context definition 104 clusters to database
3) Generate summarized context definitions 104
   a. Rank the number (e.g. 16) most important words Wn in each context definition 104 cluster using the following formulas:
      i. Word Importance=(global self information−local self information)*mutual information
      ii. Word Frequency=summation of all word frequencies from one single context definition 104 (pattern) per document per context
      iii. Global self information=Global self information from Words table
      iv. Local self information=−1*log(word frequency/# of words)/log(2)
      v. Mutual Information=log((a*t)/(c*b))/log(2); where
         1. a=# of context definitions 104 in context definition 104 cluster which contain the word
         2. b=# of context definitions 104 in context 15 which contain the word
         3. c=# of context definitions 104 in context definition 104 cluster
         4. t=# of context definitions 104 in context 15
   b. Remove all current patterns to summarized context definitions 104 associations for the context 15
   c. Remove all the current summarized context definitions 104 for the context 15
   d. For each context definition 104 cluster:
      i. Commit summarized context definitions 104 to the database
      ii. Find all patterns associated with the keywords (max of 16)

iii. Rank all patterns found according to the patterns' context weight:
   1. Context weight=(log(pattern frequency in context)/log(2))*(pattern weight); where Pattern weight=summation of all word importances calculated in ranking of the context definition 104 clusters (see a)
e. Cull off to a maximum # of patterns per summarized context definition 104 (e.g. context definition 104 cluster)=(# of keywords*1.5)+1
f. Commit Patterns to summarized context definition 104 associations
g. Remove context definition 104 clusters from database In view of the above, in probability theory and information theory, the mutual information, or transinformation, of two random variables can be a quantity that measures the mutual dependence of the two variables. The most common unit of measurement of mutual information is the bit, when logarithms to the base 2 are used. Formally, the mutual information of two discrete random variables X and Y can be defined as:

$$I(X;Y) = \sum_{y \in Y}\sum_{x \in X} p(x,y) \log\left(\frac{p(x,y)}{p_1(x)p_2(y)}\right),$$

where p(x,y) is the joint probability distribution function of X and Y, and p1(x) and p2(y) are the marginal probability distribution functions of X and Y respectively. Assume a base for the log of 2.

Further, intuitively, mutual information can measure the information that X and Y share: it measures how much knowing one of these variables reduces our uncertainty about the other. For example, if X and Y are independent, then knowing X does not give any information about Y and vice versa, so their mutual information is zero. At the other extreme, if X and Y are identical then all information conveyed by X is shared with Y: knowing X determines the value of Y and vice versa. As a result, the mutual information is the same as the uncertainty contained in Y (or X) alone, namely the entropy of Y (or X: clearly if X and Y are identical they have equal entropy). Mutual information quantifies the distance between the joint distribution of X and Y and what the joint distribution would be if X and Y were independent. Mutual information is a measure of dependence in the following sense: I(X;Y)=0 if and $$\log\left(\frac{p(x,y)}{p(x)p(y)}\right) = \log 1 = 0.$$

only if X and Y are independent random variables. This is easy to see in one direction: if X and Y are independent, then p(x,y)=p(x)×p(y), and therefore:

Content Search Module 106

The content search module 106 is used by the context engine 100 to provide for enhanced information 14 retrieval to the user that is relevant in view of the semantic context 15. For example, the information 14 can be obtained from desktop (e.g. FoR 12), enterprise and Internet search results 20 and appropriate information 14 can be chosen by the user and/or the context engine 100 for analysis by the content analyzer module 102. For example, an outbound search request 18 can be augmented by the content search module 106 using precise topic information (i.e. context definitions obtained from the semantic context 15). Further, inbound data (i.e. information 14) from the search results 20 is screened and prioritized via the content analyzer module 102.

Figure 3:
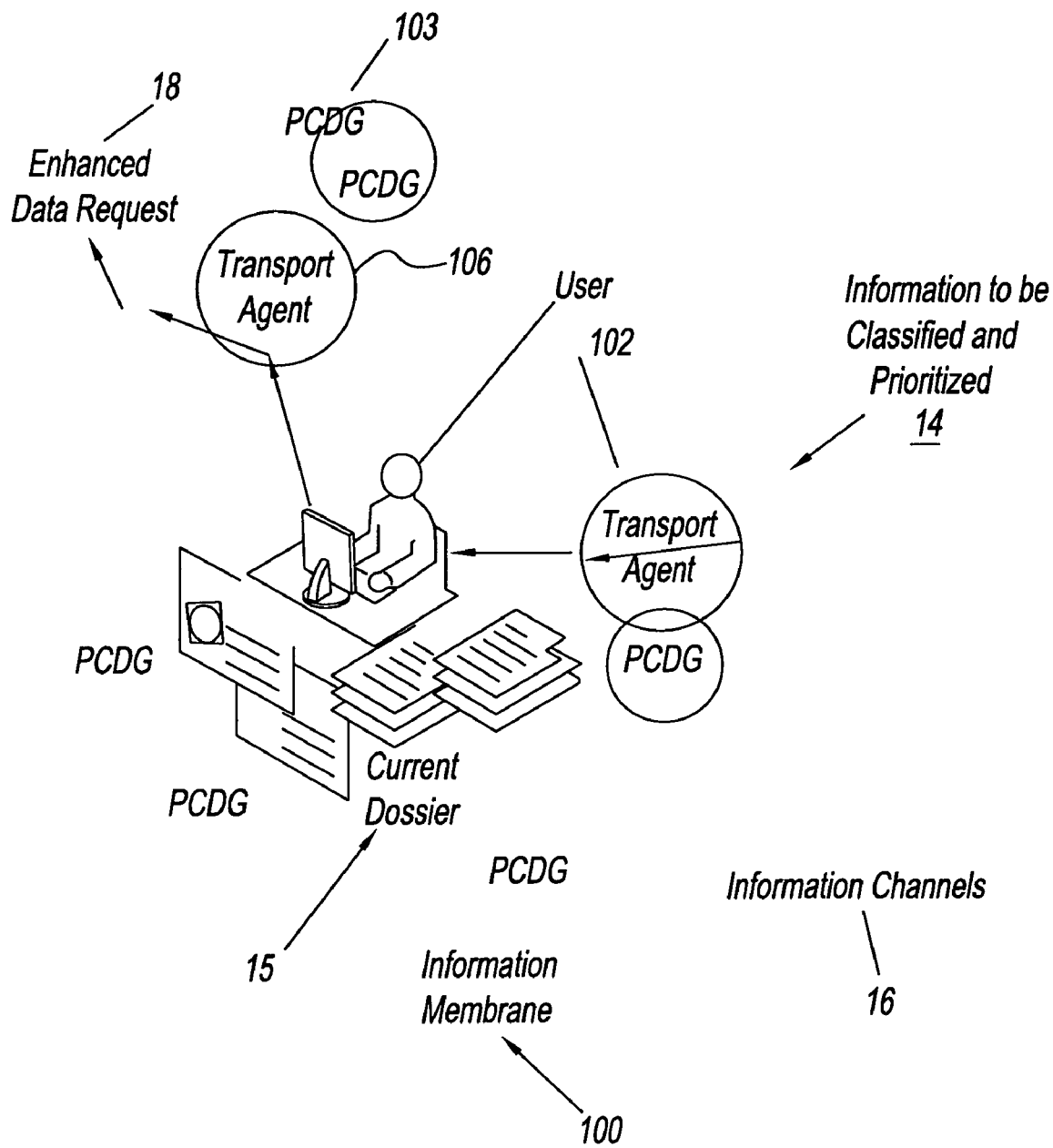
FIG. 3 shows an example workflow of the context engine of FIG. 2.

Referring to FIG. 3, shown is an example of the context engine 100 operation that helps to enhance user efficiency by instantly putting them back into their FoR 12 work environment with all the contextual clues and organization of their information 14 resources that they have established while working on their project represented by the semantic context 15. The content engine 100 behaves like an intelligent membrane where transport agents (e.g. modules 102,106) facilitate data input and output through information channels (e.g. to and from the information sources 16). Outbound data access requests can be augmented by the context engine 100 with its knowledge of the current topic(s) (e.g. semantic context 15) being worked on within the FoR 12. Inbound data from searches, file access, RSS feeds and other forms of data feeds (web robots, etc . . . ), also referred to as search results 20, can be organized and prioritized by the context engine 100 based on the semantic context 15 of the current FoR 12 (subject matter and topics). Pattern clustering and data grouping (PCDG) algorithms and rules 102-103 are used to analyze the information 14 the user is working with.

One example operation of the content search module 106 is when the user enters a query 18 (search bias) (typically by using key words), the content search module 106 examines its semantic context 15 and provides a listing of best-matching context definitions 104 that can be used to augment the user supplied search parameters 22 (e.g. a user parameter 22 of documentaries would be augmented with the context definition 104 of "historical interest", as the definition of "documentaries" is tied to the context definition 104 of "historical interest" in the semantic context 15). Accordingly, the modified search request 18 would be sent to the search engine 24 to obtain search results 20 that best match "documentaries" AND "historical interest" (e.g. as a series of web pages according to the search engine's 24 criteria, usually with a short summary containing the document's title and sometimes parts of the text). It is recognised that the content search module 106 can support the use of the Boolean operators AND, OR and NOT, for example, to further specify the search query 18 via the semantic context 15. Further, the content search module 106 can also augment the search request 18 by defining a proximity search in view of the semantic context 15, which defines the acceptable distance between keywords in the search results 20.

A further embodiment of the content search module 106 is to use matching of determined context definitions 104 in the information of the search results 20 with the context definitions 104 of the semantic context 15 to rank the results 20 to provide the "best" results first (e.g. for those results having a higher number or score measurement of context definition 104 matches as a degree of relatedness). Further, the content search module 106 can also include inclusion thresholds. For example, any match between particular information 14 that matches less than a minimum number or score measurement of the definitions 104 of the semantic context 15 would preclude the display of the particular information in the search results 20 (or otherwise place the information at a lower position in the ranking than that provided by the search engine 24).

Information 14 and Context 15 Scoring

User activities may cause information 14 (e.g. documents) and/or semantic contexts 15 (e.g. search contexts 156—see FIG. 10) to be presented to the context engine 100 as a result of information searching and/or social networking activities (see collaboration searching described in the collaboration environment 140).

Figure 6:
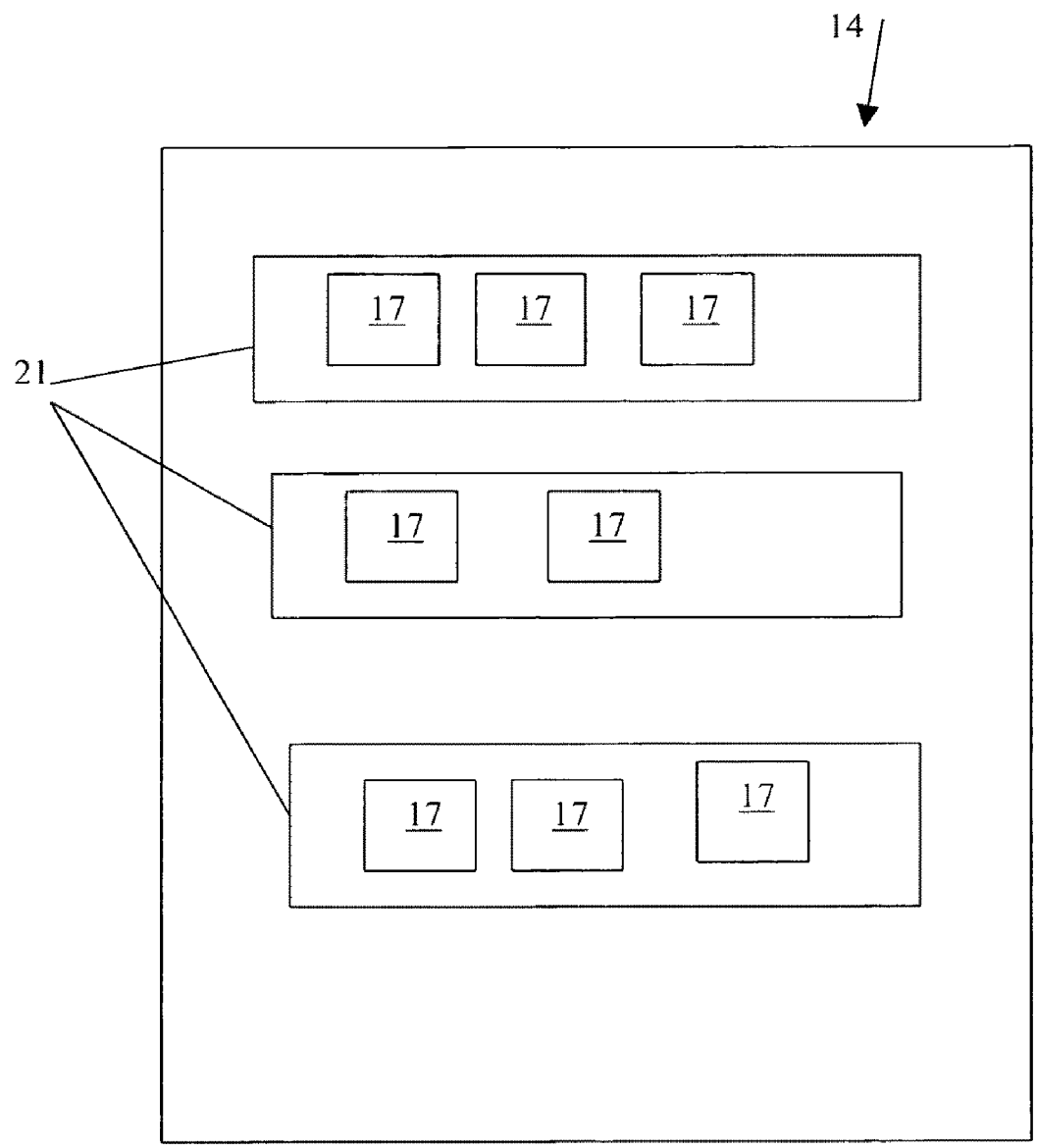
FIG. 6 shows an example partitioning of the information 14 by the context engine of FIG. 3.

Referring to FIGS. 2, 6 and 7, a comparison process 320 is discussed, for use in comparing new information 14 obtained by the user against the context definitions 104 of the semantic context 15. The contents of the new information 14 can be compared against all of the context definitions 104 associated with the semantic context 15, or can be compared with selected subset(s) of the context definitions 104 of the semantic context 15. Further, it is recognised that the context definitions 104 can include inclusive/positive context definitions 104 and/or negative/filtering context definitions 104.

The context engine 100 is used to compare selected information 14 (e.g. from search results or otherwise obtained locally—from memory 210—or remotely—via the network 11—by the user of the system 10) to the context definitions 104 of the semantic context 15 of the FoR 12. It is recognised that from time to time the user or the context engine 100 may initiate actions where it is desirable to score an unknown document or set of documents (e.g. new information 14) against a semantic context 15 or a set of semantic contexts 15. The end result is to provide a score of the relatedness of content of the new information 14 to the existing semantic context 15. This score may be used for a variety of purposes. Some of these include purposes such as but not limited to: displaying content of the new information 14 to the user using the scores to rank the content based on relevance to the semantic context 15 (e.g. internet search results, document management search results, a collection of documents, etc.); determining which context(s) 15 from a set of contexts 15 the document (e.g. information 14) are relevant to; comparing one semantic context 15 to another semantic context 15 (e.g. useful by the collaboration server 152), such as in a social network environment 140 where a measure one user's contexts 15 against another user's contexts 15 are used to determine relatedness and then provide networking opportunities; and/or anonymous or non-anonymous collaborative search for using the deemed related contexts 15 for joining people together in collaborative activities (e.g., collaborative search).

It is apparent from the explanation that follows that comparing the relatedness to context definitions 104 from a semantic context 15 or to context definitions 105 from selected information 14 (e.g. a document) can be a similar process. When information 14 is processed, the result is a set of context definitions 105 most representative of the information 14 content. The context definitions 105 from one or more information 14 are agglomerated to form the information context 19 and the context definitions 105 from one or more information 14 are agglomerated to form the context definitions 104 of the corresponding search context 15 that is assigned to all of the one or more information 14. Therefore scoring a set of context definitions 105 obtained from information 14 or from a semantic context 15 can be a symmetric process. Scoring context definitions 104, 105 from a context 15 or information 14 gives a measure of relatedness of context data (e.g. between information 14 and context(s) 15, information 14 vs. information 14 or context(s) 15 vs. context(s) 15, whichever the case may be).

Referring to process 320 of FIG. 7, at step 322 the context data is processed. For example, the user or the context engine 100 causes a set of information 14 (e.g. one or more documents Web pages, etc.) or contexts 15 to be scored against a context 15 or set of contexts 15. As mentioned, the set of information 14 can be processed into a transient or permanent context. That is to say a set of information 14 can be tested against a set of information 14, such that the information contexts 19 of each of the sets of information 14 are created dynamically.

In the simplest case, the information 14 is processed against the context 15. The information 14 is processed into context definitions 105 as described above, by example. The result of this processing is a set of the most representative context definitions 105 from the information 14.

At step 324, a score (e.g. degree of relatedness between two sets of context data) is determined. In this step 324 an overlap measure between the target context definitions (e.g. of a document) and the other context definitions (e.g. context(s) 15 definitions 104) is measured. Recall that context definitions 105 can be defined as the cluster of word patterns from the information 14 (e.g. related by pattern recognition described above along with its prototypical pattern). A series of measures are calculated to identify how related context definitions are between the target information 14 and the context 15. Between the two sets of context definitions, pattern match counts are calculated context definition by context definition between the two context definition sets. Also, a match count is calculated between the words in the patterns of each context definition between both sets of context definition. This is actually the pattern prototype for the context definitions 104, 105. The system 10 can set dual thresholds for scores here, where pattern hits/matches are scored higher than word hits/matches with the pattern prototype but both can be used in the overall match score.

The two measures are used separately or combined to give an overall context definition by context definition match score or relatedness between the target information 14 and the context 15, for example. The score of all the context definitions may be aggregated to represent an overall score of the information's 14 relatedness to the context 15. Or, it may be the case that the user's activity is only seeking to identify if subsets of the context definitions from the context 15 and the information 14 are related. In this case a subset, one or more, of the context definitions from the context 15 and/or the information 14 may be tested to determine relatedness.

Once the information 14 (or context definitions from another target, e.g., another context 15) has been scored against the context 15, any negative context can also be scored against the information 14 (or another context 15) in a similar process. The overall score of a set of context definitions against the context 15 is the context score of the positive context definition matches less or otherwise reduced by the score of the negative context definition matches. The negative/filter context definitions 104 can be associated directly with the context 15 and/or globally assigned for any of the global negative contexts active as obtained from the global information set 109 (e.g., pornography and ad filtering may be optionally activated by the client user in which case those global negative context definitions would be part of the calculation). Therefore, it is recognised that the context definitions of information 14 and/or a semantic context 15 could be matched against the context definitions of other information 14, other contexts 15, and/or global context definitions (e.g. negative context definitions) obtained from the global information set 109.

At step 326, and information 14 that is scored favourably (e.g. satisfies a context definition match threshold) can be added to the collection of information 14 associated with the semantic context 15. Further, the determined context definitions 105 of the information 14 (e.g. the information context 19) can also be aggregated with the context definitions 104 of the semantic context 15. In some case the score results for the information 14 (e.g. a document or set of documents) may have match thresholds associated with them at a document level or context definition by context definition level. These match thresholds may be used by the context engine 100 to add the information 14 to the context(s) 15 if such match thresholds are met. For instance, if all the words in the set of words that constitute the prototypical pattern for a context definition 105 are covered by one or more context definition 104 from the context 15, the information 14 may be included in the collection of information 14 associated with the context 15.

At step 328 the score results of the information 14 may be displayed to the user to the user on the user interface 202 (see FIG. 4). It is also recognised that the score results may not be displayed and the association of information 14 with the semantic context 15, as well as aggregation of context definitions 104, 105, may be restricted from access by the user.

It is recognised that in the case of determined context definitions 105 representing undesirable information 14, the determined context definitions 105 are added to the semantic context 15 but the associated undesirable information 14 may not be added to the collection of information 14 associated with the semantic context 15. Otherwise, the undesirable/filtered information 14 could be added to a filtered information folder, for review by the user to help evaluate the performance of the context engine 100 in identification of undesirable material. Accordingly, the negative/filter context definitions 104, 105 can be included within a negative context and associated with the current semantic context 15 that is representative of the desired material (e.g. collection of information 14) of the user. Each semantic context 15 can both positive and negative context definitions 104 associated with the semantic context 15. As well, the global information set 109 (see FIG. 2) may also have any number of global negative filters (e.g. context definitions 104) for automatic/manual selection to the semantic context 115. Examples of global negative filters could be related to advertising terms and material or to pornographic materials.

One example of context 15 scoring (e.g. topic by topic) is as follows. The scoring techniques look at the matches between the context definition's 104, 105 prototype patterns (the set of words that comprise the patterns in the context definition 104, 105) and the patterns with a context definition 104, 105 or list of context definitions 104, 105 from another information 14 source (e.g. another document or context, set of documents, etc.). For example, given a set of context definitions 105 from a document under consideration Td and a set of from a context Tc the context engine 100 can perform the following: The context engine 100 look at the pattern prototype of each T (e.g. context definitions 105) in Td (the set of words that comprise the patterns in the context definitions 105) and determine how many are covered by the pattern prototypes in Tc (all the keywords of the context definitions 104 as a whole). This gives us a percentage coverage of the prototype pattern for Td against Tc's prototype patterns. Then the context engine 100 looks at the patterns in each T of Td and see how many are covered in Tc's patterns (all the patterns of the context at once). This gives us a percentage cover for patterns for each T in Td.

In both calculations the context engine 100 can use the importance number to calculate the percentage coverage. So it is not just a simple, was the word present or not. Therefore for a T in Td the percentage coverage can be calculated as:

Sum(importance of words covered)/Sum(importance of all words in the prototype pattern)*100

Sum(importance of patterns covered)/Sum(importance of all pattern in the topic)*100.

They can be just left as fractions. The *100 is for people looking at a percentage result. Now the context engine 100 has lots of options. If membership can be determined by the score of the best context definitions 104, 105 match, the average context definitions score of non-zero context definitions, the average score of all context definitions, or the worst score of a context definition (for example). The context engine 100 can also use the percentage of context definitions 104 covered.

In one example when testing a set of context definitions 105 from a document 14 to join a context 15, the context engine 100 can use a minimum threshold for one or more metrics (e.g. three metrics) to determine the documents membership in the context:

1. The average score of non-zero topic keywords (prototype patterns) against the context topics;
2. The score of all the patterns against all the context patterns (which is really summing all the topics together in both target document and context and scoring them); and/or
3. The percentage of topics covered in the target document.

Accordingly, if one or more (e.g. all three) thresholds are met the document 14 is identified as belonging to the context 15.

Numerical Example of Operation of the Context Engine 100

Referring to Appendix A, shown is a 12 page document 14 on with text content on the topic of product marketing, specifically targeted marketing. The spreadsheet shows the pattern clusters (i.e. ns1:CID is the identified cluster ID, ns1:PID is the identified pattern ID, ns1:Freq is the calculated pattern frequency, ns1:W is the pattern weight, ns1:I is the calculated pattern importance, ns1: is the identified word one, ns1:wf1 is the word frequency for word one, and similarly ns1:w2/ns1:wf2 ns1:w3/ns1:wf3 ns1:w4/ns1:wf4 ns1:w5/ns1:wf5 are for words two, three, four, and five). Also included is a list of the word calculation results (i.e. ns1:Word is the word, ns1:Count is the frequency of the word in the document, ns1:LocalSurprisal is the local importance of the word, ns1:GlobalSurprisal is the global importance of the word, and ns1:Importance is the total importance for the word).

As shown in the Cluster ID (ns1:CID) in the left column of the Pattern Cluster sheet, clusters (topics) 41 and 39 pull out the main context matter of the document 14. The document 14 is all about product positioning and distinctive completive advantage. Other identified cluster IDs, 34, 33 and 32 are also illustrative of the document 14.

Example Operation 360 of the Context Engine 100

Step 362

Figure 9:
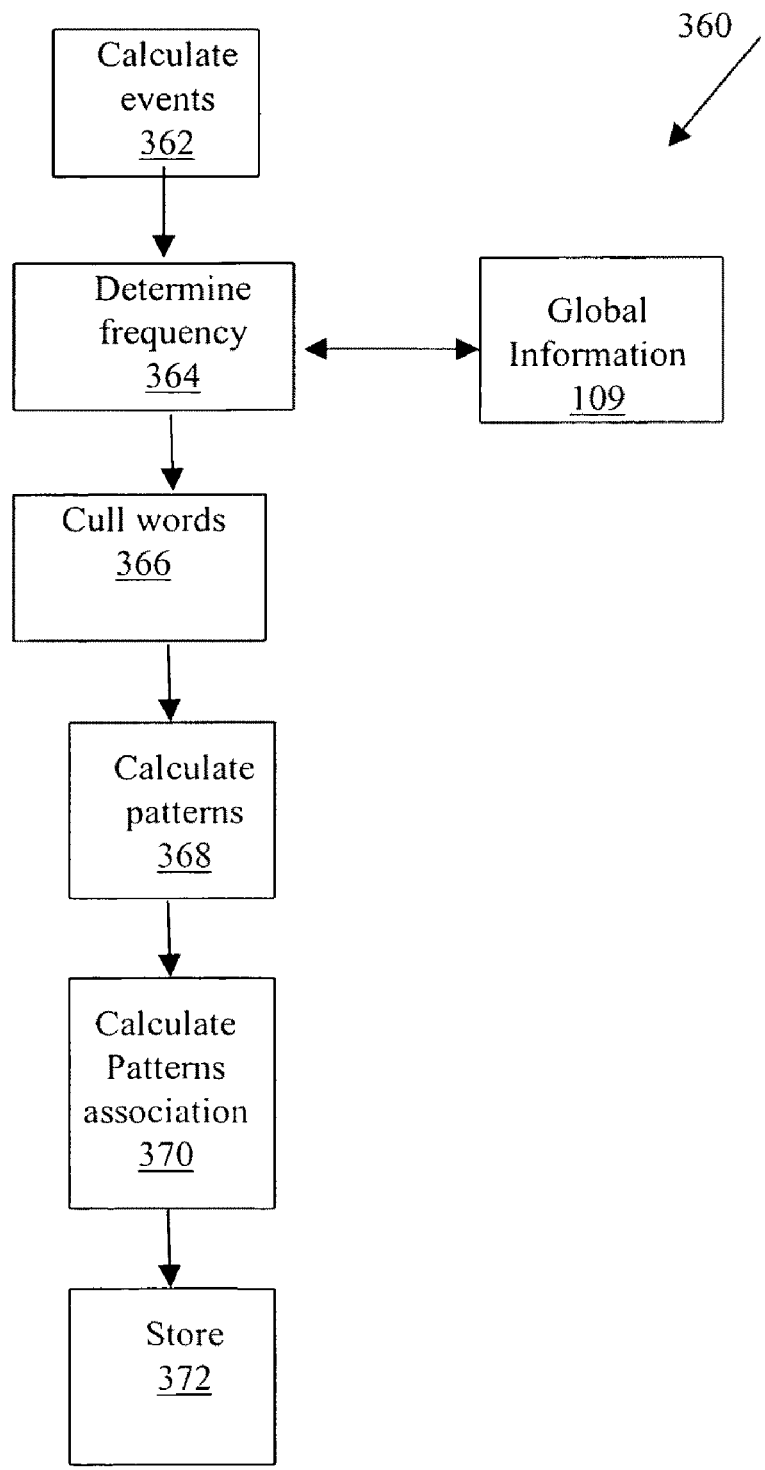
FIG. 9 is a flowchart of an example operation of the context engine of the system of FIG. 1.

Referring to FIG. 9, the context engine 100 has three recognised events En of a document that was broken up into a series of events (e.g. sentences), each of the events containing a number of words Wn.

E1—W1, W2, W3
E2—W2, W3, W4
E3—W1, W2, W3, W5

Note, in this example, the document is comprised of a total of 10 words Wn, having three sentences as separate events En.

Step 364

The context engine 100 calculates the probability Pr(Wn) (e.g. relative frequency of occurrence) of each word Wn being found in the document and its Local self information $Pr(w1)=0.2$ and $Ilocal(w1)=-\log(0.2)$ $Pr(w2)=0.3$ and $Ilocal(w2)=-\log(0.3)$ $Pr(w3)=0.3$ and $Ilocal(w3)=-\log(0.3)$ $Pr(w4)=0.1$ and $Ilocal(w4)=-\log(0.1)$ $Pr(w5)=0.1$ and $Ilocal(w5)=-\log(0.1)$ As an aside, Pr(wn) is calculated as the number of occurrences (i.e. frequency) of the word in the document divided by the total number of words in the document, for example.

The context engine 100 selects from the dictionary the Global self information 109 value GSI for each word Wn, as Ig(w1), Ig(w2), Ig(w3), Ig(w4), Ig(w5), and then calculate the measure of Importance for each word IMPn as $IMP1=Ig(w1)-Ilocal(w1)$ $IMP2=Ig(w2)-Ilocal(w2)$ $IMP3=Ig(w3)-Ilocal(w3)$ $IMP4=Ig(w4)-Ilocal(w4)$ $IMP5=Ig(w5)-Ilocal(w5)$ As an aside, the Ig(wn) can be based on the processing of large numbers of documents to get statistics representative of the words use in the language (also as a number derived from frequency numbers).

Also, the context engine 100 selects a unique integer for each of the words Wn from the dictionary.
i1 for w1, i2 for w2, i3 for w3, i4 for w4, i5 for w5, giving
E1—i1,i2,i3
E2—i2,i3,i4
E3—i1,i2,i3,i5
Step 366

The context engine 100 can optionally cull words Wn with lower IMPn below a specified importance threshold.

For example, lets say that IMP1, IMP2 and IMP5 are all higher than the threshold, therefore resulting in the culling of words W3 and W4 from the list of events En, giving
E1—W1, W2
E2—W2
E3—W1, W2, W5 and
E1—i1,i2
E2—i2
E3—i1,i2,i5

It is recognised that if all of the words in an event are culled, then this event is removed from the event list.
Step 368

The context engine 100 now calculates all patterns/associations contained within the document using the remaining words Wn, such that a pattern is defined as the occurrence of one or more words in multiple events. The frequency of patterns is set as a pattern threshold in this example as greater than one, with first order to fifth order patterns allowed (i.e. W1 is a first order pattern and W1,W2 is a second order pattern). Therefore, the context engine 100 has $P1=i1$ (in events $E1,E3$)

$P2=i1,i2$ (in events $E1,E3$)

$P3=i2$ (in events $E1,E2,E3$), where i5 in E3 was not deemed a pattern as i5 did not occur in more than one event.

It is noted that the representation of the words Wn as integers In can be done to increase computational performance of the pattern detection.

Next, the pattern weight is calculated, including a combination PW(Pn) (e.g. sum) of all of the IMP of the words that comprise the pattern Pn. It is recognised that P-GSI can be calculated by training using a large number of documents and either maintained as a constant for all patterns and/or unique values can be associated with the individual word(s) in the global information set 109 (e.g. predefined Pr(Pn) global value).

(a) Therefore the context engine 100 calculates PW(P1)=IMP1, PW(P2)=IMP1+IMP2, PW(P3)=IMP2, (b) then the context engine 100 determines the P-GSI(P1), P-GSI(P1), P-GSI(P1) (all equal to 24, for example), (c) then the context engine 100 determines the local Pr(Pn) as Pr(P1)=2/3, Pr(P2)= 2/3, Pr(P3)=3/3 (as the relative frequency of occurrence of the pattern in the events), then the context engine 100 determine the importance of the pattern P-IMP as P-IMP(P1), P-IMP(P2), P-IMP(P3), using the determined values from steps (a), (b), (c).

Alternatively, the system 10 could calculate the importance of a pattern as:

$$mImportance=(24.0+Math.Log((double)mFreq/(double)documentDescriptor.SentenceCount, 2.0d))*mWeight,$$

where the weight is calculated as the sum of the importance of each word in the pattern for that information 14 (e.g. document). It is noted that the value 24 can be considered a placeholder for the global self-information of the pattern, however if the system 10 had access to a dictionary 109 of pattern occurrence in the language, the system 10 could use that value instead. The log term represents the self-information of the pattern in the information 14 (e.g. log of the probability of finding the pattern in the information 14). This log value is multiplied by the pattern weight. So, pattern importance can be defined as (global−local self-information)*pattern weight. Accordingly, the value 24 can be replaced by a dictionary of patterns from the language that contains the global self-information for the training set (or language at large).

As with step 366, next the pattern culling is performed to include the most significant patterns. For example, let's say that P-IMP(P2), P-IMP(P3) are all higher than the pattern threshold, therefore resulting in the culling of P1 from the list of patterns Pn.
Step 370

The next step is to determine the association (degree of relatedness) of the patterns (in this case P2 and P3) by the words Wn they contain and possibly by their position in the document. For this step, each of the patterns can be represented as the integers.

Lets say that for this example, the patterns P2 and P3 are determined as a pattern cluster due to their similar "word" i2 in each pattern and their relative positioning within the document. Therefore the pattern P2-P3 is deemed to be a "topic"—T1 having i1,i2 as a list of words in the topic Tn (referred generically as a context definition 104). It is also recognised that in the case of multiple topics Tn are determined in the document, super topics STn can be determined repeating the above process for only those words Wn contained in the topics Tn. These topics Tn and supertopics STn are associated with the semantic context 15 of the FoR 12.

As an aside, in subsequent document scoring, the word groupings of the topics Tn (e.g. w1, w2) can be used to match similar word groupings found in events of the document being scored (i.e. target document). Also, the relative positioning of the words represented in the pattern cluster P2-P3 can be used, in combination or individually. In other words, topic T1 of the semantic context 15 is considered to have words w1 and w2, the patterns P2 and P3, and the pattern cluster P2-P3. All of these attributes of the topic T1, either alone or in combination, can be used to compare against the word content Wn of the topics determined for the target document. In essence a measure is calculated as representing the degree of overlap between the topics of the target document and the topics of the semantic context 15.

Step 372

All of the words Wn, patterns Pn, and topics Tn/STn are stored, with respect to the document they came from, in the database (e.g. memory 210) along with the results of the statistical calculations. The words are represented as integers In and the dictionary 109 is used to represent the mapping between the integers In and the words, as well as the global statistics for each of the words. In this manner, the semantic context 15 is now defined by the topic T1, for example, including the attributes of the topic T1.

Alternatively, the context engine 100 can store patterns, topics and supertopics along with relevant statistics for each, along with a reference to the original document (e.g. information 14) in the database 210. Accordingly, the context engine 100 can be configured for loading of information 14 and accessing the corresponding word Wn statistics. As well, it is recognised that each word Wn in a pattern or context definition 104 can be represented by its value (e.g. integer value) in the dictionary 109.

Collaboration Environment 140

Referring to FIG. 10, shown is a collaboration environment 140 for facilitating the sharing/access of respective search information sets 154 between a plurality of users Un, based on a determination of shared search context 156 between different pairs of the search information sets 154. The shared context 156 can be any set of context definitions 160 with some level of overlap. This can be scored on a definition-by-definition basis or contexts 156 in the aggregate. The contents of the search information sets 154 can be generated based on user Un search activities with a plurality of information sources 16 (for example via third party search engines 24), including search requests 18 and search results 20, as described above by example. The search information sets 154 can also contain reference to user Un generated information 14 (e.g. documents, etc.), as desired. The user's Un work activities can include information 14 retrieval from a variety of information sources 16 via information requests 18 (containing search parameters 22) and information responses 20 (containing the resulting information 14 and/or reference thereto) over the communications network 11. Examples of the information 14 accessed in the environment 140 are given above with respect to the information processing system 10 (see FIG. 1).

Further, the collaboration environment 140 can make searches for information sets 154 of collaborators implicitly when a search context 156 has been established. When the user brings up an application of the FoR 12 (e.g. Microsoft Word) within the context 156, the collaboration engine 150 can populate the instance of the application with a list of collaborators and/or search results 20 before they make the search request 18 for same. The collaboration server 152 can be configured for broadcasting (or multicasting) to the collaboration engines 150 and asking if they have relevant contexts 156 and/or information sets 154 that might be shared between users over the network 11. One example is search results 20. It also may be the case that the collaboration client 150 on one machine initiates a request 18 for collaborators on a given context definition 160 (and/or context 156) for new and/or existing contexts 156. THE user may not have even initiate this request 18 other than by opening the context 156 in the For 12 monitored by the collaboration engine 150 of the user.

The environment 140 has a collaboration server 152 configured for comparing the search contexts 156 of each of the search information sets 154 with one another in order to determine which of the search information sets 154 have search context 156 in common. The users Un each have a collaboration engine 150 that is coupled for communication with the collaboration server 154 over the network 11. The collaboration engines 150 communicate the respective search contexts 156 associated with each of the search information sets 154 of each of the users Un to the collaboration server 152, for subsequent use in determination of the shared search contexts 156. The collaboration server 152 could also store copies of the search information sets 154, as obtained with respect to the users Un, and/or can request copies of the search information sets 154 from the users Un, as needed for communication of the search information sets 154 to the other users Un as a result of determining a match between corresponding search contexts 156. The collaboration engines 150 also communicate with the collaboration server 152 to request and obtain search result set(s) 154 that match a specified search context 156 of the user Un. The user Un can also have a context engine 151 for use in determining the search context 156 of the search information sets 154 belonging to the user Un. It is recognised that one embodiment of the context engine 151 is the context engine 100 described above with respect to the information processing system 10 (see FIG. 1).

Network 11

Communication between the users Un (e.g. via networked communication devices 101—see FIG. 4), the collaboration server 152, the information sources 16, and the search engine(s) 24 is facilitated via one or more communication networks 11 (such as intranets and/or extranets—e.g. the Internet), and accessed by the user Un through the user interface 202 of the user device 101 (see FIG. 4). The environment 140 can include multiple user devices 101, multiple collaboration servers 152, multiple information sources 16, multiple search engines 24, and one or more coupled communication networks 11, as desired.

It is recognised that one embodiment of the collaboration engine 150 is as a client of the collaboration server(s) 152. The collaboration engine 150 can be hosted on the user device 101 (as shown by example), or can be configured as a networked collaboration service (e.g. collaboration Web service) hosted on a remote device 101 (e.g. as a proxy between the user Un and the collaboration server 150—not shown, or hosted on the same server device 101 as the collaboration server 152) and accessible by the user device 101 over the network 11. It is recognised that network communication of search requests 18 and search results 20 with respect to the user Un can be between the user Un and the search engine 24, between the user Un and directly with the information sources 16 (e.g. bypassing the search engine 24), and/or between the user Un and the collaboration server 150 (which operates as a proxy device between the user Un and the search engine 24 and/or information sources 16), as desired. The following discussion uses the embodiment of the collaboration engine 150 hosted on the user device 101 and in network communication with the collaboration server 152, as a representative example for discussion purposes only.

Search Information Set 154

Figure 11:
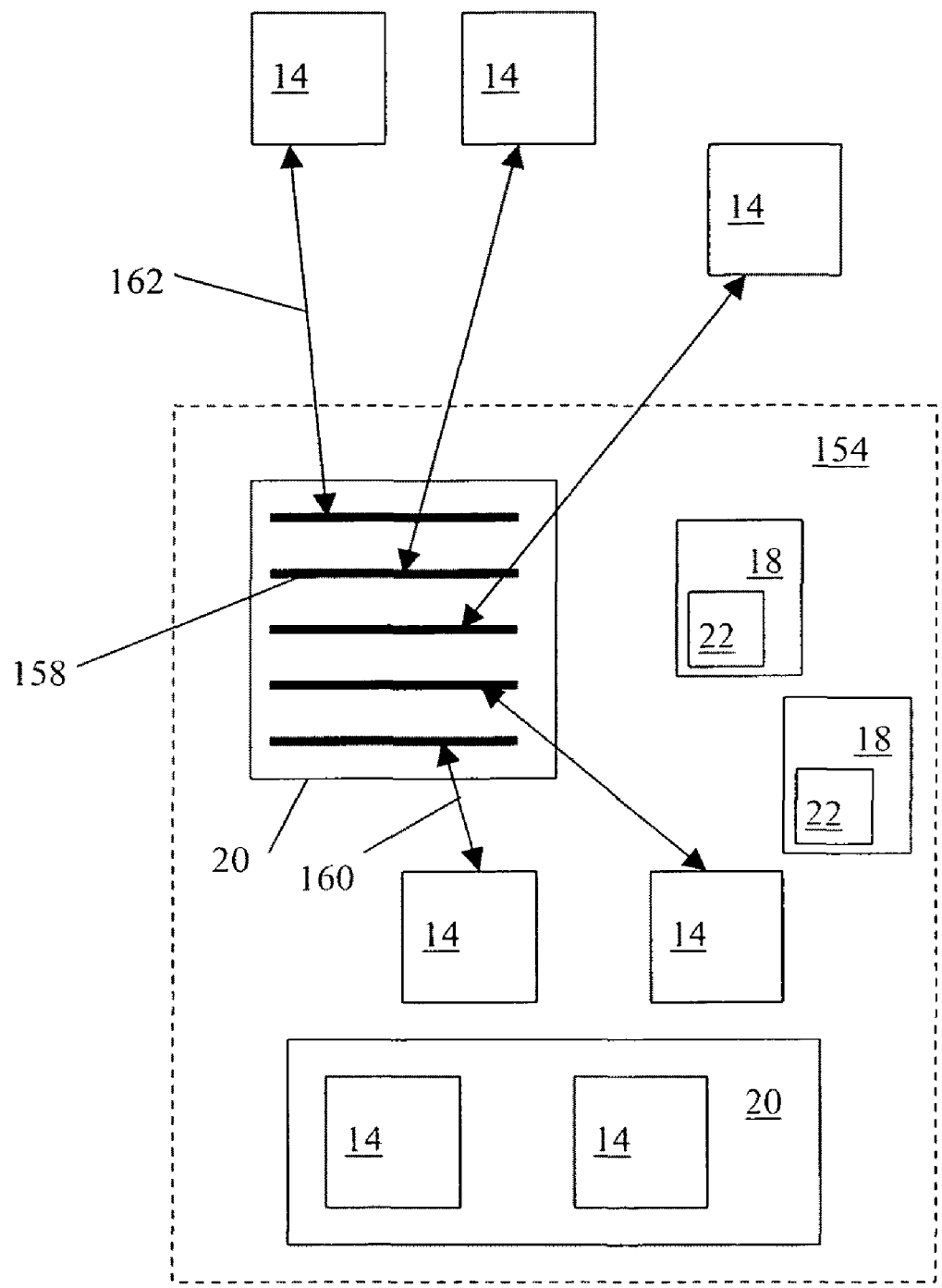
FIG. 11 shows an example search information set of the environment of FIG. 10.

Referring to FIG. 11, embodiments of the search information 154 include information such as but not limited to: the contents of the search requests 18 including a plurality of search parameters 22; the contents of the search results 20 including a list of reference links 158 to a plurality of information 14 (e.g. documents, Web pages, etc.) that matched (for example to some degree) the requested search parameters 22; search results 20 including information 14; or a combination thereof. The reference links 158 can be directed 160 to information 14 contained within the search information 154 file and/or directed 162 to information 14 located outside of the search information 154 file. This could also include context definitions 160 or a selected subset of context definitions 160 from the context 156 from which the search 18 was initiated.

It is recognised that the configuration of the reference links 158 of the search information 154 can include links such as but not limited to a hyperlink, which is referred to as a reference or navigation element (e.g. URI's can be used to hold either file or URL references, such that the references can be URLs, file names, etc . . . ) in the information 14 to another section of the same information 14 or to another information 14 that may be on or part of a different domain. The reference links 158 can include embedded links and/or inline links. For example, the embedded link 158 is referred to as a link embedded in an object of the information 14 such as hypertext or a hot area (e.g. an area of the user interface 202 screen that covers a text label or graphical images). The inline link 158 can be used to displays (on the user interface 202) remote information content without embedding the content in the information 14. The remote information content may be accessed with or without the user Un selecting the link 158, such a where the inline links 158 display specific parts of the remote information content (e.g. thumbnail, low resolution preview, cropped sections, magnified sections, description text, etc.) and access to other parts or the full information content when invoked. Further, as described below, the search information 154 has search context 156 associated with each of its information 14 content, e.g. documents, Web pages, reference links 158 to the documents and/or Web pages, etc.

Search Context 156

The search context 156 of the search information 154 includes context definitions 160 that provide identification, categorization, descriptive, and/or labelling information about the search information 154. For example, the context definitions 160 can be single/multiple alpha and/or numeric descriptors (e.g. one or more words) used to categorize or otherwise label the content of the search information 154 (e.g. the information 14 itself, the search parameters 22, and/or the reference links 158) so that the collaboration server 152 can best match the search context 156 associated with the search information 154 to the search context 156 of other search information sets 154, further described below. Accordingly, the context definitions 160 can be (relevant) word(s) or term(s) or phrases (and patterns thereof) associated with or otherwise assigned to the search information 154 (e.g. Web pages, documents, pictures, articles, video clips, blogs, etc.), thus describing the search information 154 and facilitating a descriptive/word-based classification of the search information 154 as the search context 156. It is recognised that one example embodiment of the context definitions 160 are the context definitions 105 described above, and one embodiment of the search context 156 is the semantic context 19 described above, with reference to the information processing system 10 (see FIG. 1).

For example, the context definitions 160 can be comprised of words, which are included as word patterns/groupings/phrases. The context definitions 160 can be selected as representative of the textual and/or graphical content of the search information 154. The context definitions 160 can be assigned by the context engine 151 using terminology that is not present (e.g. attaching a descriptive label to the contents of a graphical image based on image recognition analysis and/or the search parameters 22 used to obtain the graphical image from the information sources 16) in any textual subject matter of the search information 154 and/or can analyze the textual contents of the search information 154 for selecting representative word patterns/groupings/phrases therefrom. It is also recognised that the user Un can assign the context definitions 160 to the search context 156, irrespective of the actual graphical and/or textual contents of the associated search information set 154. One example embodiment of selecting representative word patterns/groupings/phrases from the search information 14 is described above with reference to the content analyzer module 102 of the context engine 100 (see FIG. 2). It is also recognised that the search context 160 can also contain application state information (e.g. browser bookmarks) as described above with reference to the semantic context 15, 19 of the system of FIG. 1.

The context definitions 160 can be stored in a SQL database format (e.g. SQL 2005) in the memory 210. The SQL database format is one example used for the retrieval and management of the context definitions 160 in a relational database management system (RDBMS). The SQL database format provides for querying and modifying of the context definition 160 data and for managing the database (e.g. memory 210—see FIG. 4), through the retrieval, insertion, updating, and deletion of the context definition 160 data in the memory 210. The SQL language for access of the context definitions 160 in the memory 210 can include the following example language elements, such as but not limited to: Statements which may have a persistent effect on schemas and data of the memory 210, or which may control transactions, program flow, connections, sessions, or diagnostics; Queries which retrieve context definitions 160 based on specific criteria; Expressions which can produce either scalar values or tables consisting of columns and rows of data for the context definitions 160; Predicates which can specify conditions that can be evaluated to SQL three-valued logic (3VL) Boolean truth values and which are used to limit the effects of statements and queries, or to change program flow; Clauses which are (in some cases optional) constituent components of statements and queries; and Whitespace which can be ignored in SQL statements and queries.

In a further embodiment, the context definitions 160 can be metadata involving the association of descriptors with objects of the search information 154 and can be embodied as the syntax (e.g. an HTML tag/delimiter such as a coding statement) used to delimit the start and end of an element, the contents of the element, or a combination thereof. The context definitions 160 can be defined using a structured definition language such as but not limited to the Standard Generalized Markup Language (SGML), which defines rules for how search information 154 can be described in terms of its logical structure (headings, paragraphs or idea units, and so forth). SGML is often referred to as a meta-language. A specific use of SGML is called a document type definition (DTD), which defines exactly what the allowable language is. For example, HyperText Markup Language (HTML) is an example of a structured definition language for defining the context definitions 160. A further example of the structured definition language is eXtensible Markup Language (XML), which defines how to describe the collection of search information 154 data. Accordingly, the context definitions 160 can be used to provide an underlying definition/description of the contexts 156. For example, HTML delimiters can be used to enclose descriptive language (e.g. context definitions 160) about an HTML page, placed near the top of the HTML in a Web page as part of the heading.

It is recognised that the context definitions 160 of the search context 156 are determined by the context engine 151, associated with the respective search information 154, and then used by the collaboration engine 150 to request related search information 154 of other users Un from the collaboration server 152, done either by explicit request of the user to the collaboration engine 105 and/or implicitly done by the collaboration engine 150 in response to contexts 156 of the user that are known to the collaboration engine 150. It is also recognised that the context definitions 160 (as compared to the context definitions 160 of other search contexts 156) can be used to help rank the relative relevance of other search information sets 154 with respect to the search information 154 of the user Un, i.e. the degree of similarity between the search context 156 of the user Un with the search context 156 of other users Un, as further described below with reference to the process 400 (see FIG. 14). If a suitable degree of similarity (e.g. satisfying a context match threshold) is found between the search context 156 of the user's search information 154 and the search context 156 of other users' search information 154 (as determined by the collaboration server 152), access to the corresponding search information 154 (associated with the matched search context 156) is made available to the user Un, as further described below.

Example Search Context 156 Comparison

Figure 12:
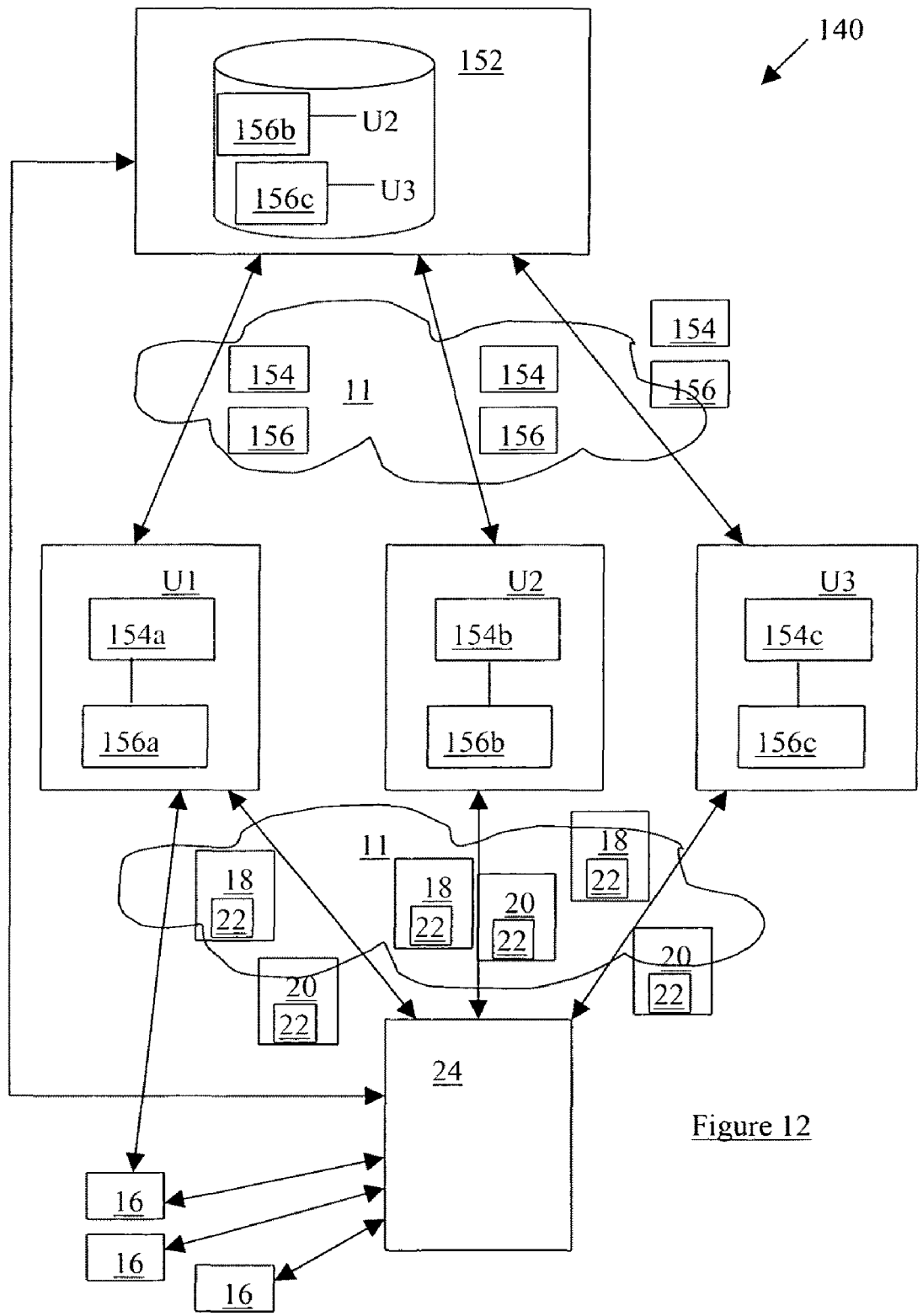
FIG. 12 is an alternative embodiment of the environment of FIG. 10.
Figure 13:
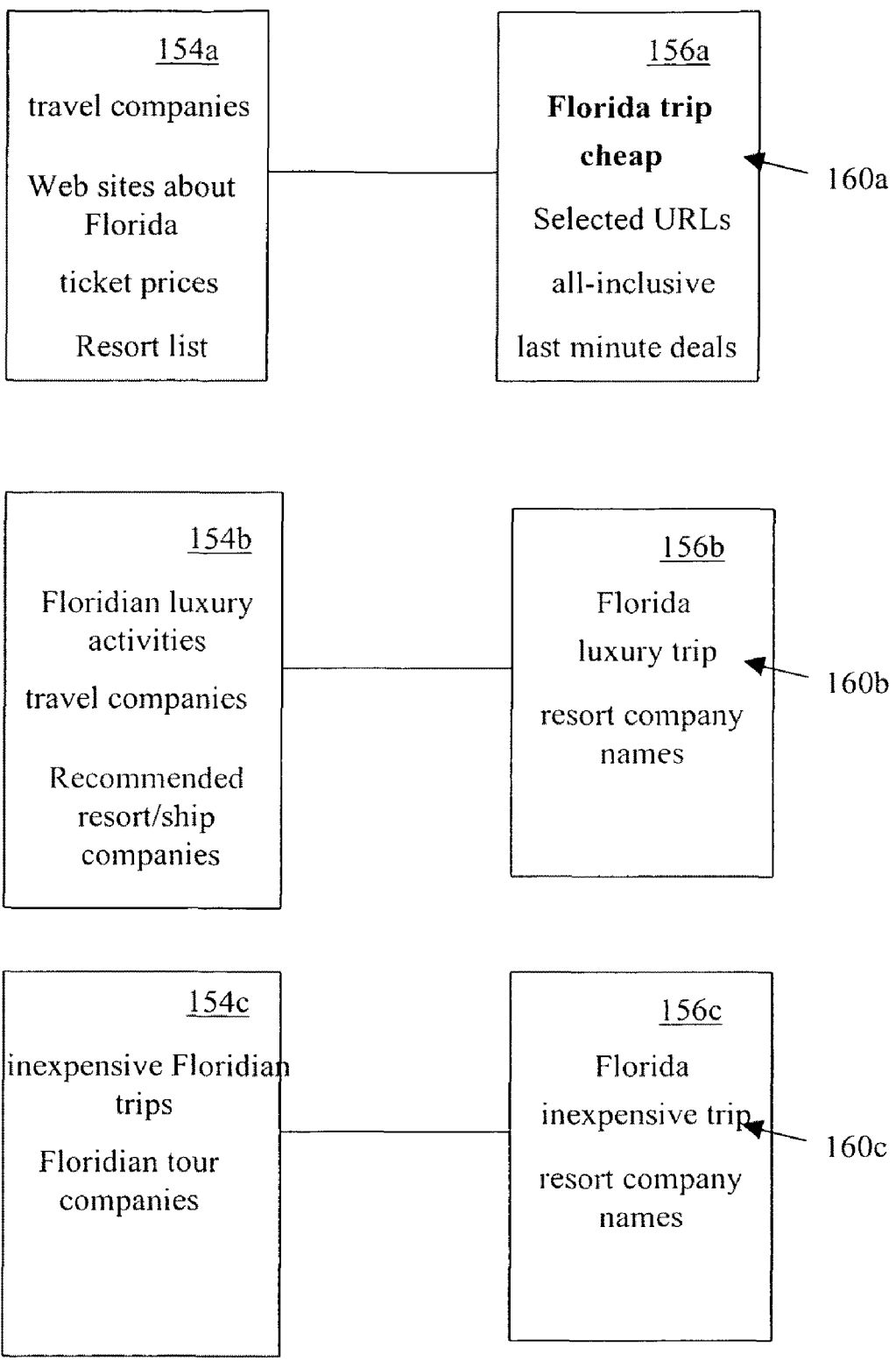
FIG. 13 shows example search information sets and corresponding search contexts of the environment of FIG. 12.

Referring to FIGS. 12 and 13, for example, user U1 has search information set 154a that has an associated search context 156a, user U2 has search information set 154b that has an associated search context 156b and user U3 has search information set 154c that has an associated search context 156c. Further, the collaboration server 152 has at least the search contexts 156b, 156c stored in memory 210, along with the users U2, U3 (e.g. via a user ID such as a network 11 address of the user Un) to which the search contexts 156b, 156c are associated with.

By example, the search information set 154b includes information about luxury trips to the Florida, travel companies, and lists of highly recommended resort companies and cruise ship companies. The associated context definitions 160b of the search context 156b include the terms "Florida", "luxury trip", and a few resort company names. By example, the search information set 154c includes information about inexpensive trips to the Florida, Floridian tour companies, and lists of highly recommended resorts. The associated context definitions 160c of the search context 156c include the terms "Florida", "inexpensive trip", and a few resort company names.

User U1 interacts with the search engine 24, via search requests 18 and corresponding search results 20. The context engine 151 (see FIG. 10) of user U1 analyzes the search information set 154a associated with the search requests 18 (containing a plurality of search parameters 22) and results 20 (e.g. a number of results lists containing a series of Web page links 158), and generates a search context 156a representative of the contents of the search information set 154a.

For example, the search requests 18 contain the parameters 22 of "cheap", "trip", "Florida", and "all-inclusive resort". The search results 20 contain lists of Web page links 158 for user selected travel companies, Web sites about Florida, airline ticket prices and a list of user selected resorts (both inclusive and non-inclusive) with traveler comments. It is recognised that the user U1 has interacted with the context engine 151, as further described below, in order to help refine or otherwise filter the raw (e.g. as obtained from the search engine 24) search information 154a to help remove undesirable (to the user U1) information content from the search information set 154a. Hence, it is recognised that the search information set 154a is representative of analysis particular to the user U1 for trips to Florida. It is also recognised that the search information set 154a can include application state information (e.g. Browser bookmarks and browser search history) saved by the user U1 that are related to some of the links 158 or otherwise tracked automatically by the respective applications used by the user U1 in assembling the search information set 154a.

Therefore, by example, the search context 156a assigned to the search information set 154a includes the context definitions 160a of "Florida trip" (e.g. context engine 151 assigned through analysis of the contents of the returned Web pages), URLs of selected resorts and/or the resort names (e.g. assigned by the user U1 and/or by the context engine 151 due to actions of the user U1 in bookmarking selected Web page URLs obtained from the search results 20), the search parameter "all-inclusive" (e.g. context engine 151 assigned through analysis of the contents of the returned Web pages that mostly matched one of the search parameters 22 repeated in the search requests 18), and keywords/phrases of "cheap" and "last minute deals" (e.g. context engine 151 assigned through analysis of the contents of the returned Web pages as deemed more relevant by the user U1 through monitored user U1 actions with the search results 20). Accordingly, it is recognised that the context definitions 160a could have been assigned to the search context 156a by the user U1 and/or the context engine 151, as best representative of the contents of the search information set 154a. For example, the user U1 and/or the context engine 151 has weighted or otherwise ranked the context definitions 160a of "cheap" and "Florida trip" higher than the other context definitions 160a of the search context 156a.

Referring again to FIGS. 12 and 13, user U1 submits their search context 156a (e.g. via their collaboration engine 152—see FIG. 2) and the collaboration server 152 compares the context definitions 160a with the context definitions 160b,c of the search contexts 156b,c. The collaboration server 152 determines that search context 156b is not relevant (or otherwise less relevant that search context 156c) to the search context 156a, based on the mismatching of the context definition 160a "all-inclusive" with the context definition 160b "luxury", even though both of the search contexts 156a, 156b are related to Floridian trips. Further, in comparison of the search contexts 156a and 156c, the collaboration server 152 determines that there is a sufficient match between the context definitions 160a, 160c, in particular based on the semantic match of "cheap" with "inexpensive trip" and "Florida trip" with "Florida".

The collaboration server 152 then contacts user U1 (e.g. the server 152 contacts the collaboration engine 150 of the user U1 and then the collaboration engine 150 provides the User U1 with a list of potential collaborative searchers, anonymous or not) noting that their search context 156a matched one other search context 156c. The user U3 is also contacted and given the option of communicating the search information set 154c to the user U1 (e.g. via the collaboration server 152). As well, the user U3 could also be given the option of access to the search information set 154a, as desired. It is recognised that the exchange of the search information sets 154a,c could be done anonymously, i.e. the identity of the users U1, U3 could be stripped from the search information sets 154a,c before communication of the respective search information sets 154a,c to the users U3,U1. As a result, given the example above, user U1 obtains the benefit of access, via the search information set 154c, to the searching experience/efforts of user U3 for Floridian tour companies and the recommendations for any resorts not uncovered by user U1 during their searching efforts.

Collaboration Engine 150

The collaboration engine 150 can be hosted on the user device 101 (see FIG. 4) (or operate via a proxy to a collaboration engine 150 hosted on another computer device—e.g. server) and can communicate with the collaboration server 152 over the communications network 11. The collaboration engine 150 is used by the user Un to help assemble or otherwise aggregate search information sets 154 from themselves and other users Un, based on received matching results of the user's Un search context(s) 156 with other users' search contexts 156. The collaboration engine 150 uses the collaboration server 152 to gain access to search information sets 154 of other users Un, as further described below. The collaboration engine 150 can also facilitate network 11 communication between the various users Un for the purpose of collaboration on identified search projects. Once a pair of users Un are recognised as having similar search contexts 156 and associated search information sets 154, the users Un may cooperate to further research/define different aspects of the search project. For example, user U1 (see FIG. 12) could investigate and share information (with user U3) on the best ranked Floridian resorts determined by their searching efforts and another user U3 could investigate and share information (with user U1) on the best deals for air travel and Floridian tours determined by their searching efforts. Accordingly, the collaboration engine 150 can facilitate social networking activities of the users Un with respect to access to each other's search information sets 154 and/or search contexts 156.

Figure 14:
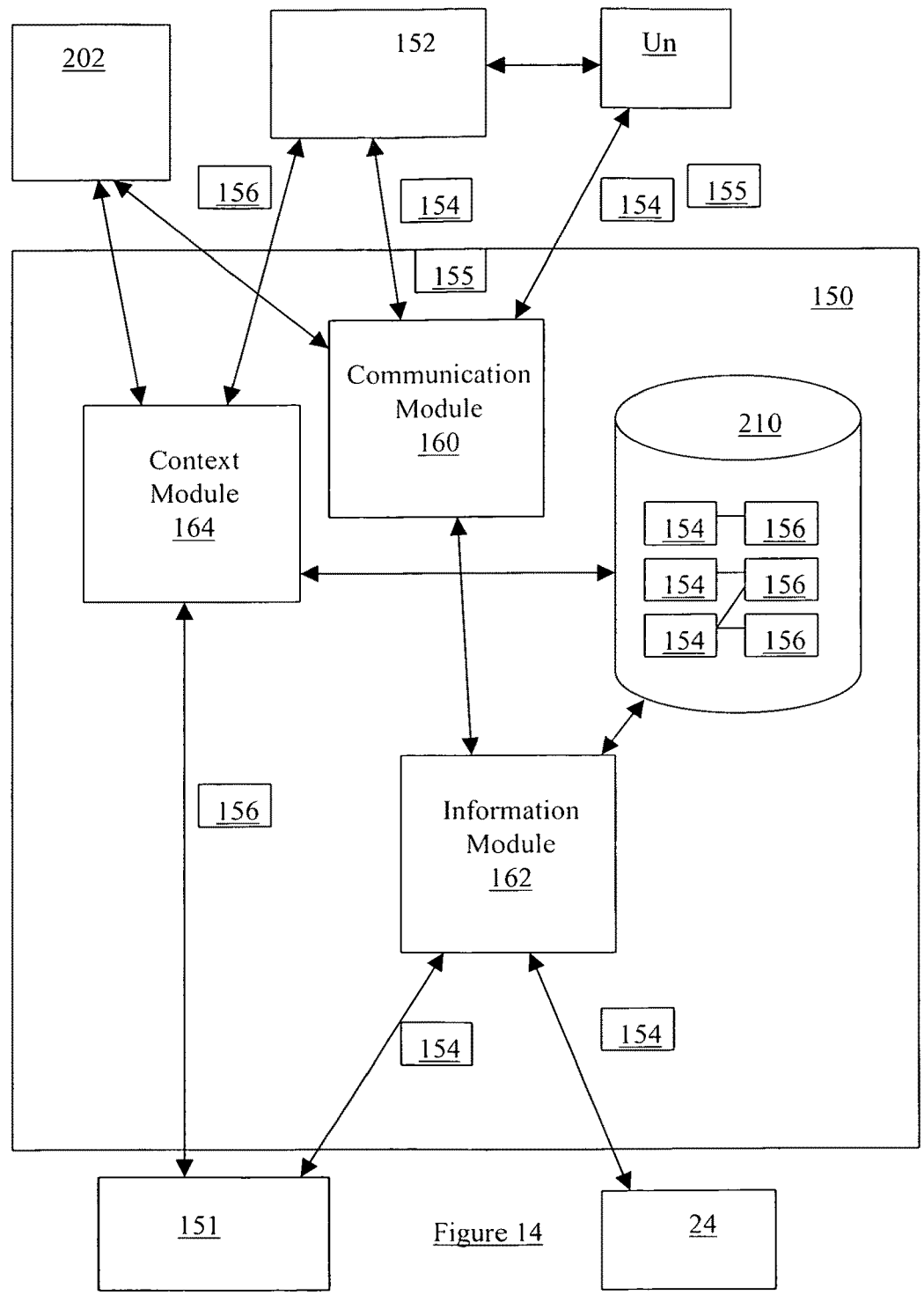
FIG. 14 is a block diagram of components of a collaboration engine of the environment of FIG. 10.

Referring to FIG. 14, shown is an example configuration of the collaboration engine 150. The collaboration engine 150 has a communication module 160 for facilitating communication between the different users Un (either directly over the network 11 or via the collaboration server 152 as configured), in particular for facilitating the exchange of search information sets 154 as well as any other messages (e.g. chat). The collaboration engine 150 can also communicate as part of a peer-to-peer network 11, for example constructed dynamically as part of social networking (or other structures) or collaborative activities.

The collaboration engine 150 also has an information module 162 for accessing the search information sets 154 of the user Un from the memory 210, as well as from the information sources 16 (see FIG. 10), for example via the search engine 24. It is recognised that the memory 210 can contain different search information sets 154, each with their assigned search contexts 156. The collaboration engine 150 also has a context module 164 that is configured to communicate the user's Un search context 156, obtained from the context engine 151 and/or the memory 210, as well as receiving the results of any matches with the search contexts 156 of other users Un from the collaboration server 152. The context module 164, as further described below, displays to the user (e.g. via the user interface 202) the identified other users Un and their associated search contexts 156, for subsequent selection and interaction with by the user Un.

Information Module 162

The engine 150 has the information module 162 for accessing the search information sets 154 of the user Un from the memory 210, as well as from the information sources 16 (see FIG. 10), for example via the search engine 24. It is recognised that the memory 210 can contain different search information sets 154, each with their assigned search contexts 156. Otherwise, the information module 162 could be used by the user Un to obtain the search information set 154 from the information sources 16 (via the network 11) and then interact with the context engine 151 to determine the respective search context 156 of the newly acquired search information set 154. For example, in the middle of a search over the Internet for Floridian trips, where the user Un is having difficulty finding an acceptable recommended resort, the user Un can submit (via the context module 164) the search context 156 of the search information set 154 to see if any other users Un currently have information on acceptable resorts.

In the case where desirable search information sets 154 from other users Un are requested and obtained by the user Un, the information module 162 can be used to aggregate or otherwise combine selected contents of the search information sets 154 of the users Un to result in an improved/modified search information set 154. The improved/modified search information set 154 could be sent to the context engine 151 for subsequent analysis, in order to generate a corresponding improved/modified search context 156, based on the improved/modified information 14 contents of the improved/modified search information set 154. In this regard, it is recognised that the user Un could then submit the improved/modified search context 156 (e.g. via the context module 164), in order to identify search contexts 156 of other users Un that may more closely match the improved/modified search context 156. In this regard, it is recognised that the user Un may iteratively improve/amend the information 14 contents of a selected search information set 154 through collaboration with other users Un, who have search contexts 156 that iteratively match the amended search information set 154 of the user Un.

The information module 162 can also be configured to facilitate the user Un to associate security attributes with portions of the search information sets 154. These security attribute provide for selected information 14 of the search information sets 154 to be completely private (e.g. specified as restricted to all other users Un), specified as shared within user Un identified groups and/or individual users Un (e.g. specified as only shared/restricted for some identified users Un), or shared in a public manner (e.g. specified as shared with all users Un). Further, portions of the search information sets 154 can be specified to be shared anonymously or to specifically identify the user Un. For example, the user's Un identifying information such as but not limited to user name, user network address, user contact information such as email address of telephone number and/or user location, etc. can be stripped from or retained by the search information sets 154 (and/or associated search context 156) before they are communicated to the other user(s) Un\. As such, any search context 156 score result requested by the user Un will only be returned (or returned anonymously) if the user Un meets the security requirement associated with other user's Un the search context 156 and/or corresponding search information set 154.

Further, only portions of the search context 156 and/or search information set 154 of the other user Un may be returned to the requesting user Un, depending on the level of security (e.g. marked private, marked public, or marked the requesting user Un is a trusted member of the other user Un) assigned to each portion of the search context 156 and/or search information set 154 of the other user Un. For example, the content portions (of the search context 156 and/or search information set 154) will only be delivered if the requesting user Un satisfies the corresponding security attributes of the content portions. It is recognised that a portion can be used to describe all (e.g. total) of the search context 156 and/or search information set 154, or a subset of all the search context 156 and/or search information set 154.

Context Module 164

The engine 150 has the context module 162 configured to communicate the user's Un search context 156, obtained from the context engine 151 and/or the memory 210, to the collaboration server 150. If available, the context module 162 also received the results of any matches with the search contexts 156 of other users Un from the collaboration server 152. It is also recognised that the context module 162 may receive a null set (e.g. no matching search contexts 156 available). The context module 164, as further described below, displays to the user (e.g. via the user interface 202) the identified other users Un and their associated search contexts 156, for subsequent selection and interaction with by the user Un.

The context module 162 can also be configured to facilitate the user Un to associate/assign security attributes (e.g. marked private, marked public, or marked the requesting user Un is a trusted member of the other user Un) with all (or selected portions thereof) of the search context 156. These security attributes provide for selected context definitions 160 of the search context 156 to be completely private (e.g. specified as restricted to all other users Un), specified as shared within user Un identified groups and/or individual users Un (e.g. specified as only shared/restricted for some identified users Un), or shared in a public manner (e.g. specified as shared with all users Un). Further, selected context definitions 160 (e.g. all or a portion thereof) can be specified to be shared anonymously or to specifically identify the user Un. For example, the user's Un identifying information such as but not limited to user name, user network address, and/or user location, etc. can be stripped from or retained by the context definitions 160 before they are communicated to the other user(s) Un. As such, any search context 156 score result requested by the user Un will only be returned (or returned anonymously) if the user Un meets the security requirement associated with other user's Un search context 156 and/or corresponding context definitions 160.

Communication Module 160

The collaboration engine 150 also has the communication module 160 for facilitating communication of messages 155 and search information sets 154 between the user Un and the collaboration server 152 and between the user Un and the other users Un directly, as desired. The communication module 160 can facilitate the collaboration of the users Un via a chat window displayed in the user interface 202. The user Un may desire to not identify themselves (e.g. remain anonymous) to the other users Un, in which case the chat messages 155 are formatted by the module 160 to be anonymous. Otherwise, based on a joint decision, the users Un can agree to continue to share all future searches (e.g. the search information sets 154) anonymously or with a user-identified nickname on the topic. This type of consent may done on search context 156 by search context 156 basis.

Figure 15:
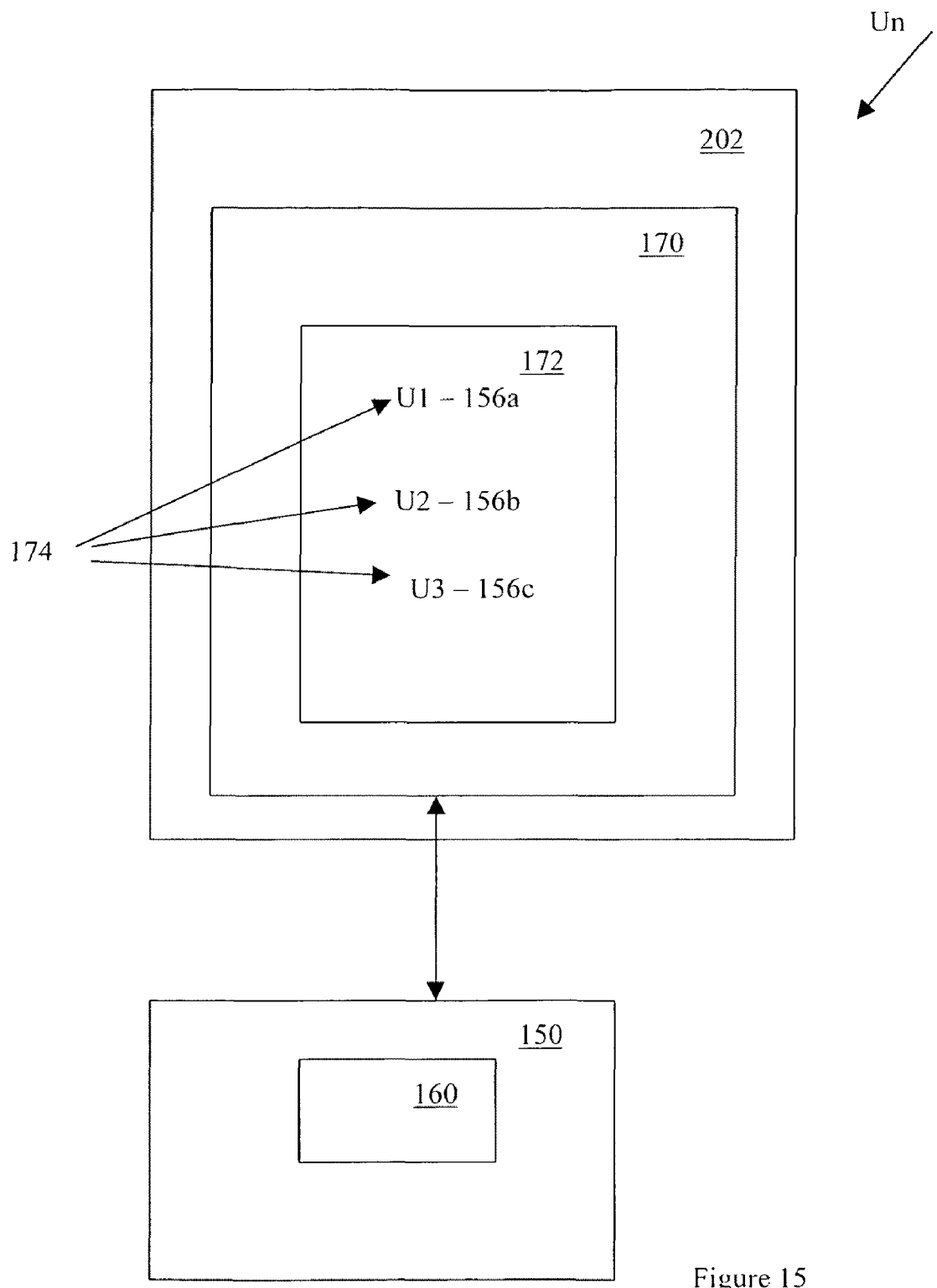
FIG. 15 shows an example result of a comparison process of the collaboration server of the environment of FIG. 10.

Referring to FIG. 15, an example display pane 170 (e.g. display frame) is shown on the user interface 202, as generated and submitted by the communication module 160 for interaction with the user Un. In the case of Internet searching, the window pane 170 can be a browser showing (e.g. anonymously) other users Un searching for content deemed (by the collaboration server 152) as containing information 14 related to the search context 156 (e.g. indicative of the users Un as conducting similar searching that may be applicable for subsequent user Un search collaboration) submitted to the collaboration server 152 by the user Un. For example, the pane 170 can contain a list 172 of links 174 (e.g. for users U1, U2, U3) that each have respective search context(s) 156 (e.g. 156a, 156b, 156c) determined as matching the submitted search context 156 of the user Un. It is also recognised that the pane 170 can also contain (not shown) individual lists 172 of users that each have search contexts 156 related a different specific search context 156 of the user Un (e.g. the user Un has more that one search context 156 that matches the search context(s) 156 of the other users Un as displayed in the pane 170). For example, each displayed user list 172 (of the other users Un) could be associated with a different search context of the user Un that submitted the search context 156 to the collaboration server 152.

Upon review of the list 172, the user Un can select (e.g. click) on one or more of the links 174 in order to request the corresponding search information set 154 from the other user (e.g. user U1, U2, and/or U3), either directly or via the collaboration server 152. For example, the chat opportunities can be displayed as clickable links on a web page. In the enterprise case, a picture and name of a colleague may appear on the user's user interface 202.

It is also recognised that the links 174 can be configured to display some or all of the context definitions 160 associated with the search contexts 156, in order to help the user Un make a decision as to which of the links 174 to select. As described above, once selected, the corresponding search information set 154 is accessed via the communication module 160 and then passed to the information module 162 for potential aggregation of the information 14 contents (e.g. selected information 14 automatically by the context engine 151 and/or manually by the user Un). For example, the context engine 151 can select information 14 from the search information set 154 received from the other user Un based on information scoring performed by the content analyser module 102 (see FIG. 2), such that the content analyser module 182 of the context engine 151 is similarly configured.

The communication module 160 can also be configured to facilitate the user Un to communicate the messages 155 anonymously or to specifically identify the user Un. For example, the user's Un identifying information such as but not limited to user name, user network address, and/or user location, etc. can be stripped from or retained by the messages 155 before they are communicated to the other user(s) Un. The communication messages 155 can also be used to facilitate social networking activities of the users Un with respect to access to each other's search information sets 154 and/or search contexts 156.

Context Engine 151

Figure 16:
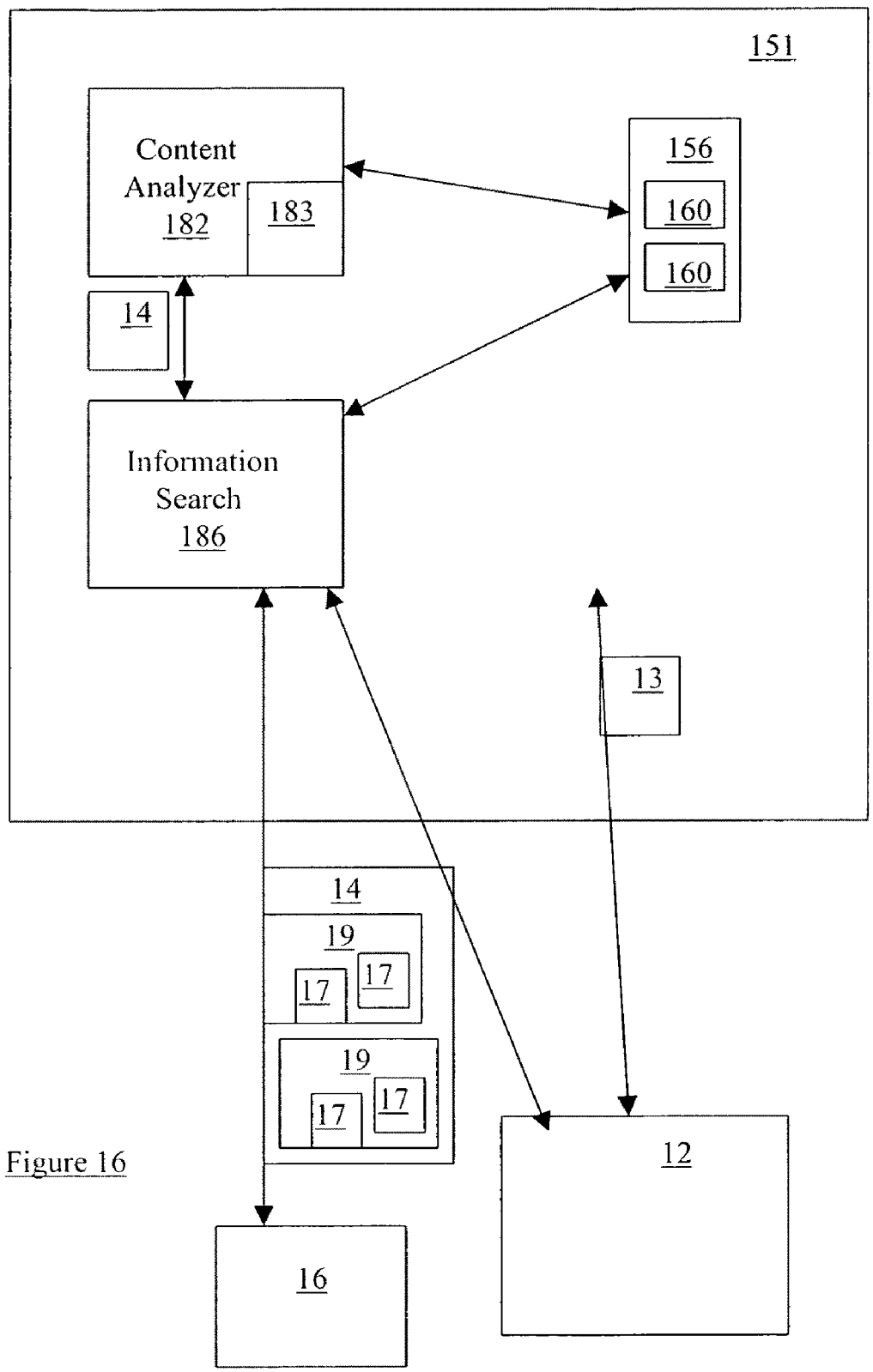
FIG. 16 shows an example configuration of a context engine of the environment of FIG. 10.

Referring to FIG. 16, the context engine 151 manages and uses the contextual information of the search context 156, as the user works to create or compile documents and other data with respect to the search information set 154. Each piece of user-manipulated information 14 (e.g. a document) that is associated (manually, automatically, semi-automatically) with the search context 156 can be analyzed, in order to determine representative context definitions 160. For collaborative purposes via the collaboration engine 150, these context definitions 160 of the search context 156 can be used to find colleagues in the enterprise that are working on the same subject matter while adhering to privacy and security policies, for example. It is also recognised that the collaboration can be facilitated between the user Un and other users Un of the environment 140 (see FIG. 10) over the Internet 11, as desired. In addition, the context engine 151 uses these determined context definitions 160 to categorize and annotate the information 14 and optionally their associated application programs, where desired. This annotation of the information 14 can be a done in the enterprise prior to submitting the information 14 (e.g. documents) to enterprise search engines 24 and/or document management systems.

The context engine 151 can be actively or passively directed to include user-manipulated information 14 for analysis by a content analyzer 182 (see FIG. 16), in order to determine the search context 156 of the search information set 154. An example of active direction is where the user chooses one or more of the information 14 to be assigned to the search context 156. An example of passive direction is where the context engine 151 is configured to automatically choose (e.g. without manual user interaction) any information 14 manipulated (e.g. created, amended, accessed nor otherwise obtained, etc.) by the user in interaction with the information sources 16 and/or the local storage 210. For example, the context engine 151 could determine appropriate context definitions 160 determined from those search results 20 that the user selected from search results 20 list (e.g. by clicking on the links from the list) and add those appropriate context definitions 160 to the search context 160 of the information set 154, while choosing to ignore those search results the user did not select from the search results 20 list (e.g. by not clicking on the links from the list).

It is also recognised that the selection of information 14 for use in search context 15 generation could be automatically suggested to the user by the context engine 151, for example using a display prompt, which provides the user the ability to either accept or reject association of the selected information 14 to the search context 156 determination. It is recognised that when the selected information 14 is selected to be associated with the search context 156, the context engine 151 determines any context definitions 160 (via the content analyzer 182) resident in the selected information 14 and then updates the context definitions 160 of the search context 156 with these newly determined context definitions 160, thereby providing for a dynamic update capability of the search context 156.

It is recognised that another embodiment of association of the selected information 14 with the search context(s) 156 of the search information sets 154 can be using time-based passive direction. For example, the search results 20 can be used to positively refine the context definitions 160 of the search context 156 if the user stays on (i.e. interacts with) the destination resource 16 for more than a predefined period of time (e.g. 45 seconds) and can also be used to negatively refine the context definitions 160 of the search context 156 if the user closes the destination resource 16 within a predefined period of time (e.g. 5 seconds). Also, the search context 156 of the information 14 (e.g. files or web content) can be added automatically to the search context 15 of the search information set 154 when the user moves the information 14 (e.g. actual file or a link to information 14) into a monitored area of the user's desktop, such as "My Document" or their desktop, for example. In the case of a webpage as the information 14, adding the information to "My Favourites" of the browser application would automatically add the associated context definitions 160 to the corresponding search context 156.

Referring to FIGS. 10 and 16, shown is one embodiment of the context engine 151 for processing of search requests 18 (if directed by the collaboration engine 150), providing search results 20 to the user (if directed by the collaboration engine 150), and updating of the search context 156 (if directed by the collaboration engine 150) based on the determined context definitions 160 resident in the newly acquired information 14 of the search results 20 for those newly acquired information 14 deemed (by the context engine 151 and/or manually by the user).

Content Analyzer Module 182

The content analyzer module 182 can use a rule set 183 to instruct or otherwise guide the module 182 to analyze specific information 14 (e.g. the search information set 154) for any resident context definitions 160 via a menu provided by the user interface 202 (see FIG. 4). A preferred embodiment can use a tray icon to allow the user to access the context menu that facilitates information 14 to be chosen for association with the search context 156. It is recognised that the specific information 14 can be: from a newly acquired user Un search result(s) 20 and therefore used to generate a new search context 156 for the user Un; and/or can be additional information 14 (either from the user Un or from other users Un) to be aggregated or otherwise combined with the existing search information set 154 of the user.

For example, the rule set 183 can be a search method for recognising frequently occurring and otherwise unusual words and/or word groupings in the information 14. Further, it is recognised that the rule set 183 can be configured to use user Un assistance to select identified words/word groupings for use as the context definitions 160. For example, the rule set 183 can be configured to ignore certain words or word groupings (e.g. and, or, but, etc.) as well as to identify selected passages (e.g. sentences, pages, paragraphs, titles, etc.) in the information 14 that contain predefined word(s). For example, the rule set 183 can be configured to instruct the module 182 to highlight (to the user Un) all information 14 passages that contain the terms "Florida", "trip", "resort", and "deal". It is recognised that the rule set 183 can be modified by the user to contain context definitions 160 from selected search contexts 156, as these predefined word(s) and/or word patterns. Once the passage(s) are identified in the information, the user Un can be given the opportunity by the module 182 (e.g. via a display of the passage(s) on the user interface 202) to select certain word(s) and/or word groupings from the identified passage(s) as deemed by the user Un to be representative of the information 14. The module 182 would then associate the user selected word(s) and/or word groupings to become part of the search context 156 (as context definitions 160) for the search information set 154 containing the information 14.

As examples, identification and analysis of information 14 content to be included in the search context 156 can be done implicitly and/or explicitly. Explicitly included content are information 14 (e.g. documents) identified by the user. For example, a "right click" on files or folders by the user and then a selection of a menu choice to add to the search context 156 would result in the selected information 14 being made available to the content analyzer module 182 for context definition 160 analysis. As well, a right click on word(s) in the identified passage(s) could also be used to instruct the module 182 to assign the selected word(s) to the associated search context 156. The user Un can also be given the option (e.g. via the display) to identify from a list which search context 156 the selected word(s) should be assigned to. For example, upon closer inspection of the information 14 and the identified passage(s), the user Un can decide that the information 14 is not representative of the current search context 156 but is instead attributable to a different search context 156 (new or existing).

Further, information 14 content may be implicitly included with the search context 156 by monitoring the creation or access of information 14 (e.g. documents or other data resources) by the user with respect to the search information set 154 (of the user Un and/or as obtained from the other users Un). Otherwise, information 14 documents may be implicitly included with the search context 156 by examining where the information 14 is located in the local memory 210 (and/or which source 16 the information originated from, including the other users Un). For instance, information 14 located in the My Documents folder may be implicitly included in the search context 156 via the content analyzer module 182. Another option is for Web pages, which may be implicitly included in the search context 156 by the user simply viewing them (e.g. for a pre-determined period of time or by the user identifying by a toolbar based control that the page (URL) should be included in the search context 156. For example, these Web pages could be accessed by the user Un via interaction with the information 14 contents of the search information set(s) 154 obtained from the other user(s) Un, in response to the determined matching performed by the collaboration server 152. It is also recognised that Web pages may be implicitly included in the semantic context 15 by the user identifying by a toolbar based control, menu selection or other user input feedback mechanism that the page (URL) should be included in the semantic context 5.

The content analyzer module 182 is configured for extracting word/words/phrases/word groupings (e.g. textual portions 17) from the chosen information 14 to be used as context definitions 160 for use in amending or otherwise creating the search context 15. It is recognised that in the case of two or more words being included in the textural portion 17, these words may be adjacent to one another (e.g. considered as a multiword phrase) in the text of the information 14, may be separated from one another by one or more intermediately positioned words in the text of the information 14, or a combination thereof.

The context definitions 160 can include detected word patterns, hence indicating that the words contained in the information 14 have a certain relationship to one another. Further, the relative location/position of the textual portions 17 in the information 14 can facilitate the identification of the word pattern/association, e.g. two words are predominantly (e.g. always) found adjacent to one another, one word is predominantly (e.g. always) found in the first sentence of each paragraph or in the first paragraph of each page or in the title of each section, etc.

Further, in view of the above, it is recognised that one example embodiment of the context engine 151 is the context engine 100 described with respect to the system 10 of FIG. 1, wherein the content analyser module 182 is configured similarly to the content analyser module 102 (see FIG. 2).

Further, the content analyzer module 182 can create a web of knowledge (i.e. interconnections between the individual context definitions 160) between words, patterns, semantic structures and data identified in the information 14. This web can be accessed hierarchically in any number of ways and overlaid with new relationships at anytime. This means that information within the search context 156 can be organized and accessed at any level. This subject matter, patterns, key words, paragraphs, sentences and other language structures. In practice this means that subject matter can be organized and/or accessed by a user based on its subject matter or from the actual text in the information 14. For instance, a user can click on a paragraph referring to a specific context definition 160 and the context engine 151 can identify all the sections of other information 14 (e.g. documents) that are relevant to that context definition 160. For example, any material, a document or part of a document, can be used to create search context 156. This information can be used to construct a new search to find related information or it can be used to test against the user's existing search contexts 156.

In the case of collaboration (e.g. anonymous), an example would be users Un sharing search results 20 and/or search information sets 154. As the user Un searches the Internet and/or a file system (e.g. database) the module 182 builds context definition 160 data based on the user's Un activities, which triggers material being added to the search context 156. These triggers can include reading results in the browser, identifying results 20 (e.g. documents) as relevant or irrelevant (e.g. storing the results 20 in a predefined folder or file of an application), bookmarking results 20 or adding links to the users file system. It is recognised that the module 182 can track the user's activities by monitoring the file system and browser behaviour for example.

Also recognised is that the any matching context definitions 160 (and/or search information set 154) associated with the other user can be filtered according to a selected time period, as specified by the user and/or the collaboration engine 150. For example, the user may wish to identify those other users having content that is associated with a selected time period (e.g. within the last month, within the last week, within the current day, within the last year, etc.). Therefore, any content definitions 160 and/or search information set 154 that does not satisfy the selected time period could be filtered out by the collaboration engine 150, for example, as not relevant to the user.

Information Search Module 186

The content search module 186 is used by the context engine 151 to provide for information 14 retrieval to the user Un that may be relevant in view of the search context 156. For example, the information 14 can be obtained from desktop, enterprise and Internet search results 20 and appropriate information 14 can be chosen by the user and/or the context engine 151 for analysis by the content analyzer module 182. For example, an outbound search request 18 can be augmented by the content search module 186 using precise topic information (i.e. context definitions 160 obtained from the search context 156). Further, inbound data (i.e. information 14) from the search results 20 can be screened and prioritized/ranked via the content analyzer module 182.

One example operation of the search module 186 is when the user enters a query 18 (search bias) (typically by using key words for the parameters 22 as well as any logical operators—brackets, AND, NOT, OR, etc.—for qualifying the parameters 22), the content search module 186 examines its search context 15 and provides a listing of best-matching context definitions 160 that can be used to augment the user supplied search parameters 22 (e.g. a user parameter 22 of documentaries would be augmented with the context definition 160 of "historical interest", as the definition of "documentaries" is tied to the context definition 160 of "historical interest" in the search context 156). Accordingly, a modified search request 18 would be sent to the search engine 24 to obtain search results 20 that best match "documentaries" AND "historical interest" (e.g. as a series of web pages according to the search engine's 24 criteria, usually with a short summary containing the document's title and sometimes parts of the text). It is recognised that the content search module 186 can support the use of the Boolean operators AND, OR and NOT, for example, to further specify the search query 18 via the search context 156. Further, the search module 186 can also augment the search request 18 by defining a proximity search in view of the search context 156, which defines the acceptable distance between keywords in the search results 20.

A further embodiment of the search module 186 is to use matching of words, word phrases in the information 14 of the search results 20 with the context definitions 160 of the search context 156 to rank the results 20 to provide the "best" results first (e.g. for those results having a higher relative number or score measurement of context definition 160 matches as a degree of relatedness of the information 14 to the search context 156). Further, the search module 186 can also include inclusion thresholds. For example, any match between particular information 14 that matches less than a minimum number or score measurement of the definitions 160 of the search context 15 would preclude the display of the particular information in the search results 20 (or otherwise place the information 14 at a lower position in the ranking than that provided by the search engine 24).

In any event it is recognised that the context engine 151 is used by the collaboration engine 150 to examine received information 14 for a determined degree of relatedness with the search context(s) 156 and to update the search context 156 with any newly identified context definitions 160. Further, the context engine 151 can assist the collaboration engine 150 in submitting search requests 18 over the network 11 to obtain information 14 for modifying the contents of the search information set(s) 154, including the ability to modify the search parameters 22 using the context definitions 160 selected from the search context 156. It is also recognised that one embodiment of the context engine 151 is the context engine 100, as described above with reference to FIG. 1.

Collaboration Server 152

Figure 17:
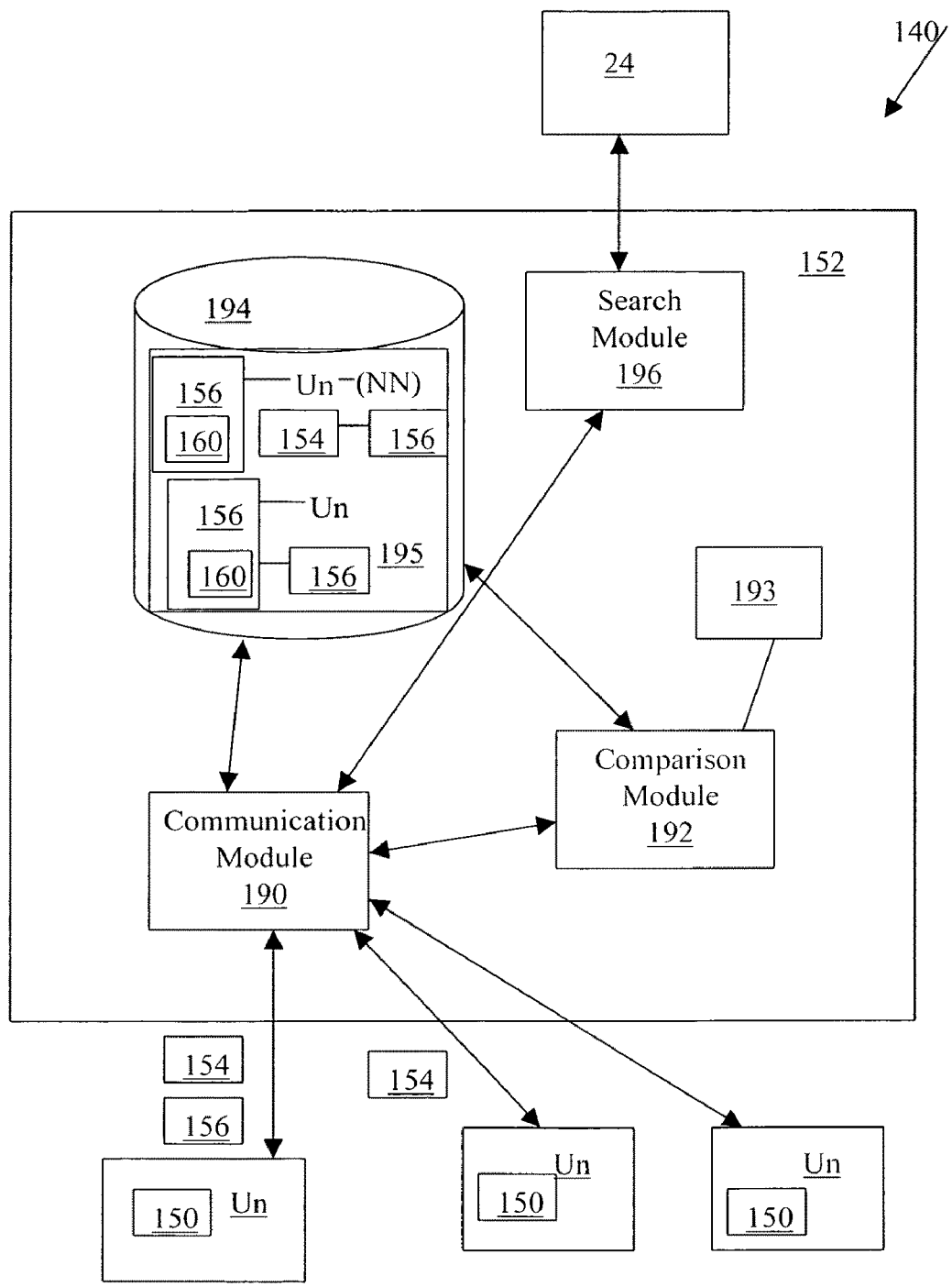
FIG. 17 is a block diagram of components of a collaboration server of the environment of FIG. 10.

Referring to FIG. 17, shown is an example embodiment of the collaboration server 152. In some collaborative and/or social networking activities of the collaboration environment 140 (see FIG. 10), for instance, collaborative search or identifying colleagues/friends (e.g. other users Un) within the social networking environment is desired by the user Un, where the other users Un may be potentially working or interested in the same subject matter (e.g. search project) as the user Un. The collaboration server 152 includes a comparison module 192 accessible by the collaboration engines 150 on the client machines 101 of the users Un. In this case, the communication module 190 receives or otherwise requests from the collaboration engines 150 one or more search contexts 156 that can be associated with the respective Un from which the search context 156 was obtained. The obtained search contexts 156 are stored in a memory 194 and are associated with the user Un and/or the corresponding search information set 154. It is recognised that the user Un submitting the search context 156 may desire to send the search information set 154 also with the search contest 156, which may be stored also in the memory 194 as being associated with the corresponding search context 156.

The server 152 then compares the search contexts 156 to one another using a comparison module 192 in order to determine matches between the search contexts 156, e.g. according to different levels of match granularity, such as but not limited to: search contexts 156 to search contexts 156; context definitions 160 to search contexts 156; context definitions 160 to context definitions 16; and/or search contexts 156 to context definitions 16. The score results of the context matching are used to identify users Un that have shared interests (e.g. one or more portions of the information 14 in their search information sets 154 are potentially useful to each of the matched users Un). Shared interests are identified by scores satisfying a match threshold between context definitions 160 associated with each user Un via their respective search contexts 156.

The communication module 190 can then provide the collaboration engines 150 with the user Un identities (e.g. actual or as anonymous using an alias/nickname NN stored by the collaboration server 152, for example), as well as the corresponding search contexts 156 of the other users. For example, referring to FIG. 12, in the event that the submitted search context 156a is determined to match the search context 156c, both or at least one of the users U1,U3 would be contacted by the collaboration server 152 with the identity of the other user (e.g. user U1 is informed of the search context 156a match with the search context 156c of user U3 and/or user U3 is informed of the search context 156c match with the search context 156a of user U1). The contacted user(s) Un could then inspect the search context 156 of the other user Un and then decide whether to contact the other user Un to obtain the search information set 154 (or at least portions thereof) corresponding with the inspected search context 156.

It is recognised that information which may be used to share identities or information 14 between the users Un can be based on the security attributes associated with the search contexts 156 (or individual context definitions 160, etc.). Further, this information sharing may not include the collaboration server 152 and may instead be implemented on networks 11 that provide broadcast or peer-to-peer capabilities. In any event it is recognised that the collaboration server 152 is configured to determine matches between different search contexts 156 and to then communicate the results of the matching process with the user(s) Un associated with the search contexts 156.

Communication Module 190

The communication module 190 can facilitate communication of search contexts 156 and search information sets 154 between the users Un and the collaboration server 152 and between the user Un and the other users Un, as desired. The user Un may desire to not identify themselves (e.g. remain anonymous) to the other users Un, in which case messages for the users Un are formatted by the module 190 to be anonymous (e.g. using the alias names NN of the users Un). Otherwise, based on a joint decision, the users Un can agree to continue to share all future searches (e.g. the search information sets 154) anonymously or with a user-identified nicknames. This type of consent may done on search context 156 by search context 156 basis. It is also recognised that the communications between the users Un can be facilitated via the module 190 (e.g. users Un send and receive messages associated with other users Un via the module 190) or the users Un can communicate with one another directly via the network 11.

The communication module 190 can be configured to facilitate the user Un to communicate with other users Un anonymously or to specifically identify the user Un. For example, the user's Un identifying information such as but not limited to user name, user network address, and/or user location, etc. can be stripped from or retained by the module 190 before the user content (e.g. search context 156, search information set 154, etc.) is communicated to the other user(s) Un. The module 190 can be used to facilitate social networking activities of the users Un with respect to access to each other's search information sets 154 and/or search contexts 156.

Comparison Module 192

The comparison module 192 can use a rule set 193 to instruct or otherwise guide the module 192 to analyze the search contexts 156 for any resident context definitions 160 that match other context definitions 160 of other available search contexts 156 in the memory 194. It is recognised that the search contexts 156 can be newly acquired from a user Un and/or can be resident in the memory 194 as obtained previously from the user Un or from other users Un.

For example, the rule set 193 can be a search method for recognising similar context definitions 160 in the different search contexts 156, as well as different variations (e.g. word groupings) of the context definitions 160. For example, the context definition of "Floridian trip" in one search context 156 would be deemed a match of a pair of context definitions of "Florida" and "inexpensive trip" of another search context 156. It is recognised that a match threshold can be used to determine if the number of context definitions 160 matched signifies that a pair of search contexts 156 match. The module 192 would then associate the matching search contexts 156 to the corresponding users Un (e.g. available from the memory 194) and then the module 192 would make the results of the matching process available to the communication module 190.

The module 192 is configured for extracting the context definitions 160 (e.g. word/words/phrases/word groupings) from the search contexts 156 for comparison purposes with respect to one another from different search contexts 156. It is recognised that the context definitions 160 may also contain information on the positioning of the word(s) in the information 14 (e.g. the word "Florida" is in the link title and in the first paragraph of the content associated with the link). As well the context definitions 160 may also contain information on relative groupings of word(s) with one another (e.g. "Florida" or "Floridian" and "trip" and "luxury"). Further, it may be specified in the context definitions 160 that the words may be adjacent to one another (e.g. considered as a multi-word phrase) in the text of the information 14, may be separated from one another by one or more intermediately positioned words in the text of the information 14, or a combination thereof.

The context definitions 160 can include detected word patterns, hence indicating that the words contained in the information 14 have a certain relationship to one another. Further, the relative location/position of the words (in the context definitions 160) in the information 14 can facilitate the identification of the word pattern/association, e.g. two words are predominantly (e.g. always) found adjacent to one another, one word is predominantly (e.g. always) found in the first sentence of each paragraph or in the first paragraph of each page or in the title of each section, etc.

Further, in view of the above, it is recognised that one example embodiment of the comparison module 192 is the context analyser module 102 described with respect to the context engine 100 of the system 10 of FIG. 1.

The comparison module 192 can also be used to aggregate matching search contexts 156 from numerous users Un and then provide the communication module 190 with matching data (e.g. the matching search contexts 156 and/or links to the corresponding search information sets 154) that can be displayed to the users Un to facilitate the user Un interaction with other users Un working on search projects that are similar in semantic context to that on the user Un.

Also recognised is that the any matching context definitions 160 (and/or search information set 154) associated with the other user can be filtered according to a selected time period, as specified by the user and/or the collaboration engine 150 (or server 152). For example, the user may wish to identify those other users having content that is associated with a selected time period (e.g. within the last month, within the last week, within the current day, within the last year, etc.). Therefore, any content definitions 160 and/or search information set 154 that does not satisfy the selected time period could be filtered out by the collaboration engine 150 (or server 152), for example, as not relevant to the user.

Memory 194

The memory 194 stores obtained search contexts 156 in a table 195 or other structured memory construct and the search contexts 156 are associated with the user Un and/or the corresponding search information set 154. It is recognised that the user Un submitting the search context 156 may desire to send the search information set 154 also with the search contest 156, which may be stored also in the memory 194 as being associated with the corresponding search context 156. The memory 194 can also be used to store the alias names NN of the users Un.

Search Module 196

The search module 196 can be used by the collaboration server 152 to communicate with the search engine 24 (e.g. an Internet search engine, a database manager, etc.). For example, the collaboration server 152 could be hosted by the search engine 152 and therefore be used as a client interface (for the users Un) for the communication of search requests 18 and search results 20 (see FIG. 10), as well as for receiving and processing of match requests for specified search contexts 156, as desired.

It is recognized that the communications network 11 of the environment 140 can include a plurality of the collaboration servers 152. It is also recognised that in view of the above-described components of the system 10 and the environment 140, the term engine can be used interchangeably with the term system and the term server can be used interchangeably with the term system.

Accordingly, in view of the above, it is recognised that the search 18 can be initiated by the engine 150 without any user interaction (other than by enabling or otherwise selecting a context 156 for the FoR 12). Further, context/collaboration matches may not only be found by matching users searching via the information sources 16 or collaboration server 152. In the case of the collaboration server 152, the server 152 can also link collaboration engines 150 even when the user has not explicitly initiated the search 18. For example, the user's collaboration engine 150 could send the context definitions 160 and/or context 156 to the collaboration server 152 and the server 152 could connect to other collaboration engines 150 (e.g. of other users) with information on that context definitions 160 and/or context 156 and setup the appropriate links for chat or identification of the collaborator (e.g. user) of the requesting collaboration engine 150. The context definitions 160 and/or context 156 are sent by the collaboration server 152 not as a search but as a collaboration request 18.

In one embodiment, the received other information (e.g. from the other users connected to the user via the network 11) can be information 14 obtained from an information query 18 such as but not limited to: a database query; a structured query of a document; and/or a Web query. The received other information can be based on the user request 18 or based on the request 18 of the collaboration engine 150 of the user independently of user interaction. For example, the request 18 of the engine 150 can be a predictive query initiated by the engine 150 based on activities of the user, such as but not limited to: when the user is in the context 156 in the frame of reference (e.g. FoR 12) but before submission of the user request 18; when the user is in the context 156 in the frame of reference (e.g. FoR 12) but during submission of the user request 18; and when the user is in the context 156 in the frame of reference (e.g. FoR 12) but after submission of the user request 18.

Further, for example, predictive searching (e.g. submission of the request 18) and associated predictive retrieval (e.g. receipt of the response 20) directly by the engine 150 can occur when the user is in the context 156 before, during or after any searches have been conducted. The engine 150 can construct the query string (of the predictive request 18) from the determined important patterns of the most determined context definitions 160 in the context 156. The search string can be a set of non-overlapping patterns combined (e.g. OR'ed) together. The search is initiated by the engine 150 through communication with the server 152 and/or information sources 16. Note, in the case of the collaboration server 152, the search string may not be used for matching of other contexts 156, but rather selected context definitions 160 within the context 156. The user can then be presented with search and collaboration results 20 when they open (or otherwise interact with) a corresponding application (e.g. Microsoft Word, Web Browser, etc.) of the FoR 12. It is also recognised that the engine 150 may use the search string. When there are no context definitions 160 available, the engine 150 and/or the server 152 can use the search string as a degenerate case, e.g. selected as a single context definition 160, such that the search string can be considered as a context definition 160 in the case where it is the only information available (e.g. for the search context 156) by the engine 150 and/or the server 152.

Further, for example, when the user opens an application of the FoR 12, such as a web browser or file explorer or other application on their computer, auto completion capabilities in search text boxes can provide search suggestions to the user in a dropdown combo box. This is done via the engine 150 by using key patterns from the context definitions 160 selected from the contexts 156 to give the user contextually based type ahead search/query suggestions that they can select from a dropdown list, for example.

Operation of the Environment 140

Figure 18:
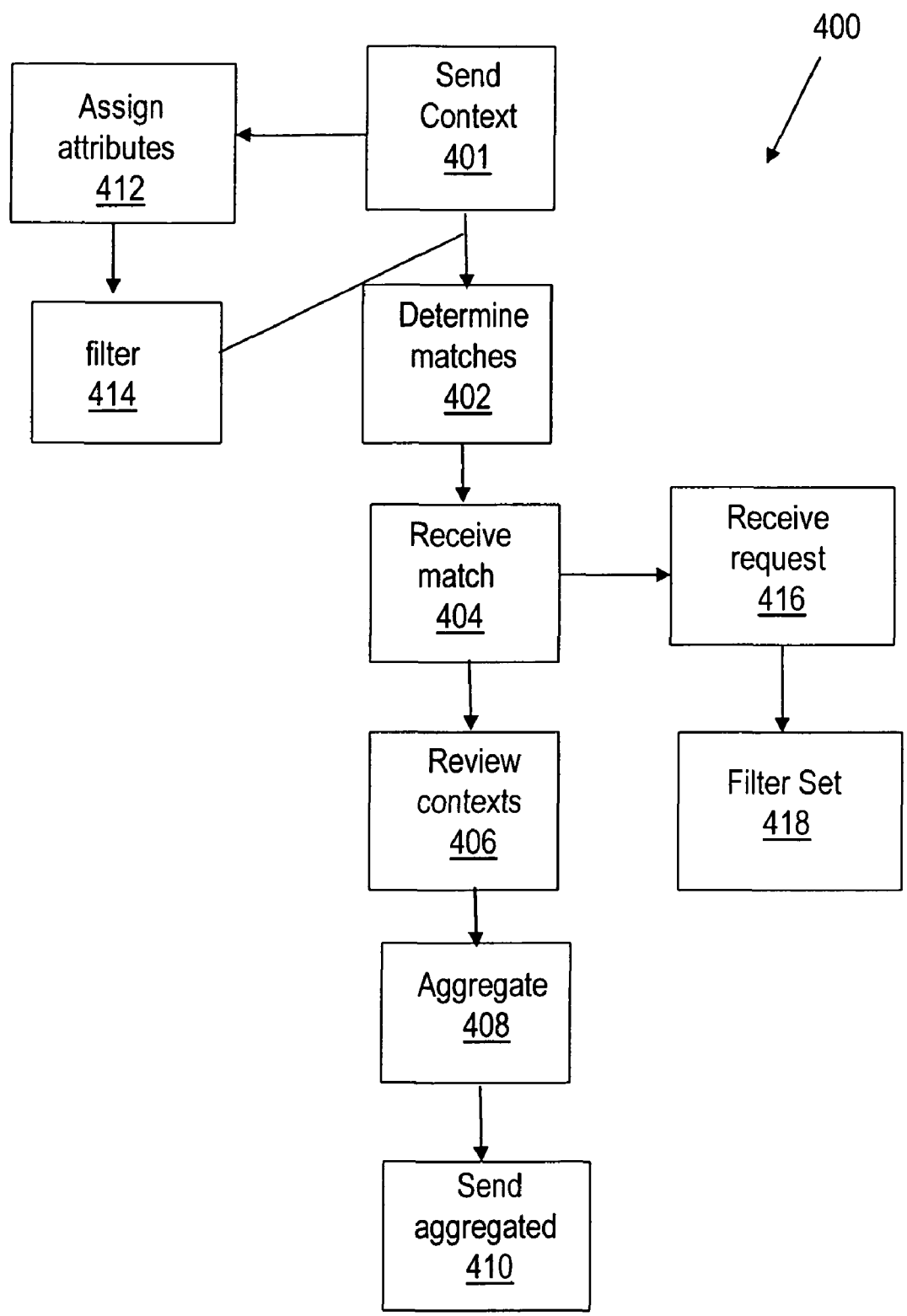
FIG. 18 is a flowchart of operation of the environment of FIG. 10.

Referring to FIGS. 10, 14, and 18, shown is an example operation 400 of the collaboration environment 140 for facilitating social networking of a plurality of users Un pertaining to shared subject matter over the communications network 11. At step 401, the context module 164 sends the search context 156 to the collaboration server 152 for use in determining another user of the collaboration server 152 being associated with similar subject matter. It is recognised that the search context 156 includes a first plurality of context definitions 160 such that each of the first plurality of context definitions 160 has one or more words Wn selected from a first plurality of information 14 belonging to a first search information set 154 of the user. The first plurality of information 14 are related to each other, such that the relation is represented by the first plurality of context definitions 160 of the search context 156.

At step 402, the collaboration server determines any suitable matches between the first context definitions 160 of the first search context 156 and second context definitions 160 of any second search context(s) 156.

At step 404, the context module 164 receives at least one matching second search 156 context associated with another user such that the matching second search context 156 contains a second plurality of context definitions 160 considered to match at least some of the first plurality of context definitions 160, the matching search context definitions 160 including one or more words Wn selected from a second plurality of information 14 belonging to a second search information set 154 associated with the another user.

At step 406, the user Un investigates or otherwise reviews the received second search context(s) 156, for example via the user interface 202. At step 408, the user uses the communication module 160 to request access to the second search information set 154 associated with the other user. This request can be sent via the collaboration server 152 or directly to the another user via the network 11. It is recognised that selecting the matching search context can be done from a list 172 (see FIG. 15) of a plurality of received matching search contexts 156 associated with a plurality of respective other users, such that each of the plurality of received matching search contexts 156 are associated with a corresponding search information set 154.

At step 408, the information module 162 is used to aggregate selected information 14 content of the second search information set 154 with the information content 14 of the first search information set 154, as well as aggregating selected context definitions 160 corresponding to the selected information content 14 with the context definitions 160 of the search content 156 assigned to the first search information set 154.

At step 410, the context module 164 can send the aggregated search context 156 to the collaboration server 152 for use in determining another user of the collaboration server 152 being associated with similar subject matter represented by the aggregated search context 156.

It is also recognised that at step 412, optionally the user can assign one or more security attributes to portion(s) of the search first information set 154, as well as to the first search context 156, the security attribute(s) defining an access level of the portion with respect to the plurality of users of the collaboration server 152. At step 414, the user can filter the content of the first search context 156 prior to sending the search context 156, the filtering based on assigned the security attribute. At step 416, the user can optionally receive a request for the first search information set 154 from the another user and then send the first search information set 154 in response. Optionally, at step 418, the user can filter the content of the first search information set 154 prior to sending to the another user, the filtering based on assigned security attributes.

Figure 19:
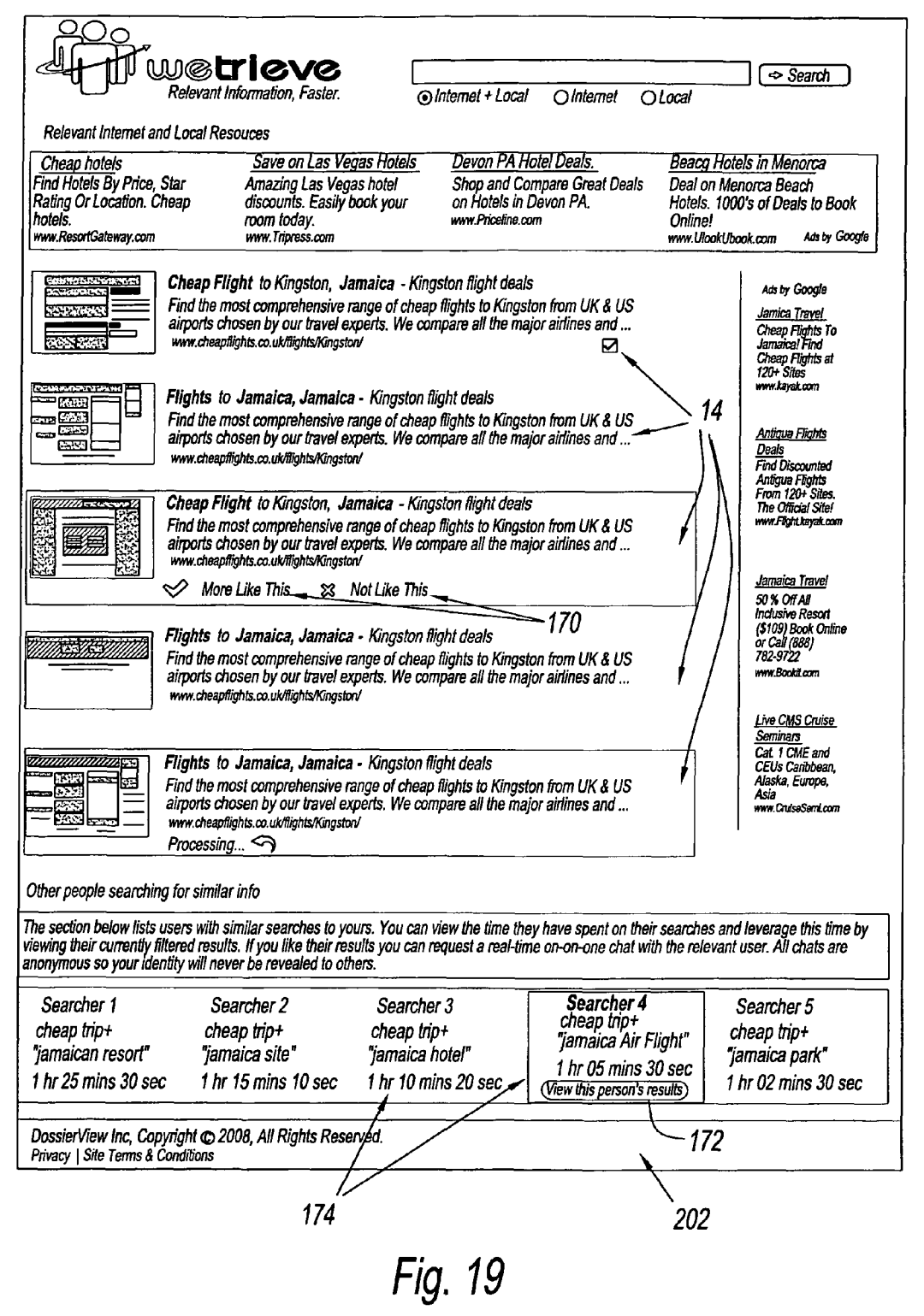

Referring to FIG. 19, shown is an example user interface 202 display provided by the collaboration server 152 and therefore manipulated by the user's collaboration engine 150. For example, licking one button 170 can instruct the collaboration engine 150 to add the selected information 14 to the positive context definitions 160 of the context 156 and clicking the other button 170 can instruct the collaboration engine 152 to add the selected information 14 to the negative context definitions 160 of the context 156. Further, clicking on an information 14 reference and bookmarking it would/could also facilitate adding the information 14 reference to the context 156, for example. Further, buttons 172 can also be used to access the identified collaborators 174 (e.g. via the collaboration server 152 over the network 11).

Computing Devices 101

Referring to FIGS. 1 and 4, each of the above-described components of the system 10 and/or collaboration environment 140, e.g. the user, context engine 100,151, the collaboration server 152, the collaboration engine 150, the information sources 16, and the search engine 24 can be implemented on one or more respective computing device(s) 101. The devices 101 in general can include a network connection interface 200, such as a network interface card or a modem, coupled via connection 218 to a device infrastructure 204. The connection interface 200 is connectable during operation of the devices 101 to the network 11 (e.g. an intranet and/or an extranet such as the Internet, including wireless networks), which enables the devices 101 to communicate with each other as appropriate. The network 11 can support the communication of the search request 18 and the corresponding search results 20 between the components of the system 10 and/or collaboration environment 140. It is recognised that the functionality of any of the components can be hosted on the user device 101, hosted on a device 101 remote to the user via the network 11, or a combination thereof.

Referring again to FIG. 4, the devices 101 can also have a user interface 202, coupled to the device infrastructure 204 by connection 222, to interact with a user. The user interface 202 is used by the user of the device 101 to view and interact with the FoR 12. The user interface 202 can include one or more user input devices such as but not limited to a QWERTY keyboard, a keypad, a track-wheel, a stylus, a mouse, a microphone and the user output device such as an LCD screen display and/or a speaker. If the screen is touch sensitive, then the display can also be used as the user input device as controlled by the device infrastructure 204. For example, the user interface 202 for the devices 101 used by the users can be configured to interact with a web browser (e.g. part of the FoR 12) to formulate the search requests 18 as well as process the received search results 20.

Referring again to FIG. 4, operation of the devices 101 is facilitated by the device infrastructure 204. The device infrastructure 204 includes one or more computer processors 208 and can include an associated memory 210 (e.g. a random access memory). The computer processor 208 facilitates performance of the device 101 configured for the intended task through operation of the network interface 200, the user interface 202 and other application programs/hardware 207 of the device 101 by executing task related instructions. These task related instructions can be provided by an operating system, and/or software applications 207 located in the memory 210, and/or by operability that is configured into the electronic/digital circuitry of the processor(s) 208 designed to perform the specific task(s). Further, it is recognized that the device infrastructure 204 can include a computer readable storage medium 212 coupled to the processor 208 for providing instructions to the processor 208 and/or to load/update client applications 207 and the context engine 100 if locally accessed. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 210. It should be noted that the above listed example computer readable mediums 212 can be used either alone or in combination. The device memory 210 and/or computer readable medium 212 can be used to store the context 15 information of the user of the device 101, such that the context 15 information is used in processing of the search requests 18 submitted from the device 101 to the network 11. Further, the device memory 210 can also be used by the context engine 100,151, collaboration engine 150 and collaboration server 152 as a means to store and access context 15 information for use in matching the determined context definitions 105 from the information 14 (and/or the context definitions 104 from other contexts 15) e.g. associated with the search request 18.

Further, it is recognized that the computing devices 101 can include the executable applications 100, 207 comprising code or machine readable instructions for implementing predetermined functions/operations including those of an operating system, a web browser, the context engine 100 for example. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of any of the modules (and subsets thereof) the context engine 100, 151, collaboration engine 150, and/or collaboration server 152 may be implemented in hardware, software or a combination of both. Accordingly, the use of a processor 208 as a device and/or as a set of machine-readable instructions is hereafter referred to generically as a processor/module for sake of simplicity.

It will be understood that the computing devices 101 of the users may be, for example, personal computers, personal digital assistants, and mobile phones. Server computing devices 101 can be configured for the information sources 16 and the search engine 24, as desired. Further, it is recognised that each computing device 101, although depicted as a single computer system, may be implemented as a network of computer processors, as desired.

The invention claimed is:

1. A computer implemented method, executed in a processor, for generating a frame of reference for a selected plurality of information, the selected plurality of information containing text data, the method comprising:
    receiving the selected plurality of information for analysis, each one of the plurality of information including a plurality of text data;
    identifying a plurality of logical units of the ones of the plurality of text data;
    identifying a plurality of individual textual portions of ones of the plurality of logical units;
    calculating a number of the plurality of logical units associated with each of the individual textual portions to identify a plurality of patterns including a respective pattern for each of the individual textual portions;
    calculating a measure of importance for each of the plurality of patterns;
    selecting respective ones of the plurality of patterns based on a predefined measure of importance threshold;
    generating a plurality of information context definitions based on the selected respective patterns; and
    assigning, to a computer readable memory, the generated plurality of information context definitions as respective semantic context definitions, the respective semantic context definitions forming the frame of reference for the plurality of information being related via the semantic context definitions.

2. The method of claim 1, wherein the selected plurality of information is selected from the group comprising: an electronic document; network message; content obtained from a database; a Web page; an electronic file; a search result; and a search request parameter.

3. The method of claim 1, wherein the selected plurality of information is selected from the group comprising: application state information of applications of the frame of reference; and generated results of an application of the frame of reference.

4. The method of claim 3, wherein the application state information is selected from the group comprising: a desktop icon; a recently used menu item; and an application bookmark.

5. The method of claim 3 further comprising the step of modifying the state information of applications of the frame of reference based on the context definitions of the semantic context.

6. The method of claim 2, wherein the frame of reference includes a plurality of semantic contexts, each of the plurality of semantic context definitions having a unique set of the context definitions with respect to each other.

7. The method of claim 6, wherein the semantic context definitions include definitions of visual aspects of a graphical user interface representing the frame of reference, such that selection of one of the semantic context definitions is used to configure the visual display of the reference frame.

8. The method of claim 6, wherein if the generated information context definitions are determined to not match any of the semantic context definitions of the plurality of semantic context definitions, a new semantic context is created and the generated information context definitions are assigned as the context definitions of a new semantic context.

9. The method of claim 2 further comprising receiving textual portions selected by the user for use in generation of the information context definitions, such that the selected textual portions include words or word combinations selected from the text data.

10. The method according to claim 2, wherein ones of the plurality of logical units are selected from the group comprising: a sentence; a page; a series of pages; a line of text; a paragraph; and a series of paragraphs.

11. The method according to claim 10, wherein ones of the plurality of logical units are identified using a definition mechanism selected from the group comprising: punctuation; spacing; metadata; a line break; and a page break.

12. The method of claim 9, wherein the textual portions are selected from the group comprising: a word; a word group; and a predefined phrase.

13. The method of claim 2 further comprising calculating a measure of importance for each of the plurality of individual textual portions, the measure of importance including a determination of a local relative frequency of occurrence of the respective individual textual portions in the plurality of selected information.

14. The method of claim 13 further comprising using a global relative frequency of occurrence of each of the plurality of individual textual portions based on a global set of training information, the measure of importance of each of the respective plurality of individual textual portions being further based on the global relative frequency of occurrence.

15. The method of claim 13 further comprising selecting textual portions from the plurality of individual textual portions based on their corresponding measure of importance to satisfying a predefined importance threshold for retaining the textual portions in the plurality of textual portions for use in identifying the plurality of patterns.

16. The method of claim 13 further comprising assigning a unique value for each of the textual portions for use in identifying the plurality of patterns, the unique values being predefined and stored in a predefined list of textual portions.

17. The method of claim 16, wherein the unique value is selected from the group comprising: an integer and a hash value.

18. The method of claim 17 further comprising including a relative positioning information of the textual portions with respect to one another in each of the respective patterns in the identified plurality of patterns of the individual textual portions the relative positioning information used in the selecting of the respective patterns from the plurality of patterns based on their corresponding measure of importance satisfying the predefined pattern importance threshold.

19. The method of claim 1 further comprising selecting the plurality of information context definitions as the individual textual portions from a plurality of selected information;
identifying a plurality of logical units of the text data including the context definitions;
calculating a number of logical units of the plurality of logical units associated with each of the context definitions for use in identifying a plurality of context definition patterns including a respective context definition pattern for each of the individual context definitions;
calculating a measure of importance for each of the plurality of context definition patterns;
selecting respective context definition patterns from the plurality of context definition patterns based on their corresponding measure of importance satisfying a predefined context definition pattern importance threshold for retaining the respective context definition patterns in the plurality of context definition patterns;
generating a plurality of secondary information context definitions based on the selected respective context definition patterns; and
assigning the generated information secondary context definitions obtained from the selected plurality of information as secondary context definitions of a semantic context associated with the frame of reference.

20. The method of claim 19, wherein the secondary context definitions represent a relationship between the context definitions and are used to further define the relationship between information associated with the semantic context.

21. The method of claim 2 further comprising receiving another information for analysis, said another information including a plurality of other text data;
identifying a plurality of other logical units of the other text data;
identifying a plurality of other individual textual portions in each of the logical units;
calculating the number of other logical units associated with each of the individual other textual portions of the plurality of other textual portions for use in identifying a plurality of other patterns including a respective other pattern for each of the individual other textual portions;
calculating an other measure of importance for each of the plurality of other patterns;
selecting respective other patterns from the plurality of other patterns based on their corresponding other measure of importance satisfying an other predefined pattern importance threshold for retaining the respective other patterns in the plurality of other patterns;
generating a plurality of other information context definitions based on the selected respective other patterns; and
comparing the generated other information context definitions with the generated plurality of context definitions of the semantic context definitions to determine a degree of relatedness of the receiving another information with the plurality of information associated with the semantic context definitions.

22. The method of claim 21 wherein the received other information is information obtained from an information query.

23. The method of claim 22, wherein the received other information is based on a user request or based on a request of a context engine of the user independently of user interaction.

24. The method of claim 21 further comprising aggregating the other information context definitions with the context definitions of the semantic context definitions in the event that the compared other information context definitions are determined to match the context definitions of the semantic context definitions.

25. The method of claim 24 further comprising aggregating the other information to the plurality of information associated with the semantic context.

26. The method of claim 21 further comprising filtering the other information context definitions with the context definitions of the semantic context definitions in the event that the compared other information context definitions are determined to match the context definitions of the semantic context definitions.

27. The method of claim 26 further comprising filtering the other information with the semantic context definitions.

28. The method of claim 19, wherein the plurality of contexts is selected from the group comprising: positive; negative; and global contexts used in calculating the overall match.

29. The method of claim 1, wherein the semantic contexts is persisted for a selected period of time.

30. The method of claim 22, wherein the information query is selected from the group comprising: a database query; a structured query of a document; and a Web query.

31. The method of claim 23, wherein the request of the context engine is a predictive query initiated by the context engine based on activities of the user.

32. The method of claim 31, wherein the activities of the user are selected from the group comprising: when the user is in the semantic context in the frame of reference but before submission of the user request; when the user is in the semantic context in the frame of reference but during submission of the user request; and when the user is in the semantic context in the frame of reference but after submission of the user request.

33. The method of claim 32, wherein context definitions from the semantic context definitions are provided to the user as query suggestions for selection by the user.

* * * * *